US012539130B2

(12) United States Patent
Casey et al.

(10) Patent No.: US 12,539,130 B2
(45) Date of Patent: Feb. 3, 2026

(54) ASPIRATION CATHETER, SYSTEMS, AND METHODS THEREOF

(71) Applicant: NEURAVI LIMITED, Galway (IE)

(72) Inventors: Brendan Casey, Galway (IE); Karl Keating, Galway (IE); Ronald Kelly, Galway (IE); David Vale, Galway (IE)

(73) Assignee: NEURAVI LIMITED, Galway (IE)

( * ) Notice: Subject to any disclaimer, the term of this patent is extended or adjusted under 35 U.S.C. 154(b) by 0 days.

(21) Appl. No.: 17/101,960

(22) Filed: Nov. 23, 2020

(65) Prior Publication Data

US 2021/0153883 A1     May 27, 2021

Related U.S. Application Data

(60) Provisional application No. 62/941,414, filed on Nov. 27, 2019.

(51) Int. Cl.
*A61B 17/221*     (2006.01)
*A61B 17/22*     (2006.01)

(52) U.S. Cl.
CPC .. *A61B 17/221* (2013.01); *A61B 2017/22045* (2013.01); *A61B 2017/2215* (2013.01)

(58) Field of Classification Search
CPC .......... A61B 17/221; A61B 2017/2215; A61B 2017/3435; A61B 17/3417; A61M 29/00; A61M 25/0067; A61M 25/0023
See application file for complete search history.

(56) References Cited

U.S. PATENT DOCUMENTS

| | | |
|---|---|---|
| 4,148,319 A | 4/1979 | Kasper et al. |
| 4,243,040 A | 1/1981 | Beecher |
| 4,324,262 A | 4/1982 | Hall |
| 4,351,342 A | 9/1982 | Wiita et al. |
| 4,575,371 A | 3/1986 | Nordqvist et al. |
| 4,592,356 A | 6/1986 | Gutierrez |
| 4,719,924 A | 1/1988 | Crittenden et al. |
| 4,738,666 A | 4/1988 | Fuqua |
| 4,767,404 A | 8/1988 | Renton |
| 4,793,348 A | 12/1988 | Palmaz |

(Continued)

FOREIGN PATENT DOCUMENTS

| | | |
|---|---|---|
| AU | 2015271876 B2 | 9/2017 |
| CN | 1658920 A | 8/2005 |

(Continued)

OTHER PUBLICATIONS

US 6,348,062 B1, 02/2002, Hopkins (withdrawn)
(Continued)

*Primary Examiner* — Shaun L David
(74) *Attorney, Agent, or Firm* — Troutman Pepper Locke LLP

(57) ABSTRACT

A catheter including a distal tip section disposed on or adjacent the distal end of the catheter, the distal tip section being invertible about a transition between a catheter body and the distal tip section between a first configuration and a second configuration. Retracting the distal tip section causes the distal tip section to invert about the transition from the first to the second configuration, the second configuration comprising an expansile tip with an open funnel-like distal mouth comprising a larger diameter than a diameter of the transition.

20 Claims, 17 Drawing Sheets

(56) References Cited

U.S. PATENT DOCUMENTS

| | | |
|---|---|---|
| 4,873,978 A | 10/1989 | Ginsburg |
| 5,011,488 A | 4/1991 | Ginsburg |
| 5,057,092 A | 10/1991 | Webster, Jr. |
| 5,092,839 A | 3/1992 | Kipperman |
| 5,102,415 A | 4/1992 | Guenther et al. |
| 5,106,364 A | 4/1992 | Hayafuji et al. |
| 5,122,136 A | 6/1992 | Guglielmi et al. |
| 5,123,840 A | 6/1992 | Nates |
| 5,171,233 A | 12/1992 | Amplatz |
| 5,176,660 A | 1/1993 | Truckal |
| 5,234,437 A | 8/1993 | Sepetka |
| 5,256,144 A | 10/1993 | Kraus et al. |
| 5,261,916 A | 11/1993 | Engelson |
| 5,337,754 A | 8/1994 | Heaven et al. |
| 5,370,647 A | 12/1994 | Graber et al. |
| 5,372,124 A | 12/1994 | Takayama et al. |
| 5,385,562 A | 1/1995 | Adams |
| 5,387,219 A | 2/1995 | Rappe |
| 5,387,226 A | 2/1995 | Miraki |
| 5,396,902 A | 3/1995 | Brennen et al. |
| 5,447,497 A | 9/1995 | Sogard et al. |
| 5,449,372 A | 9/1995 | Schmaltz |
| 5,520,651 A | 5/1996 | Sutcu |
| 5,538,008 A | 7/1996 | Crowe |
| 5,538,512 A | 7/1996 | Zenzon et al. |
| 5,549,626 A | 8/1996 | Miller et al. |
| 5,558,652 A | 9/1996 | Henke |
| 5,601,600 A | 2/1997 | Ton |
| 5,609,627 A | 3/1997 | Goicoechea et al. |
| 5,624,461 A | 4/1997 | Mariant |
| 5,639,277 A | 6/1997 | Mariant |
| 5,645,558 A | 7/1997 | Horton |
| 5,658,296 A | 8/1997 | Bates |
| 5,662,671 A | 9/1997 | Barbut |
| 5,695,519 A | 12/1997 | Summer et al. |
| 5,702,373 A | 12/1997 | Samson |
| 5,709,704 A | 1/1998 | Nott et al. |
| 5,713,853 A | 2/1998 | Clark |
| 5,728,078 A | 3/1998 | Powers, Jr. |
| 5,769,871 A | 6/1998 | Mers Kelly |
| 5,779,716 A | 7/1998 | Cano |
| 5,797,948 A | 8/1998 | Dunham |
| 5,810,874 A | 9/1998 | Lefebvre |
| 5,814,064 A | 9/1998 | Danniel et al. |
| 5,827,304 A | 10/1998 | Hart |
| 5,846,248 A | 12/1998 | Chu et al. |
| 5,846,251 A | 12/1998 | Hart |
| 5,855,598 A | 1/1999 | Pinchuk |
| 5,893,869 A | 4/1999 | Barnhart et al. |
| 5,895,398 A | 4/1999 | Wensel |
| 5,897,567 A | 4/1999 | Ressemann |
| 5,904,698 A | 5/1999 | Thomas et al. |
| 5,911,715 A | 6/1999 | Berg et al. |
| 5,911,725 A | 6/1999 | Boury |
| 5,935,139 A | 8/1999 | Bates |
| 5,938,645 A | 8/1999 | Gordon |
| 5,947,995 A | 9/1999 | Samuels |
| 5,951,539 A | 9/1999 | Nita et al. |
| 5,968,057 A | 10/1999 | Taheri |
| 5,971,938 A | 10/1999 | Hart et al. |
| 5,997,939 A | 12/1999 | Moechnig et al. |
| 6,004,279 A | 12/1999 | Crowley et al. |
| 6,022,343 A | 2/2000 | Johnson et al. |
| 6,063,113 A | 5/2000 | Kavteladze |
| 6,066,149 A | 5/2000 | Samson et al. |
| 6,066,158 A | 5/2000 | Engelson |
| 6,093,196 A | 7/2000 | Okada |
| 6,093,199 A | 7/2000 | Brown et al. |
| 6,096,053 A | 8/2000 | Bates |
| 6,099,534 A | 8/2000 | Bates |
| 6,102,932 A | 8/2000 | Kurz |
| 6,106,548 A | 8/2000 | Roubin et al. |
| 6,120,534 A | 9/2000 | Ruiz |
| 6,129,739 A | 10/2000 | Khosravi |
| 6,142,957 A | 11/2000 | Diamond et al. |
| 6,146,396 A | 11/2000 | Kónya et al. |
| 6,146,404 A | 11/2000 | Kim |
| 6,165,194 A | 12/2000 | Denardo |
| 6,165,199 A | 12/2000 | Barbut |
| 6,168,604 B1 | 1/2001 | Cano |
| 6,168,622 B1 | 1/2001 | Mazzocchi |
| 6,174,318 B1 | 1/2001 | Bates et al. |
| 6,179,861 B1 | 1/2001 | Khosravi |
| 6,203,561 B1 | 3/2001 | Ramee |
| 6,214,026 B1 | 4/2001 | Lepak |
| 6,214,036 B1 | 4/2001 | Letendre et al. |
| 6,221,006 B1 | 4/2001 | Dubrul |
| 6,238,412 B1 | 5/2001 | Dubrul |
| 6,245,087 B1 | 6/2001 | Addis |
| 6,251,122 B1 | 6/2001 | Tsukernik |
| 6,254,571 B1 | 7/2001 | Hart |
| 6,264,663 B1 | 7/2001 | Cano |
| 6,306,163 B1 | 10/2001 | Fitz |
| 6,309,379 B1 | 10/2001 | Willard |
| 6,312,407 B1 | 11/2001 | Zadno-Azizi et al. |
| 6,312,444 B1 | 11/2001 | Barbut |
| 6,315,778 B1 | 11/2001 | Gambale et al. |
| 6,323,459 B1 | 11/2001 | Maynard |
| 6,325,819 B1 | 12/2001 | Pavcnik et al. |
| 6,334,864 B1 | 1/2002 | Amplatz et al. |
| 6,336,934 B1 | 1/2002 | Gilson et al. |
| 6,346,116 B1 | 2/2002 | Brooks et al. |
| 6,348,056 B1 | 2/2002 | Bates |
| 6,350,271 B1 | 2/2002 | Kurz et al. |
| 6,358,238 B1 | 3/2002 | Sherry |
| 6,361,545 B1 | 3/2002 | Macoviak |
| 6,371,963 B1 | 4/2002 | Nishtala et al. |
| 6,375,668 B1 | 4/2002 | Gifford et al. |
| 6,383,205 B1 | 5/2002 | Samson et al. |
| 6,383,206 B1 | 5/2002 | Gillick |
| 6,391,037 B1 | 5/2002 | Greenhalgh |
| 6,402,771 B1 | 6/2002 | Palmer |
| 6,409,683 B1 | 6/2002 | Fonseca et al. |
| 6,416,541 B2 | 7/2002 | Denardo |
| 6,425,909 B1 | 7/2002 | Dieck et al. |
| 6,432,122 B1 | 8/2002 | Gilson et al. |
| 6,436,112 B2 | 8/2002 | Wensel |
| 6,458,139 B1 | 10/2002 | Palmer |
| 6,485,497 B2 | 11/2002 | Wensel |
| 6,485,501 B1 | 11/2002 | Green |
| 6,485,502 B2 | 11/2002 | Don Michael |
| 6,511,492 B1 | 1/2003 | Rosenbluth |
| 6,517,551 B1 | 2/2003 | Driskill |
| 6,520,934 B1 | 2/2003 | Lee et al. |
| 6,520,951 B1 | 2/2003 | Carrillo, Jr. |
| 6,530,935 B2 | 3/2003 | Wensel |
| 6,530,939 B1 | 3/2003 | Hopkins |
| 6,540,768 B1 | 4/2003 | Diaz et al. |
| 6,544,279 B1 | 4/2003 | Hopkins |
| 6,551,341 B2 | 4/2003 | Boylan et al. |
| 6,551,342 B1 | 4/2003 | Shen et al. |
| 6,575,997 B1 | 6/2003 | Palmer et al. |
| 6,582,448 B1 | 6/2003 | Boyle |
| 6,585,756 B1 | 7/2003 | Strecker |
| 6,589,265 B1 | 7/2003 | Palmer et al. |
| 6,592,607 B1 | 7/2003 | Palmer et al. |
| 6,592,616 B1 | 7/2003 | Stack |
| 6,602,271 B2 | 8/2003 | Adams |
| 6,602,272 B2 | 8/2003 | Boylan et al. |
| 6,605,102 B1 | 8/2003 | Mazzocchi et al. |
| 6,610,077 B1 | 8/2003 | Hancock et al. |
| 6,616,679 B1 | 9/2003 | Khosravi |
| 6,632,241 B1 | 10/2003 | Hanoock et al. |
| 6,638,245 B2 | 10/2003 | Miller |
| 6,638,293 B1 | 10/2003 | Makower et al. |
| 6,641,590 B1 | 11/2003 | Palmer et al. |
| 6,652,555 B1 | 11/2003 | VanTassel et al. |
| 6,656,218 B1 | 12/2003 | Denardo et al. |
| 6,660,021 B1 | 12/2003 | Palmer et al. |
| 6,663,650 B2 | 12/2003 | Sepetka |
| 6,673,089 B1 | 1/2004 | Yassour et al. |
| 6,685,722 B1 | 2/2004 | Rosenbluth |
| 6,692,504 B2 | 2/2004 | Kurz et al. |
| 6,692,508 B2 | 2/2004 | Wensel |

(56) References Cited

U.S. PATENT DOCUMENTS

| | | |
|---|---|---|
| 6,692,509 B2 | 2/2004 | Wensel |
| 6,702,782 B2 | 3/2004 | Miller |
| 6,709,429 B1 | 3/2004 | Schaefer et al. |
| 6,712,834 B2 | 3/2004 | Yassour et al. |
| 6,726,701 B2 | 4/2004 | Gilson et al. |
| 6,726,703 B2 | 4/2004 | Broome et al. |
| 6,730,104 B1 | 5/2004 | Sepetka |
| 6,755,779 B2 | 6/2004 | Vanden Hoek et al. |
| 6,824,545 B2 | 11/2004 | Sepetka |
| 6,855,155 B2 | 2/2005 | Denardo et al. |
| 6,878,163 B2 | 4/2005 | Denardo et al. |
| 6,890,340 B2 | 5/2005 | Duane |
| 6,913,612 B2 | 7/2005 | Palmer |
| 6,913,618 B2 | 7/2005 | Denardo et al. |
| 6,953,472 B2 | 10/2005 | Palmer et al. |
| 6,989,019 B2 | 1/2006 | Mazzocchi |
| 6,989,021 B2 | 1/2006 | Bosma et al. |
| 6,994,718 B2 | 2/2006 | Groothuis et al. |
| 6,997,939 B2 | 2/2006 | Inder |
| 7,004,954 B1 | 2/2006 | Voss et al. |
| 7,004,955 B2 | 2/2006 | Shen |
| 7,004,956 B2 | 2/2006 | Palmer |
| 7,008,434 B2 | 3/2006 | Kurz et al. |
| 7,033,376 B2 | 4/2006 | Tsukernik |
| 7,041,116 B2 | 5/2006 | Goto |
| 7,048,758 B2 | 5/2006 | Boyle |
| 7,058,456 B2 | 6/2006 | Pierce |
| 7,063,707 B2 | 6/2006 | Bose |
| 7,153,320 B2 | 12/2006 | Euteneuer et al. |
| 7,175,655 B1 | 2/2007 | Malaei |
| 7,179,273 B1 | 2/2007 | Palmer et al. |
| 7,220,269 B1 | 5/2007 | Ansel |
| 7,220,271 B2 | 5/2007 | Clubb |
| 7,226,464 B2 | 6/2007 | Garner et al. |
| 7,229,472 B2 | 6/2007 | DePalma et al. |
| 7,232,462 B2 | 6/2007 | Schaeffer |
| 7,288,112 B2 | 10/2007 | Denardo et al. |
| 7,306,618 B2 | 12/2007 | Demond |
| 7,316,692 B2 | 1/2008 | Huffmaster |
| 7,323,001 B2 | 1/2008 | Cubb |
| 7,331,976 B2 | 2/2008 | McGuckin, Jr. et al. |
| 7,344,550 B2 | 3/2008 | Carrison et al. |
| 7,399,308 B2 | 7/2008 | Borillo et al. |
| 7,410,491 B2 | 8/2008 | Hopkins |
| 7,452,496 B2 | 11/2008 | Brady et al. |
| 7,491,215 B2 | 2/2009 | Vale et al. |
| 7,491,216 B2 | 2/2009 | Brady |
| 7,510,565 B2 | 3/2009 | Gilson et al. |
| 7,534,252 B2 | 5/2009 | Sepetka |
| 7,556,636 B2 | 7/2009 | Mazzocchi |
| 7,582,111 B2 | 9/2009 | Krolik et al. |
| 7,594,926 B2 | 9/2009 | Linder |
| 7,604,649 B2 | 10/2009 | McGuckin et al. |
| 7,618,434 B2 | 11/2009 | Santra et al. |
| 7,662,165 B2 | 2/2010 | Gilson et al. |
| 7,670,356 B2 | 3/2010 | Mazzocchi |
| 7,691,121 B2 | 4/2010 | Rosenbluth |
| 7,691,124 B2 | 4/2010 | Balgobin |
| 7,708,770 B2 | 5/2010 | Linder |
| 7,736,385 B2 | 6/2010 | Agnew |
| 7,766,934 B2 | 8/2010 | Pal |
| 7,771,452 B2 | 8/2010 | Pal |
| 7,780,694 B2 | 8/2010 | Palmer |
| 7,780,696 B2 | 8/2010 | Daniel et al. |
| 7,819,893 B2 | 10/2010 | Brady et al. |
| 7,828,815 B2 | 11/2010 | Mazzocchi |
| 7,846,175 B2 | 12/2010 | Bonnette et al. |
| 7,846,176 B2 | 12/2010 | Gilson et al. |
| 7,850,708 B2 | 12/2010 | Pal |
| 7,887,560 B2 | 2/2011 | Kusleika |
| 7,901,426 B2 | 3/2011 | Gilson et al. |
| 7,914,549 B2 | 3/2011 | Morsi |
| 7,922,732 B2 | 4/2011 | Mazzocchi |
| 7,927,349 B2 | 4/2011 | Brady et al. |
| 7,927,784 B2 | 4/2011 | Simpson |
| 7,931,659 B2 | 4/2011 | Bose et al. |
| 7,998,165 B2 | 8/2011 | Huffmaster |
| 8,002,822 B2 | 8/2011 | Glocker et al. |
| 8,021,379 B2 | 9/2011 | Thompson et al. |
| 8,021,380 B2 | 9/2011 | Thompson et al. |
| 8,043,326 B2 | 10/2011 | Hancock et al. |
| 8,048,151 B2 | 11/2011 | O'Brien et al. |
| 8,052,640 B2 | 11/2011 | Fiorella et al. |
| 8,057,497 B1 | 11/2011 | Raju et al. |
| 8,066,757 B2 | 11/2011 | Ferrera et al. |
| 8,070,791 B2 | 12/2011 | Ferrera et al. |
| 8,088,140 B2 | 1/2012 | Ferrera et al. |
| 8,096,985 B2 | 1/2012 | Legaspi et al. |
| 8,100,935 B2 | 1/2012 | Rosenbluth et al. |
| 8,109,941 B2 | 2/2012 | Richardson |
| 8,118,829 B2 | 2/2012 | Carrison et al. |
| 8,123,769 B2 | 2/2012 | Osborne |
| 8,137,377 B2 | 3/2012 | Palmer |
| 8,142,422 B2 | 3/2012 | Makower et al. |
| 8,142,442 B2 | 3/2012 | Palmer et al. |
| 8,182,508 B2 | 5/2012 | Magnuson et al. |
| 8,187,298 B2 | 5/2012 | Pal |
| 8,246,641 B2 | 8/2012 | Osborne et al. |
| 8,246,672 B2 | 8/2012 | Osborne |
| 8,252,017 B2 | 8/2012 | Paul, Jr. et al. |
| 8,252,018 B2 | 8/2012 | Valaie |
| 8,298,252 B2 | 10/2012 | Krolik et al. |
| 8,357,178 B2 | 1/2013 | Grandfield et al. |
| 8,357,179 B2 | 1/2013 | Grandfield et al. |
| 8,357,893 B2 | 1/2013 | Xu et al. |
| 8,361,095 B2 | 1/2013 | Osborne |
| 8,366,663 B2 | 2/2013 | Fiorella et al. |
| 8,372,133 B2 | 2/2013 | Douk et al. |
| 8,382,742 B2 | 2/2013 | Hermann et al. |
| 8,409,215 B2 | 4/2013 | Sepetka et al. |
| 8,419,748 B2 | 4/2013 | Valaie |
| 8,460,312 B2 | 6/2013 | Bose et al. |
| 8,460,313 B2 | 6/2013 | Huffmaster |
| 8,486,104 B2 | 7/2013 | Samson et al. |
| 8,529,596 B2 | 9/2013 | Grandfield et al. |
| 8,574,262 B2 | 11/2013 | Ferrera et al. |
| 8,579,915 B2 | 11/2013 | French et al. |
| 8,585,643 B2 | 11/2013 | Vo et al. |
| 8,585,713 B2 | 11/2013 | Ferrera et al. |
| 8,608,761 B2 | 12/2013 | Osbourne et al. |
| 8,679,142 B2 | 3/2014 | Slee et al. |
| 8,696,622 B2 | 4/2014 | Fiorella et al. |
| 8,702,652 B2 | 4/2014 | Fiorella et al. |
| 8,702,724 B2 | 4/2014 | Olsen et al. |
| 8,777,976 B2 | 7/2014 | Brady et al. |
| 8,784,434 B2 | 7/2014 | Rosenbluth et al. |
| 8,784,441 B2 | 7/2014 | Rosenbluth et al. |
| 8,795,305 B2 | 8/2014 | Grandfield et al. |
| 8,795,317 B2 | 8/2014 | Grandfield et al. |
| 8,795,345 B2 | 8/2014 | Grandfield et al. |
| 8,814,892 B2 | 8/2014 | Galdonik et al. |
| 8,814,925 B2 | 8/2014 | Hilaire et al. |
| 8,852,205 B2 | 10/2014 | Brady et al. |
| 8,900,265 B1 | 12/2014 | Ulm, III |
| 8,939,991 B2 | 1/2015 | Krolick et al. |
| 8,945,143 B2 | 2/2015 | Ferrera et al. |
| 8,945,172 B2 | 2/2015 | Ferrera et al. |
| 8,968,330 B2 | 3/2015 | Rosenbluth et al. |
| 9,039,749 B2 | 5/2015 | Shrivastava et al. |
| 9,072,537 B2 | 7/2015 | Grandfield et al. |
| 9,113,936 B2 | 8/2015 | Palmer et al. |
| 9,119,656 B2 | 9/2015 | Bose et al. |
| 9,138,307 B2 | 9/2015 | Valaie |
| 9,149,609 B2 | 10/2015 | Ansel et al. |
| 9,155,552 B2 | 10/2015 | Ulm, III |
| 9,161,766 B2 | 10/2015 | Slee et al. |
| 9,173,668 B2 | 11/2015 | Ulm, III |
| 9,186,487 B2 | 11/2015 | Dubrul et al. |
| 9,198,687 B2 | 12/2015 | Fulkerson et al. |
| 9,204,887 B2 | 12/2015 | Cully et al. |
| 9,221,132 B2 | 12/2015 | Bowman |
| 9,232,992 B2 | 1/2016 | Heidner |
| 9,402,707 B2 | 8/2016 | Brady et al. |
| 9,445,829 B2 | 9/2016 | Brady et al. |

(56) References Cited

U.S. PATENT DOCUMENTS

| | | |
|---|---|---|
| 9,532,792 B2 | 1/2017 | Galdonik et al. |
| 9,532,873 B2 | 1/2017 | Kelley |
| 9,533,344 B2 | 1/2017 | Monetti et al. |
| 9,539,011 B2 | 1/2017 | Chen et al. |
| 9,539,022 B2 | 1/2017 | Bowman |
| 9,539,122 B2 | 1/2017 | Burke et al. |
| 9,539,382 B2 | 1/2017 | Nelson |
| 9,549,830 B2 | 1/2017 | Bruszewski et al. |
| 9,554,805 B2 | 1/2017 | Tompkins et al. |
| 9,561,094 B2 | 2/2017 | Fulton |
| 9,561,125 B2 | 2/2017 | Bowman et al. |
| 9,572,982 B2 | 2/2017 | Burnes et al. |
| 9,579,484 B2 | 2/2017 | Barnell |
| 9,585,642 B2 | 3/2017 | Dinsmoor et al. |
| 9,615,832 B2 | 4/2017 | Bose et al. |
| 9,615,951 B2 | 4/2017 | Bennett et al. |
| 9,622,753 B2 | 4/2017 | Cox |
| 9,636,115 B2 | 5/2017 | Henry et al. |
| 9,636,439 B2 | 5/2017 | Chu et al. |
| 9,642,635 B2 | 5/2017 | Vale et al. |
| 9,642,639 B2 | 5/2017 | Brady et al. |
| 9,642,675 B2 | 5/2017 | Werneth et al. |
| 9,655,633 B2 | 5/2017 | Leynov et al. |
| 9,655,645 B2 | 5/2017 | Staunton |
| 9,655,989 B2 | 5/2017 | Cruise et al. |
| 9,662,129 B2 | 5/2017 | Galdonik et al. |
| 9,662,238 B2 | 5/2017 | Dwork et al. |
| 9,662,425 B2 | 5/2017 | Lilja et al. |
| 9,668,898 B2 | 6/2017 | Wong |
| 9,675,477 B2 | 6/2017 | Thompson |
| 9,675,782 B2 | 6/2017 | Connolly |
| 9,676,022 B2 | 6/2017 | Ensign et al. |
| 9,692,557 B2 | 6/2017 | Murphy |
| 9,693,852 B2 | 7/2017 | Lam et al. |
| 9,700,262 B2 | 7/2017 | Janik et al. |
| 9,700,399 B2 | 7/2017 | Acosta-Acevedo |
| 9,717,421 B2 | 8/2017 | Griswold et al. |
| 9,717,500 B2 | 8/2017 | Tieu et al. |
| 9,717,502 B2 | 8/2017 | Teoh et al. |
| 9,724,103 B2 | 8/2017 | Cruise et al. |
| 9,724,526 B2 | 8/2017 | Strother et al. |
| 9,750,565 B2 | 9/2017 | Bloom et al. |
| 9,757,260 B2 | 9/2017 | Greenan |
| 9,764,111 B2 | 9/2017 | Gulachenski |
| 9,770,251 B2 | 9/2017 | Bowman et al. |
| 9,770,577 B2 | 9/2017 | Li et al. |
| 9,775,621 B2 | 10/2017 | Tompkins et al. |
| 9,775,706 B2 | 10/2017 | Peterson et al. |
| 9,775,732 B2 | 10/2017 | Khenansho |
| 9,788,800 B2 | 10/2017 | Mayoras, Jr. |
| 9,795,391 B2 | 10/2017 | Saatchi et al. |
| 9,801,980 B2 | 10/2017 | Karino et al. |
| 9,808,599 B2 | 11/2017 | Bowman et al. |
| 9,833,252 B2 | 12/2017 | Sepetka et al. |
| 9,833,604 B2 | 12/2017 | Lam et al. |
| 9,833,625 B2 | 12/2017 | Waldhauser et al. |
| 10,028,759 B2 | 7/2018 | Wallace et al. |
| 10,149,692 B2 | 12/2018 | Turjman et al. |
| 10,172,634 B1 | 1/2019 | Horowitz |
| 10,265,086 B2 | 4/2019 | Vale |
| 10,292,723 B2 | 5/2019 | Brady et al. |
| 10,299,799 B1 | 5/2019 | DeMeritt |
| 10,299,811 B2 | 5/2019 | Brady et al. |
| 10,363,054 B2 | 7/2019 | Vale et al. |
| 10,610,668 B2 | 4/2020 | Burkholz et al. |
| 10,624,659 B2 | 4/2020 | Gamba et al. |
| 10,716,915 B2 | 7/2020 | Ogle et al. |
| 10,835,271 B2 | 11/2020 | Ma |
| 10,986,984 B2 | 4/2021 | Chen et al. |
| 11,076,879 B2 | 8/2021 | Yee et al. |
| 11,272,945 B2 | 3/2022 | Shrivastava et al. |
| 11,273,062 B2 | 3/2022 | Goldberg et al. |
| 11,376,028 B1 | 7/2022 | Saadat et al. |
| 11,446,045 B2 | 9/2022 | Vale et al. |
| 11,534,078 B2 | 12/2022 | Tang et al. |
| 11,633,198 B2 | 4/2023 | Keating et al. |
| 2001/0001315 A1 | 5/2001 | Bates |
| 2001/0011182 A1 | 8/2001 | Dubrul et al. |
| 2001/0016755 A1 | 8/2001 | Addis |
| 2001/0041899 A1 | 11/2001 | Foster |
| 2001/0044598 A1 | 11/2001 | Parodi |
| 2001/0044634 A1 | 11/2001 | Don Michael et al. |
| 2001/0051810 A1 | 12/2001 | Dubrul |
| 2002/0002383 A1 | 1/2002 | Sepetka et al. |
| 2002/0016609 A1 | 2/2002 | Wensel |
| 2002/0022859 A1 | 2/2002 | Hogendijk |
| 2002/0026211 A1 | 2/2002 | Khosravi |
| 2002/0049467 A1 | 4/2002 | Gilson et al. |
| 2002/0049468 A1 | 4/2002 | Streeter |
| 2002/0052620 A1 | 5/2002 | Barvut |
| 2002/0068954 A1 | 6/2002 | Foster |
| 2002/0072764 A1 | 6/2002 | Sepetka |
| 2002/0082558 A1 | 6/2002 | Samson |
| 2002/0091407 A1 | 7/2002 | Zadno-Azizi et al. |
| 2002/0095171 A1 | 7/2002 | Belef |
| 2002/0123765 A1 | 9/2002 | Sepetka |
| 2002/0143362 A1 | 10/2002 | Macoviak et al. |
| 2002/0156455 A1 | 10/2002 | Barbut |
| 2002/0161393 A1 | 10/2002 | Demond |
| 2002/0165576 A1 | 11/2002 | Boyle et al. |
| 2002/0173819 A1 | 11/2002 | Leeflang et al. |
| 2002/0177800 A1 | 11/2002 | Bagaoisan et al. |
| 2002/0188276 A1 | 12/2002 | Evans |
| 2003/0004536 A1 | 1/2003 | Boylan et al. |
| 2003/0004538 A1 | 1/2003 | Secrest |
| 2003/0004542 A1 | 1/2003 | Wensel |
| 2003/0009146 A1 | 1/2003 | Muni |
| 2003/0009191 A1 | 1/2003 | Wensel |
| 2003/0023204 A1 | 1/2003 | Vo et al. |
| 2003/0040769 A1 | 2/2003 | Kelley et al. |
| 2003/0040772 A1 | 2/2003 | Hyodoh et al. |
| 2003/0050663 A1 | 3/2003 | Khachin |
| 2003/0060833 A1 | 3/2003 | Carrison et al. |
| 2003/0088266 A1 | 5/2003 | Bowlin |
| 2003/0100847 A1 | 5/2003 | D'Aquanni et al. |
| 2003/0105484 A1 | 6/2003 | Boyle et al. |
| 2003/0125798 A1 | 7/2003 | Martin |
| 2003/0130682 A1 | 7/2003 | Broome et al. |
| 2003/0144687 A1 | 7/2003 | Brady et al. |
| 2003/0144689 A1 | 7/2003 | Brady et al. |
| 2003/0153940 A1 | 8/2003 | Nohilly et al. |
| 2003/0153943 A1 | 8/2003 | Michael et al. |
| 2003/0153944 A1 | 8/2003 | Phung |
| 2003/0163064 A1 | 8/2003 | Vrba |
| 2003/0163158 A1 | 8/2003 | Wlite |
| 2003/0171769 A1 | 9/2003 | Barbu |
| 2003/0176884 A1 | 9/2003 | Berrada et al. |
| 2003/0181939 A1 | 9/2003 | Bonutti |
| 2003/0187495 A1 | 10/2003 | Cully et al. |
| 2003/0195537 A1 | 10/2003 | Dubrul |
| 2003/0195554 A1 | 10/2003 | Shen |
| 2003/0199917 A1 | 10/2003 | Knudson |
| 2003/0204202 A1 | 10/2003 | Palmer |
| 2003/0212430 A1 | 11/2003 | Bose |
| 2003/0216611 A1 | 11/2003 | Vu |
| 2003/0236533 A1 | 12/2003 | Wilson |
| 2004/0010280 A1 | 1/2004 | Adams et al. |
| 2004/0010282 A1 | 1/2004 | Kusleika |
| 2004/0014002 A1 | 1/2004 | Lundgren |
| 2004/0068288 A1 | 4/2004 | Palmer et al. |
| 2004/0073243 A1 | 4/2004 | Sepetka |
| 2004/0079429 A1 | 4/2004 | Miller |
| 2004/0082962 A1 | 4/2004 | Demarais et al. |
| 2004/0093065 A1 | 5/2004 | Yachia et al. |
| 2004/0133231 A1 | 7/2004 | Maitland |
| 2004/0138692 A1 | 7/2004 | Phung |
| 2004/0153049 A1 | 8/2004 | Hewitt et al. |
| 2004/0153118 A1 | 8/2004 | Clubb |
| 2004/0193107 A1 | 9/2004 | Pierpont et al. |
| 2004/0199202 A1 | 10/2004 | Dubrul et al. |
| 2004/0236397 A1 | 11/2004 | Coe et al. |
| 2004/0260333 A1 | 12/2004 | Dubrul et al. |
| 2005/0015047 A1 | 1/2005 | Shah |
| 2005/0020974 A1 | 1/2005 | Noriega |

(56) References Cited

U.S. PATENT DOCUMENTS

| | | |
|---|---|---|
| 2005/0033348 A1 | 2/2005 | Sepetka |
| 2005/0038447 A1 | 2/2005 | Huffmaster |
| 2005/0038468 A1 | 2/2005 | Panetta et al. |
| 2005/0049619 A1 | 3/2005 | Sepetka |
| 2005/0049669 A1 | 3/2005 | Jones |
| 2005/0049670 A1 | 3/2005 | Jones et al. |
| 2005/0055033 A1 | 3/2005 | Leslie et al. |
| 2005/0055047 A1 | 3/2005 | Greenhalgh |
| 2005/0059993 A1 | 3/2005 | Ramzipoor et al. |
| 2005/0059995 A1 | 3/2005 | Sepetka |
| 2005/0085849 A1 | 4/2005 | Sepetka |
| 2005/0090857 A1 | 4/2005 | Kusleika et al. |
| 2005/0119524 A1 | 6/2005 | Sekine et al. |
| 2005/0119668 A1 | 6/2005 | Teague et al. |
| 2005/0125024 A1 | 6/2005 | Sepetka |
| 2005/0131449 A1 | 6/2005 | Salahieh et al. |
| 2005/0149111 A1 | 7/2005 | Kanazawa et al. |
| 2005/0159770 A1 | 7/2005 | Divani et al. |
| 2005/0171566 A1 | 8/2005 | Kanamaru |
| 2005/0187570 A1 | 8/2005 | Nguyen et al. |
| 2005/0216030 A1 | 9/2005 | Sepetka |
| 2005/0216050 A1 | 9/2005 | Sepetka |
| 2005/0228417 A1 | 10/2005 | Teitelbaum et al. |
| 2005/0267491 A1 | 12/2005 | Kellett et al. |
| 2005/0288686 A1 | 12/2005 | Sepetka |
| 2006/0009785 A1 | 1/2006 | Maitland et al. |
| 2006/0009799 A1 | 1/2006 | Kleshinski et al. |
| 2006/0010636 A1 | 1/2006 | Vacher |
| 2006/0030933 A1 | 2/2006 | DeLeggge et al. |
| 2006/0036271 A1 | 2/2006 | Schomer et al. |
| 2006/0058836 A1 | 3/2006 | Bose |
| 2006/0058837 A1 | 3/2006 | Bose |
| 2006/0058838 A1 | 3/2006 | Bose |
| 2006/0064151 A1 | 3/2006 | Guterman et al. |
| 2006/0149313 A1 | 7/2006 | Arguello et al. |
| 2006/0155305 A1 | 7/2006 | Freudenthal |
| 2006/0155322 A1 | 7/2006 | Sater et al. |
| 2006/0161187 A1 | 7/2006 | Levine et al. |
| 2006/0184191 A1 | 8/2006 | O'Brien |
| 2006/0195137 A1 | 8/2006 | Sepetka |
| 2006/0224177 A1 | 10/2006 | Finitsis |
| 2006/0224179 A1 | 10/2006 | Kucharczyk |
| 2006/0229638 A1 | 10/2006 | Abrams et al. |
| 2006/0282111 A1 | 12/2006 | Morsi |
| 2006/0287701 A1 | 12/2006 | Pal |
| 2007/0088383 A1 | 4/2007 | Pal et al. |
| 2007/0142858 A1 | 6/2007 | Bates |
| 2007/0149996 A1 | 6/2007 | Coughlin |
| 2007/0156170 A1 | 7/2007 | Hancock |
| 2007/0165170 A1 | 7/2007 | Fukuda |
| 2007/0179513 A1 | 8/2007 | Deutsch |
| 2007/0191866 A1 | 8/2007 | Palmer et al. |
| 2007/0198028 A1 | 8/2007 | Miloslavski |
| 2007/0198051 A1 | 8/2007 | Clubb et al. |
| 2007/0198075 A1 | 8/2007 | Levy |
| 2007/0208367 A1 | 9/2007 | Fiorella |
| 2007/0208371 A1 | 9/2007 | French |
| 2007/0213765 A1 | 9/2007 | Adams et al. |
| 2007/0225749 A1 | 9/2007 | Martin |
| 2007/0239182 A1 | 10/2007 | Glines et al. |
| 2007/0239254 A1 | 10/2007 | Chia et al. |
| 2007/0244505 A1 | 10/2007 | Gilson et al. |
| 2007/0244550 A1 | 10/2007 | Eidenschink |
| 2007/0270902 A1 | 11/2007 | Slazas et al. |
| 2007/0288038 A1 | 12/2007 | Bimbo |
| 2007/0293887 A1 | 12/2007 | Okushi et al. |
| 2008/0041516 A1 | 2/2008 | Chiu et al. |
| 2008/0045881 A1 | 2/2008 | Teitelbaum et al. |
| 2008/0058590 A1 | 3/2008 | Saadat et al. |
| 2008/0082107 A1 | 4/2008 | Miller et al. |
| 2008/0086190 A1 | 4/2008 | Ta |
| 2008/0091223 A1 | 4/2008 | Pokorney |
| 2008/0097398 A1 | 4/2008 | Mitelberg |
| 2008/0109031 A1 | 5/2008 | Sepetka |
| 2008/0109032 A1 | 5/2008 | Sepetka |
| 2008/0119886 A1 | 5/2008 | Greenhalgh et al. |
| 2008/0125798 A1* | 5/2008 | Osborne ............... A61B 17/221 606/159 |
| 2008/0177296 A1 | 7/2008 | Sepetka |
| 2008/0183197 A1 | 7/2008 | Sepetka |
| 2008/0183198 A1 | 7/2008 | Sepetka |
| 2008/0183205 A1 | 7/2008 | Sepetka |
| 2008/0188876 A1 | 8/2008 | Sepetka |
| 2008/0188885 A1 | 8/2008 | Sepetka |
| 2008/0188928 A1 | 8/2008 | Salahieh |
| 2008/0200946 A1 | 8/2008 | Braun |
| 2008/0215077 A1 | 9/2008 | Sepetka |
| 2008/0221600 A1 | 9/2008 | Dieck et al. |
| 2008/0228209 A1 | 9/2008 | DeMello et al. |
| 2008/0234706 A1 | 9/2008 | Sepetka |
| 2008/0243170 A1 | 10/2008 | Jenson |
| 2008/0255596 A1 | 10/2008 | Jenson |
| 2008/0262528 A1 | 10/2008 | Martin |
| 2008/0262532 A1 | 10/2008 | Martin |
| 2008/0269774 A1 | 10/2008 | Garcia et al. |
| 2008/0275488 A1 | 11/2008 | Fleming |
| 2008/0275493 A1 | 11/2008 | Farmiga |
| 2008/0281350 A1 | 11/2008 | Sepetka |
| 2008/0312681 A1 | 12/2008 | Ansel |
| 2009/0024157 A1 | 1/2009 | Anukhin |
| 2009/0054918 A1 | 2/2009 | Henson |
| 2009/0069828 A1 | 3/2009 | Martin |
| 2009/0076539 A1 | 3/2009 | Valaie |
| 2009/0105722 A1 | 4/2009 | Fulkerson |
| 2009/0105737 A1 | 4/2009 | Fulkerson |
| 2009/0131908 A1 | 5/2009 | McKay |
| 2009/0163846 A1 | 6/2009 | Aklog et al. |
| 2009/0171439 A1 | 7/2009 | Nissl |
| 2009/0177206 A1 | 7/2009 | Lozier et al. |
| 2009/0182336 A1 | 7/2009 | Brenzel et al. |
| 2009/0221967 A1 | 9/2009 | Thommen et al. |
| 2009/0270815 A1 | 10/2009 | Stamp et al. |
| 2009/0281610 A1 | 11/2009 | Parker |
| 2009/0292297 A1 | 11/2009 | Ferrere |
| 2009/0292307 A1 | 11/2009 | Razack |
| 2009/0299374 A1 | 12/2009 | Tilson et al. |
| 2009/0299393 A1 | 12/2009 | Martin |
| 2009/0306702 A1 | 12/2009 | Miloslavski |
| 2010/0004607 A1 | 1/2010 | Wilson et al. |
| 2010/0016957 A1 | 1/2010 | Jager et al. |
| 2010/0030186 A1 | 2/2010 | Stivland |
| 2010/0030256 A1 | 2/2010 | Dubrul et al. |
| 2010/0036312 A1 | 2/2010 | Krolik et al. |
| 2010/0087908 A1 | 4/2010 | Hilaire |
| 2010/0114017 A1 | 5/2010 | Lenker |
| 2010/0125326 A1 | 5/2010 | Kalstad |
| 2010/0125327 A1 | 5/2010 | Agnew |
| 2010/0137846 A1 | 6/2010 | Desai et al. |
| 2010/0191272 A1 | 7/2010 | Keating |
| 2010/0211094 A1 | 8/2010 | Sargent, Jr. |
| 2010/0249815 A1 | 9/2010 | Jantzen et al. |
| 2010/0268264 A1 | 10/2010 | Bonnett et al. |
| 2010/0268265 A1 | 10/2010 | Krolik et al. |
| 2010/0292726 A1 | 11/2010 | Olsen et al. |
| 2010/0305566 A1 | 12/2010 | Rosenblatt et al. |
| 2010/0305604 A1 | 12/2010 | Pah |
| 2010/0318178 A1 | 12/2010 | Rapaport et al. |
| 2010/0324649 A1 | 12/2010 | Mattsson |
| 2010/0331949 A1 | 12/2010 | Habib |
| 2011/0009875 A1 | 1/2011 | Grandfield et al. |
| 2011/0009940 A1 | 1/2011 | Grandfield et al. |
| 2011/0009942 A1 | 1/2011 | Gregorich |
| 2011/0022149 A1 | 1/2011 | Cox et al. |
| 2011/0054504 A1 | 3/2011 | Porter |
| 2011/0054514 A1 | 3/2011 | Arcand |
| 2011/0054516 A1 | 3/2011 | Keegan |
| 2011/0060359 A1 | 3/2011 | Hannes |
| 2011/0071432 A1 | 3/2011 | Carrillo, Jr. et al. |
| 2011/0077620 A1 | 3/2011 | deBeer |
| 2011/0098683 A1 | 4/2011 | Wiita et al. |
| 2011/0125181 A1 | 5/2011 | Brady et al. |
| 2011/0130756 A1 | 6/2011 | Everson, Jr. et al. |
| 2011/0152920 A1 | 6/2011 | Eckhouse et al. |
| 2011/0160763 A1 | 6/2011 | Ferrera et al. |

(56) References Cited

U.S. PATENT DOCUMENTS

| | | |
|---|---|---|
| 2011/0166586 A1 | 7/2011 | Sepetka et al. |
| 2011/0196414 A1 | 8/2011 | Porter et al. |
| 2011/0202088 A1 | 8/2011 | Eckhouse et al. |
| 2011/0213290 A1 | 9/2011 | Chin et al. |
| 2011/0213297 A1 | 9/2011 | Aklog et al. |
| 2011/0213393 A1 | 9/2011 | Aklog et al. |
| 2011/0213403 A1 | 9/2011 | Aboytes |
| 2011/0218564 A1 | 9/2011 | Drasler et al. |
| 2011/0224707 A1 | 9/2011 | Miloslavski et al. |
| 2011/0264132 A1 | 10/2011 | Strauss et al. |
| 2011/0276120 A1 | 11/2011 | Gilson et al. |
| 2011/0288529 A1 | 11/2011 | Fulton |
| 2011/0319917 A1 | 12/2011 | Ferrera et al. |
| 2012/0041449 A1 | 2/2012 | Eckhouse et al. |
| 2012/0041474 A1 | 2/2012 | Eckhouse et al. |
| 2012/0059356 A1 | 3/2012 | diPama et al. |
| 2012/0089216 A1 | 4/2012 | Rapaport et al. |
| 2012/0101510 A1 | 4/2012 | Lenker et al. |
| 2012/0116351 A1 | 5/2012 | Chomas et al. |
| 2012/0116440 A1 | 5/2012 | Leynov et al. |
| 2012/0143237 A1 | 6/2012 | Cam et al. |
| 2012/0143239 A1 | 6/2012 | Aklog et al. |
| 2012/0150147 A1 | 6/2012 | Leynov et al. |
| 2012/0165858 A1 | 6/2012 | Eckhouse et al. |
| 2012/0165859 A1 | 6/2012 | Eckhouse et al. |
| 2012/0215250 A1 | 8/2012 | Grandfield et al. |
| 2012/0239022 A1 | 9/2012 | Wolfe |
| 2012/0277788 A1 | 11/2012 | Cattaneo |
| 2012/0283768 A1 | 11/2012 | Cox et al. |
| 2012/0296362 A1 | 11/2012 | Cam et al. |
| 2012/0316600 A1 | 12/2012 | Ferrera et al. |
| 2013/0006284 A1 | 1/2013 | Aggerholm et al. |
| 2013/0030461 A1 | 1/2013 | Marks et al. |
| 2013/0035628 A1 | 2/2013 | Garrison et al. |
| 2013/0046330 A1 | 2/2013 | McIntosh et al. |
| 2013/0046333 A1 | 2/2013 | Jones et al. |
| 2013/0046334 A1 | 2/2013 | Jones et al. |
| 2013/0060234 A1 | 3/2013 | Besser et al. |
| 2013/0116774 A1 | 5/2013 | Strauss et al. |
| 2013/0131614 A1 | 5/2013 | Hassan et al. |
| 2013/0144326 A1 | 6/2013 | Brady et al. |
| 2013/0144328 A1 | 6/2013 | Weber et al. |
| 2013/0158592 A1 | 6/2013 | Porter |
| 2013/0184703 A1 | 7/2013 | Shireman et al. |
| 2013/0184739 A1 | 7/2013 | Brady et al. |
| 2013/0197567 A1 | 8/2013 | Brady et al. |
| 2013/0225934 A1 | 8/2013 | Raybin et al. |
| 2013/0226146 A1 | 8/2013 | Tekulve |
| 2013/0268050 A1 | 10/2013 | Wilson et al. |
| 2013/0281788 A1 | 10/2013 | Garrison |
| 2013/0289697 A1 | 10/2013 | Baker et al. |
| 2013/0304082 A1 | 11/2013 | Aklog et al. |
| 2013/0325055 A1 | 12/2013 | Eckhouse et al. |
| 2013/0325056 A1 | 12/2013 | Eckhouse et al. |
| 2013/0345739 A1 | 12/2013 | Brady et al. |
| 2014/0012281 A1 | 1/2014 | Wang et al. |
| 2014/0046359 A1 | 2/2014 | Bowman et al. |
| 2014/0052097 A1 | 2/2014 | Petersen et al. |
| 2014/0058324 A1 | 2/2014 | Salahieh et al. |
| 2014/0081243 A1 | 3/2014 | Zhou et al. |
| 2014/0121672 A1 | 5/2014 | Folk |
| 2014/0128905 A1 | 5/2014 | Molaei |
| 2014/0135812 A1 | 5/2014 | Divino et al. |
| 2014/0148889 A1 | 5/2014 | Deshmukh et al. |
| 2014/0180377 A1 | 6/2014 | Bose et al. |
| 2014/0188127 A1 | 7/2014 | Dubrul et al. |
| 2014/0194919 A1 | 7/2014 | Losardo et al. |
| 2014/0200607 A1 | 7/2014 | Sepetka et al. |
| 2014/0200608 A1 | 7/2014 | Brady et al. |
| 2014/0236220 A1 | 8/2014 | Inoue |
| 2014/0257018 A1 | 9/2014 | Farnan |
| 2014/0257362 A1 | 9/2014 | Eldenschink |
| 2014/0276840 A1 | 9/2014 | Richter et al. |
| 2014/0276922 A1 | 9/2014 | McLain et al. |
| 2014/0277003 A1 | 9/2014 | Hendrick |
| 2014/0277015 A1 | 9/2014 | Stinis |
| 2014/0277053 A1 | 9/2014 | Wang et al. |
| 2014/0277079 A1 | 9/2014 | Vale et al. |
| 2014/0309657 A1 | 10/2014 | Ben-Ami |
| 2014/0309673 A1 | 10/2014 | Dacuycuy et al. |
| 2014/0330302 A1 | 11/2014 | Tekulve et al. |
| 2014/0343585 A1 | 11/2014 | Ferrera et al. |
| 2014/0364896 A1 | 12/2014 | Consigny |
| 2014/0371769 A1 | 12/2014 | Vale et al. |
| 2014/0371777 A1 | 12/2014 | Rudakov et al. |
| 2014/0371779 A1 | 12/2014 | Vale et al. |
| 2014/0371780 A1 | 12/2014 | Vale et al. |
| 2014/0379023 A1 | 12/2014 | Brady et al. |
| 2015/0018859 A1 | 1/2015 | Quick et al. |
| 2015/0018860 A1 | 1/2015 | Quick et al. |
| 2015/0039020 A1 | 2/2015 | Cragg et al. |
| 2015/0080937 A1 | 3/2015 | Davidson |
| 2015/0081003 A1 | 3/2015 | Wainwright et al. |
| 2015/0112376 A1 | 4/2015 | Molaei et al. |
| 2015/0133988 A1 | 5/2015 | Chuter |
| 2015/0133990 A1 | 5/2015 | Davidson |
| 2015/0142043 A1 | 5/2015 | Furey |
| 2015/0157344 A1 | 6/2015 | Tah et al. |
| 2015/0164523 A1 | 6/2015 | Brady et al. |
| 2015/0173782 A1 | 6/2015 | Garrison et al. |
| 2015/0173783 A1 | 6/2015 | Tah et al. |
| 2015/0238314 A1 | 8/2015 | Börtlein et al. |
| 2015/0250497 A1 | 9/2015 | Marks et al. |
| 2015/0257775 A1 | 9/2015 | Gilvarry et al. |
| 2015/0258270 A1 | 9/2015 | Kunis |
| 2015/0265329 A1 | 9/2015 | Lalonde et al. |
| 2015/0289902 A1 | 10/2015 | Hehrlein |
| 2015/0290437 A1 | 10/2015 | Rudakov et al. |
| 2015/0297252 A1 | 10/2015 | Miloslavski et al. |
| 2015/0306311 A1 | 10/2015 | Pinchuk et al. |
| 2015/0313617 A1 | 11/2015 | Grandfield et al. |
| 2015/0320431 A1 | 11/2015 | Ulm |
| 2015/0343178 A1 | 12/2015 | Fulton, III |
| 2015/0351770 A1 | 12/2015 | Fulton, III |
| 2015/0352325 A1 | 12/2015 | Quick |
| 2015/0359547 A1 | 12/2015 | Vale et al. |
| 2015/0374391 A1 | 12/2015 | Quick et al. |
| 2015/0374393 A1 | 12/2015 | Brady et al. |
| 2015/0374479 A1 | 12/2015 | Vale |
| 2016/0015402 A1 | 1/2016 | Brady et al. |
| 2016/0022296 A1 | 1/2016 | Brady et al. |
| 2016/0066921 A1 | 3/2016 | Brady et al. |
| 2016/0067461 A1 | 3/2016 | Gelbart |
| 2016/0074067 A1 | 3/2016 | Furnish et al. |
| 2016/0106448 A1 | 4/2016 | Brady et al. |
| 2016/0106449 A1 | 4/2016 | Brady et al. |
| 2016/0113663 A1 | 4/2016 | Brady et al. |
| 2016/0113664 A1 | 4/2016 | Brady et al. |
| 2016/0113665 A1 | 4/2016 | Brady et al. |
| 2016/0120558 A1 | 5/2016 | Brady et al. |
| 2016/0121080 A1 | 5/2016 | Cottone |
| 2016/0135829 A1 | 5/2016 | Holochwost et al. |
| 2016/0143653 A1 | 5/2016 | Vale et al. |
| 2016/0151079 A1 | 6/2016 | Aklog et al. |
| 2016/0192953 A1 | 7/2016 | Brady et al. |
| 2016/0192954 A1 | 7/2016 | Brady et al. |
| 2016/0192955 A1 | 7/2016 | Brady et al. |
| 2016/0192956 A1 | 7/2016 | Brady et al. |
| 2016/0193457 A1 | 7/2016 | Arnholt et al. |
| 2016/0228134 A1 | 8/2016 | Martin et al. |
| 2016/0256180 A1 | 9/2016 | Vale et al. |
| 2016/0262880 A1 | 9/2016 | Li et al. |
| 2016/0317168 A1 | 11/2016 | Brady et al. |
| 2016/0346002 A1 | 12/2016 | Avneri et al. |
| 2017/0007264 A1 | 1/2017 | Cruise et al. |
| 2017/0007265 A1 | 1/2017 | Guo et al. |
| 2017/0020670 A1 | 1/2017 | Murray et al. |
| 2017/0020700 A1 | 1/2017 | Bienvenu et al. |
| 2017/0027640 A1 | 2/2017 | Kunis et al. |
| 2017/0027692 A1 | 2/2017 | Bonhoeffer et al. |
| 2017/0027725 A1 | 2/2017 | Argentine |
| 2017/0035436 A1 | 2/2017 | Morita |
| 2017/0035567 A1 | 2/2017 | Duffy |
| 2017/0042548 A1 | 2/2017 | Lam |

(56) References Cited

U.S. PATENT DOCUMENTS

| | | |
|---|---|---|
| 2017/0049596 A1 | 2/2017 | Schabert |
| 2017/0065401 A1 | 3/2017 | Fearnot et al. |
| 2017/0071614 A1 | 3/2017 | Vale et al. |
| 2017/0071737 A1 | 3/2017 | Kelley |
| 2017/0072452 A1 | 3/2017 | Monetti et al. |
| 2017/0079671 A1 | 3/2017 | Morero et al. |
| 2017/0079680 A1 | 3/2017 | Bowman |
| 2017/0079766 A1 | 3/2017 | Wang et al. |
| 2017/0079767 A1 | 3/2017 | Leon-Yip |
| 2017/0079812 A1 | 3/2017 | Lam et al. |
| 2017/0079817 A1 | 3/2017 | Sepetka et al. |
| 2017/0079819 A1 | 3/2017 | Pung et al. |
| 2017/0079820 A1 | 3/2017 | Lam et al. |
| 2017/0086851 A1 | 3/2017 | Wallace et al. |
| 2017/0086862 A1 | 3/2017 | Vale et al. |
| 2017/0086863 A1 | 3/2017 | Brady et al. |
| 2017/0086864 A1 | 3/2017 | Greenhalgh et al. |
| 2017/0086996 A1 | 3/2017 | Peterson et al. |
| 2017/0095138 A1 | 4/2017 | Nakade et al. |
| 2017/0095259 A1 | 4/2017 | Tompkins et al. |
| 2017/0100126 A1 | 4/2017 | Bowman et al. |
| 2017/0100141 A1 | 4/2017 | Morero et al. |
| 2017/0100142 A1 | 4/2017 | Look et al. |
| 2017/0100143 A1 | 4/2017 | Granfield |
| 2017/0100183 A1 | 4/2017 | Iaizzo et al. |
| 2017/0105743 A1 | 4/2017 | Vale et al. |
| 2017/0112515 A1 | 4/2017 | Brady et al. |
| 2017/0113023 A1 | 4/2017 | Steingisser et al. |
| 2017/0113026 A1 | 4/2017 | Finch |
| 2017/0136158 A1 | 5/2017 | Culhane et al. |
| 2017/0147765 A1 | 5/2017 | Mehta |
| 2017/0151032 A1 | 6/2017 | Loisel |
| 2017/0165062 A1 | 6/2017 | Rothstein |
| 2017/0165065 A1 | 6/2017 | Rothstein et al. |
| 2017/0165454 A1 | 6/2017 | Tuohy et al. |
| 2017/0172554 A1 | 6/2017 | Bortlein et al. |
| 2017/0172581 A1 | 6/2017 | Bose et al. |
| 2017/0172766 A1 | 6/2017 | Vong et al. |
| 2017/0172772 A1 | 6/2017 | Khenansho |
| 2017/0189033 A1 | 7/2017 | Sepetka et al. |
| 2017/0189035 A1 | 7/2017 | Porter |
| 2017/0215900 A1 | 8/2017 | Lowinger et al. |
| 2017/0215902 A1 | 8/2017 | Leynov et al. |
| 2017/0216484 A1 | 8/2017 | Cruise et al. |
| 2017/0224350 A1 | 8/2017 | Shimizu et al. |
| 2017/0224355 A1 | 8/2017 | Bowman et al. |
| 2017/0224467 A1 | 8/2017 | Piccagli et al. |
| 2017/0224511 A1 | 8/2017 | Dwork et al. |
| 2017/0224953 A1 | 8/2017 | Tran et al. |
| 2017/0231749 A1 | 8/2017 | Perkins et al. |
| 2017/0238953 A1 | 8/2017 | Yang et al. |
| 2017/0239447 A1 | 8/2017 | Yang et al. |
| 2017/0252043 A1 | 9/2017 | Fuller et al. |
| 2017/0252064 A1 | 9/2017 | Staunton |
| 2017/0259042 A1 | 9/2017 | Nguyen et al. |
| 2017/0265983 A1 | 9/2017 | Lam et al. |
| 2017/0281192 A1 | 10/2017 | Tieu et al. |
| 2017/0281331 A1 | 10/2017 | Perkins et al. |
| 2017/0281344 A1 | 10/2017 | Costello |
| 2017/0281909 A1 | 10/2017 | Northrop et al. |
| 2017/0281912 A1 | 10/2017 | Melder et al. |
| 2017/0290593 A1 | 10/2017 | Sethna |
| 2017/0290654 A1 | 10/2017 | Sethna |
| 2017/0296324 A1 | 10/2017 | Argentine |
| 2017/0296325 A1 | 10/2017 | Marrocco et al. |
| 2017/0303939 A1 | 10/2017 | Greenhalgh et al. |
| 2017/0303942 A1 | 10/2017 | Greenhalgh et al. |
| 2017/0303947 A1 | 10/2017 | Greenhalgh et al. |
| 2017/0303948 A1 | 10/2017 | Wallace et al. |
| 2017/0304041 A1 | 10/2017 | Argentine |
| 2017/0304097 A1 | 10/2017 | Corwin et al. |
| 2017/0304595 A1 | 10/2017 | Nagasrinivasa et al. |
| 2017/0312109 A1 | 11/2017 | Le |
| 2017/0312484 A1 | 11/2017 | Shipley et al. |
| 2017/0316561 A1 | 11/2017 | Helm et al. |
| 2017/0319826 A1 | 11/2017 | Bowman et al. |
| 2017/0333228 A1 | 11/2017 | Orth et al. |
| 2017/0333236 A1 | 11/2017 | Greenan |
| 2017/0333678 A1 | 11/2017 | Bowman et al. |
| 2017/0340383 A1 | 11/2017 | Bloom et al. |
| 2017/0348014 A1 | 12/2017 | Wallace et al. |
| 2017/0348514 A1 | 12/2017 | Guyon et al. |
| 2018/0008407 A1 | 1/2018 | Maimon et al. |
| 2018/0042623 A1 | 2/2018 | Batiste |
| 2018/0064526 A1 | 3/2018 | Walzman |
| 2018/0132896 A1 | 5/2018 | Begg |
| 2018/0140315 A1 | 5/2018 | Bowman et al. |
| 2018/0193050 A1 | 7/2018 | Hawkins et al. |
| 2018/0193591 A1 | 7/2018 | Jaroch et al. |
| 2018/0235644 A1 | 8/2018 | Jaffe et al. |
| 2018/0235743 A1 | 8/2018 | Farago et al. |
| 2018/0256177 A1 | 9/2018 | Cooper et al. |
| 2018/0303609 A1 | 10/2018 | Kenny et al. |
| 2018/0303610 A1 | 10/2018 | Anderson |
| 2018/0368965 A1 | 12/2018 | Janardhan et al. |
| 2019/0000492 A1 | 1/2019 | Casey et al. |
| 2019/0021755 A1 | 1/2019 | Johnson et al. |
| 2019/0021759 A1 | 1/2019 | Krolik et al. |
| 2019/0029820 A1 | 1/2019 | Zhou et al. |
| 2019/0029825 A1 | 1/2019 | Fitterer et al. |
| 2019/0046219 A1 | 2/2019 | Marchand et al. |
| 2019/0192175 A1 | 6/2019 | Chida et al. |
| 2019/0209206 A1 | 7/2019 | Patel et al. |
| 2019/0216476 A1 | 7/2019 | Barry et al. |
| 2019/0239907 A1 | 8/2019 | Brady et al. |
| 2019/0247627 A1 | 8/2019 | Korkuch et al. |
| 2019/0255290 A1 | 8/2019 | Snyder et al. |
| 2019/0269491 A1 | 9/2019 | Jalgaonkar et al. |
| 2019/0274810 A1 | 9/2019 | Phouasalit et al. |
| 2019/0298396 A1 | 10/2019 | Gamba et al. |
| 2019/0343614 A1 | 11/2019 | Walzman |
| 2019/0365411 A1 | 12/2019 | Avneri et al. |
| 2019/0366049 A1 | 12/2019 | Hannon et al. |
| 2020/0038628 A1 | 2/2020 | Chou et al. |
| 2020/0069912 A1 | 3/2020 | Tateshima |
| 2020/0078571 A1 | 3/2020 | Kirt et al. |
| 2020/0155180 A1* | 5/2020 | Follmer ............ A61M 39/1011 |
| 2020/0170662 A1 | 6/2020 | Vardi et al. |
| 2020/0214859 A1 | 7/2020 | Sherburne |
| 2020/0281611 A1 | 9/2020 | Kelly et al. |
| 2020/0281612 A1 | 9/2020 | Kelly et al. |
| 2020/0345978 A1 | 11/2020 | Jalgaonkar |
| 2020/0353208 A1 | 11/2020 | Merhi et al. |
| 2020/0383698 A1 | 12/2020 | Miao et al. |
| 2021/0068854 A1 | 3/2021 | Wallace et al. |
| 2021/0085935 A1 | 3/2021 | Fahey et al. |
| 2021/0128184 A1 | 5/2021 | Fulkerson et al. |
| 2021/0128185 A1 | 5/2021 | Nguyen et al. |
| 2021/0153883 A1 | 5/2021 | Casey et al. |
| 2021/0153884 A1 | 5/2021 | Casey et al. |
| 2021/0154433 A1 | 5/2021 | Casey et al. |
| 2021/0186541 A1 | 6/2021 | Thress |
| 2021/0186547 A1 | 6/2021 | Kassab et al. |
| 2021/0219821 A1 | 7/2021 | Appling et al. |
| 2021/0228223 A1 | 7/2021 | Casey et al. |
| 2021/0236257 A1 | 8/2021 | Walzman |
| 2021/0275197 A1 | 9/2021 | Vale et al. |
| 2021/0307766 A1 | 10/2021 | Keating et al. |
| 2021/0393277 A1 | 12/2021 | Vale et al. |
| 2022/0117614 A1 | 4/2022 | Salmon et al. |
| 2022/0125450 A1 | 4/2022 | Sirhan et al. |
| 2022/0211397 A1 | 7/2022 | Nicholson et al. |
| 2022/0280173 A1 | 9/2022 | Ngo et al. |
| 2022/0313426 A1 | 10/2022 | Gifford, III et al. |
| 2022/0395667 A1 | 12/2022 | Keating et al. |
| 2023/0054898 A1 | 2/2023 | Gurovich et al. |
| 2023/0076384 A1 | 3/2023 | Cummings et al. |
| 2023/0095102 A1 | 3/2023 | Vale et al. |
| 2023/0132996 A1 | 5/2023 | Stefanov |
| 2023/0137418 A1 | 5/2023 | Kelly et al. |
| 2023/0140794 A1 | 5/2023 | Keating et al. |

(56) References Cited

U.S. PATENT DOCUMENTS

| | | | |
|---|---|---|---|
| 2024/0100298 A1 | 3/2024 | Keating et al. | |
| 2024/0237996 A1 | 7/2024 | Maeda et al. | |

FOREIGN PATENT DOCUMENTS

| | | | |
|---|---|---|---|
| CN | 1972728 | A | 5/2007 |
| CN | 103071195 | A | 5/2013 |
| CN | 104507380 | A | 4/2015 |
| CN | 104905873 | A | 9/2015 |
| CN | 105007973 | A | 10/2015 |
| CN | 204709619 | U | 10/2015 |
| CN | 105307582 | A | 2/2016 |
| CN | 105662647 | A | 6/2016 |
| CN | 105726163 | A | 7/2016 |
| CN | 106232059 | A | 12/2016 |
| CN | 109862835 | A | 6/2019 |
| CN | 113040865 | A | 6/2021 |
| DE | 20 2009 001 951 | U1 | 4/2010 |
| DE | 10 2009 056 450 | A1 | 6/2011 |
| DE | 10 2010 010 849 | A1 | 9/2011 |
| DE | 10 2010 014 778 | A1 | 10/2011 |
| DE | 10 2010 024 085 | A1 | 12/2011 |
| DE | 10 2011 014 586 | B3 | 9/2012 |
| DE | 20 2020 107013 | U1 | 1/2021 |
| EP | 2301450 | A1 | 3/2011 |
| EP | 2628455 | A1 | 8/2013 |
| EP | 3302312 | A1 | 4/2018 |
| EP | 3335647 | A2 | 6/2018 |
| EP | 3 420 978 | A1 | 1/2019 |
| EP | 4049704 | A2 | 8/2022 |
| GB | 2498349 | A | 7/2013 |
| JP | H02-130601 | U | 10/1990 |
| JP | 9-19438 | A | 1/1997 |
| JP | 2001-321447 | A | 11/2001 |
| JP | 2006-026423 | A | 2/2006 |
| JP | 2018501038 | A | 1/2018 |
| JP | 2018-171349 | A | 11/2018 |
| WO | WO 93/04722 | A2 | 3/1993 |
| WO | 94/24926 | A1 | 11/1994 |
| WO | 97/14466 | A1 | 4/1997 |
| WO | 97/27808 | A1 | 8/1997 |
| WO | 97/38631 | A1 | 10/1997 |
| WO | 99/20335 | A1 | 4/1999 |
| WO | WO 99/16499 | A1 | 4/1999 |
| WO | 99/56801 | A2 | 11/1999 |
| WO | 99/60933 | A1 | 12/1999 |
| WO | 00/33907 | A1 | 6/2000 |
| WO | 01/21077 | A1 | 3/2001 |
| WO | 02/02162 | A2 | 1/2002 |
| WO | 02/11627 | A2 | 2/2002 |
| WO | 02/43616 | A2 | 6/2002 |
| WO | 02/070061 | A1 | 9/2002 |
| WO | 02/094111 | A2 | 11/2002 |
| WO | 03/002006 | A1 | 1/2003 |
| WO | 03/018085 | A2 | 3/2003 |
| WO | 03/030751 | A1 | 4/2003 |
| WO | 03/051448 | A2 | 6/2003 |
| WO | 2004/028571 | A1 | 4/2004 |
| WO | 2004/056275 | A1 | 7/2004 |
| WO | 2005/000130 | A1 | 1/2005 |
| WO | 2005/027779 | A2 | 3/2005 |
| WO | WO 2005/027751 | A1 | 3/2005 |
| WO | 2006/021407 | A2 | 3/2006 |
| WO | 2006/031410 | A2 | 3/2006 |
| WO | 2006/107641 | A2 | 10/2006 |
| WO | 2006/135823 | A2 | 12/2006 |
| WO | 2007/054307 | A2 | 5/2007 |
| WO | 2007/068424 | A2 | 6/2007 |
| WO | 2008/034615 | A2 | 3/2008 |
| WO | 2008/051431 | A1 | 5/2008 |
| WO | 2008/131116 | A1 | 10/2008 |
| WO | WO 2009/019664 | A1 | 2/2009 |
| WO | 2009/031338 | A1 | 3/2009 |
| WO | 2009/076482 | A1 | 6/2009 |
| WO | 2009/086482 | A2 | 7/2009 |
| WO | 2009/105710 | A1 | 8/2009 |
| WO | WO 2009/103125 | A1 | 8/2009 |
| WO | 2010/010545 | A1 | 1/2010 |
| WO | 2010/046897 | A1 | 4/2010 |
| WO | 2010/075565 | A1 | 7/2010 |
| WO | 2010/102307 | A1 | 9/2010 |
| WO | 2010/146581 | A1 | 12/2010 |
| WO | 2011/013556 | A1 | 2/2011 |
| WO | 2011/066961 | A1 | 6/2011 |
| WO | 2011/082319 | A1 | 7/2011 |
| WO | 2011/095352 | A1 | 8/2011 |
| WO | 2011/106426 | A1 | 9/2011 |
| WO | 2011/110316 | A1 | 9/2011 |
| WO | 2012/052982 | A1 | 4/2012 |
| WO | 2012/064726 | A1 | 5/2012 |
| WO | 2012/081020 | A1 | 6/2012 |
| WO | 2012/110619 | A1 | 8/2012 |
| WO | 2012/120490 | A2 | 9/2012 |
| WO | 2012/156924 | A1 | 11/2012 |
| WO | 2013/016435 | A1 | 1/2013 |
| WO | 2013/072777 | A2 | 5/2013 |
| WO | 2013/105099 | A2 | 7/2013 |
| WO | 2013/109756 | A2 | 7/2013 |
| WO | 2014/081892 | A1 | 5/2014 |
| WO | 2014/139845 | A1 | 9/2014 |
| WO | 2014/169266 | A1 | 10/2014 |
| WO | 2014/178198 | A1 | 11/2014 |
| WO | WO 2014/188300 | A1 | 11/2014 |
| WO | 2015/061365 | A1 | 4/2015 |
| WO | 2015/134625 | A1 | 9/2015 |
| WO | 2015/179324 | A2 | 11/2015 |
| WO | WO 2015/179377 | A1 | 11/2015 |
| WO | 2015/189354 | A1 | 12/2015 |
| WO | 2016/010995 | A1 | 1/2016 |
| WO | WO 2017/004234 | A1 | 1/2017 |
| WO | WO 2017/097616 | A1 | 6/2017 |
| WO | WO 2018/011627 | A1 | 1/2018 |
| WO | 2018/033401 | A1 | 2/2018 |
| WO | 2018/193603 | A1 | 10/2018 |
| WO | WO 2018/178979 | A1 | 10/2018 |
| WO | WO 2019/064306 | A1 | 4/2019 |
| WO | WO 2019/079296 | A1 | 4/2019 |
| WO | WO 2020/139979 | A1 | 7/2020 |
| WO | WO 2021/016213 | A1 | 1/2021 |
| WO | WO 2021/162678 | A1 | 8/2021 |
| WO | WO 2021/167653 | A1 | 8/2021 |
| WO | WO 2022/020366 | A2 | 1/2022 |
| WO | 2022/074423 | A1 | 4/2022 |
| WO | WO 2022/081710 | A1 | 4/2022 |
| WO | 2022/123565 | A1 | 6/2022 |

OTHER PUBLICATIONS

Struffert, T., et al. "Intravenous flat detector CT angiography for non-invasive visualisation of intracranial flow diverter: technical feasibility" Eur Radiol 21:1797-1801 (2011).

Extended European Search Report issued in corresponding EP Patent Application No. 20 21 0073 dated Apr. 8, 2021.

Chinese Search Report dated Jun. 17, 2025, in corresponding CN Appln. No. 202011357283.7, and submitted English Translation herewith.

* cited by examiner

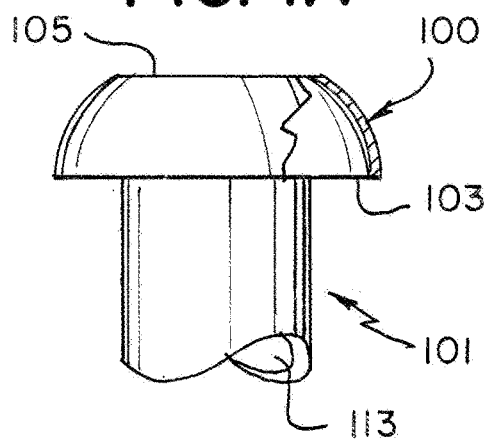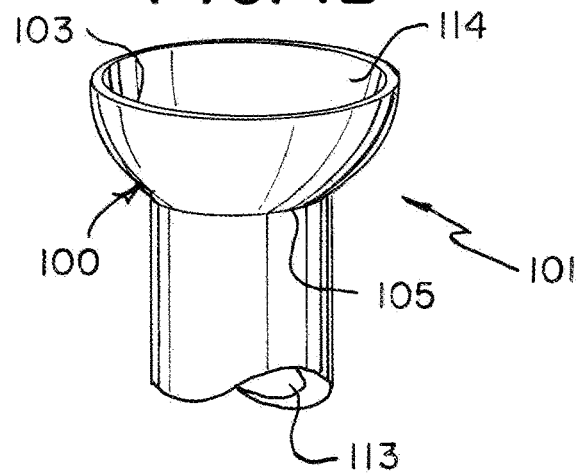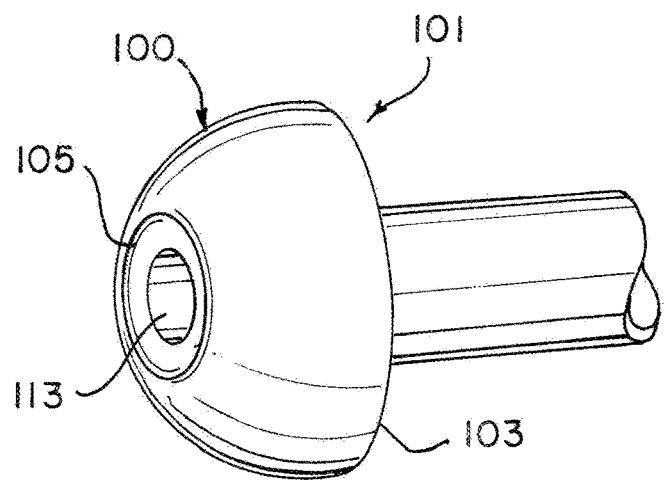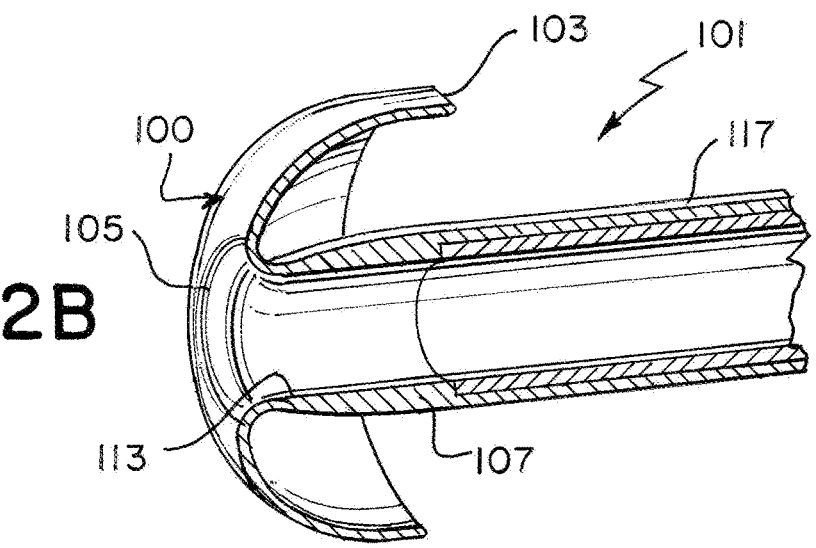

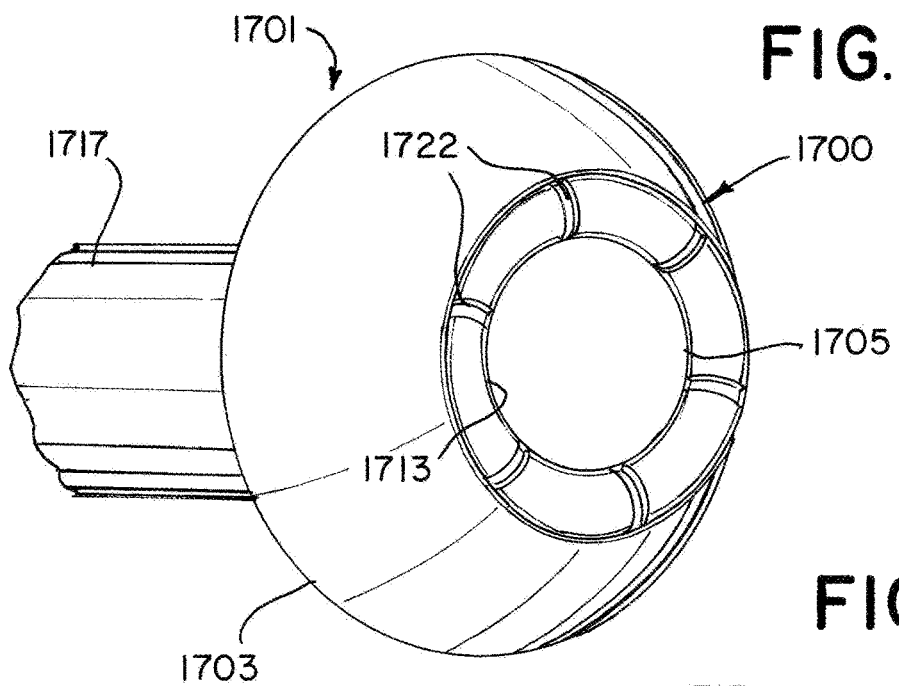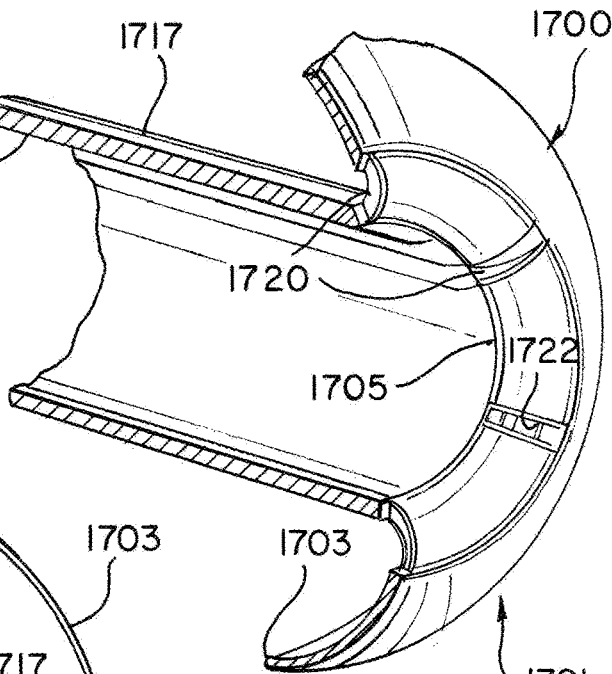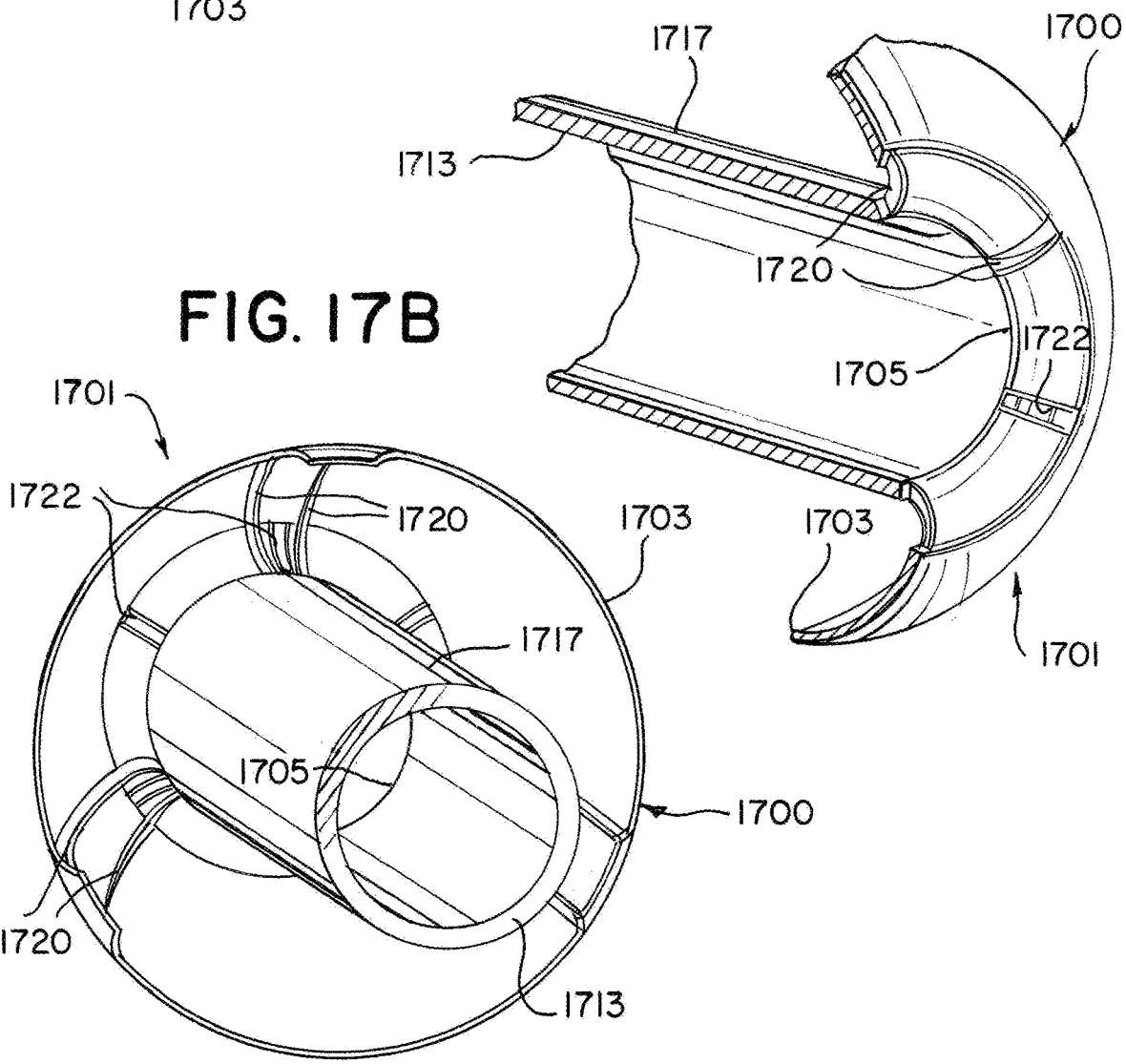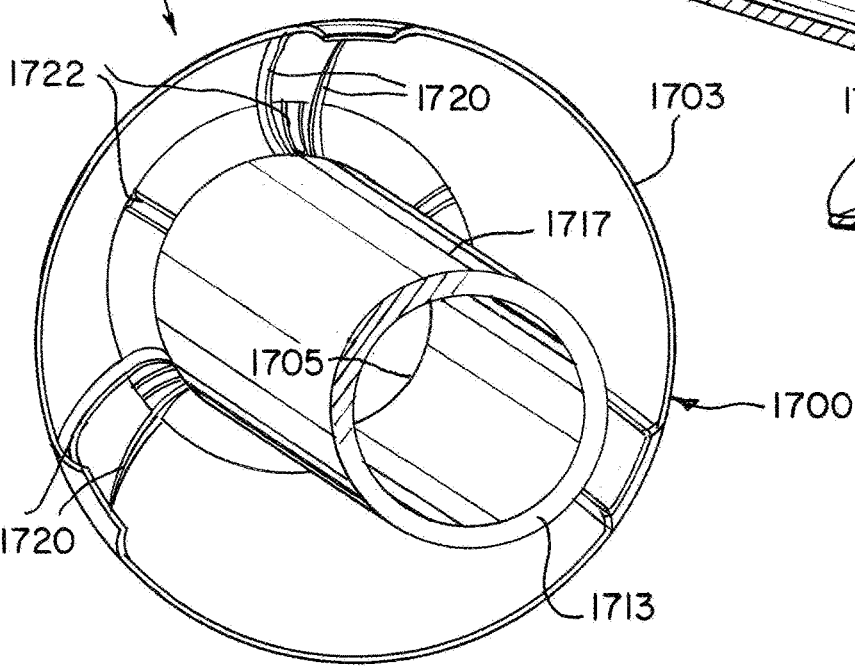
FIG. 17A
FIG. 17B
FIG. 17C

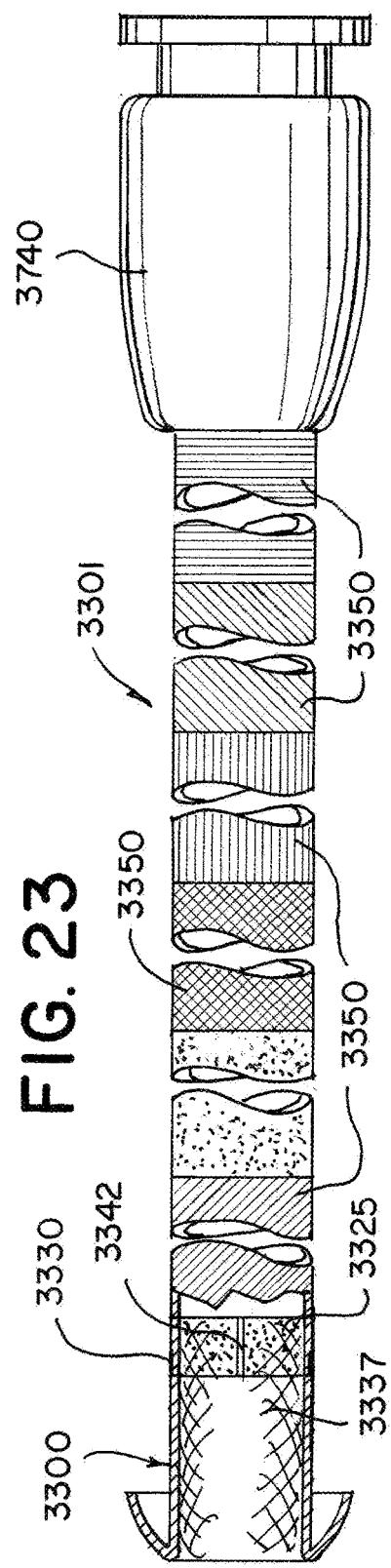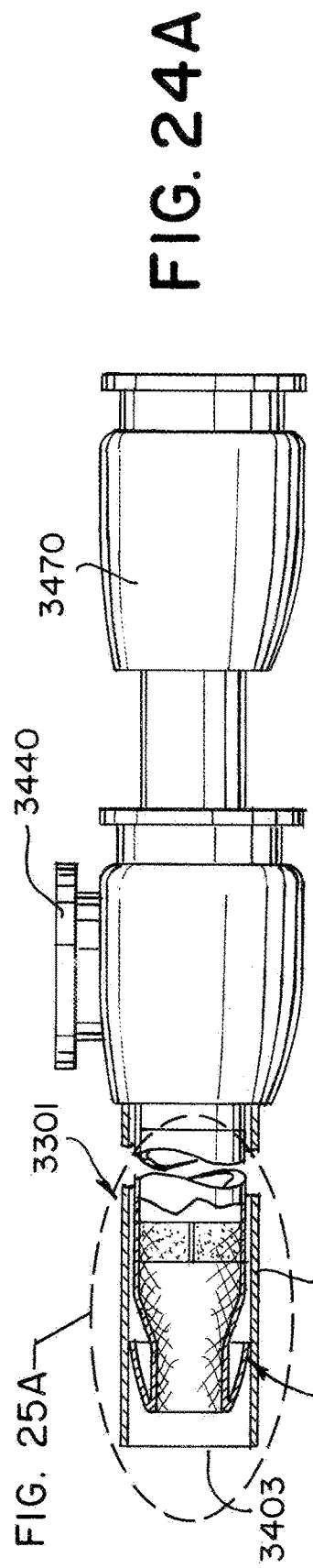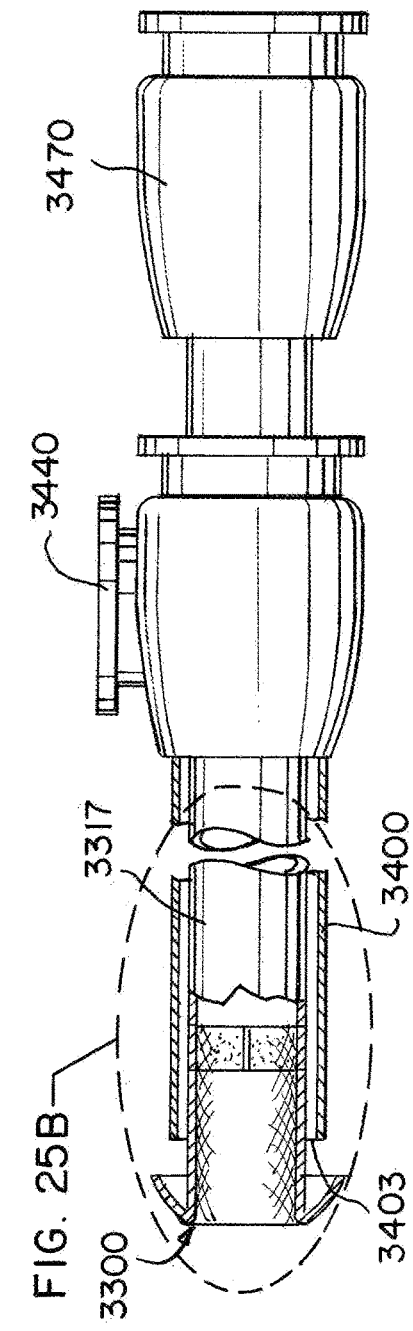

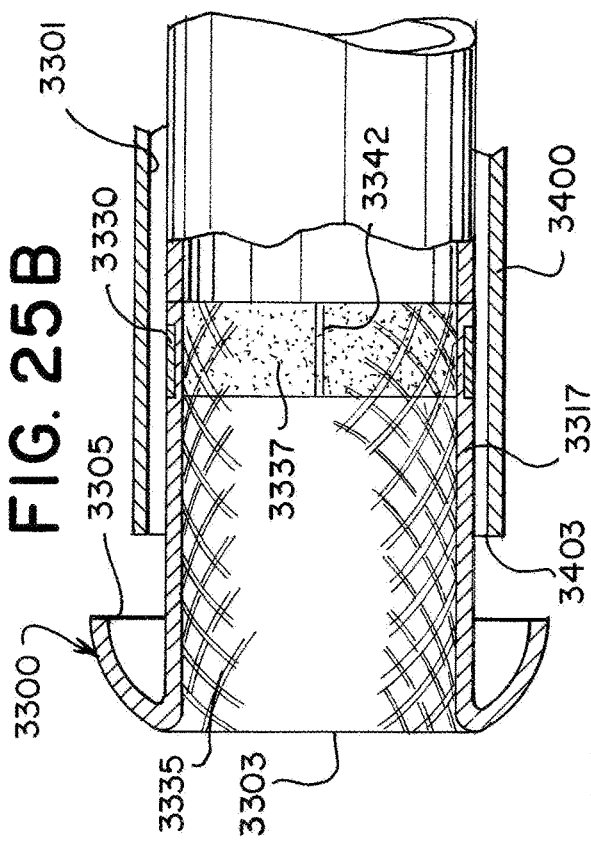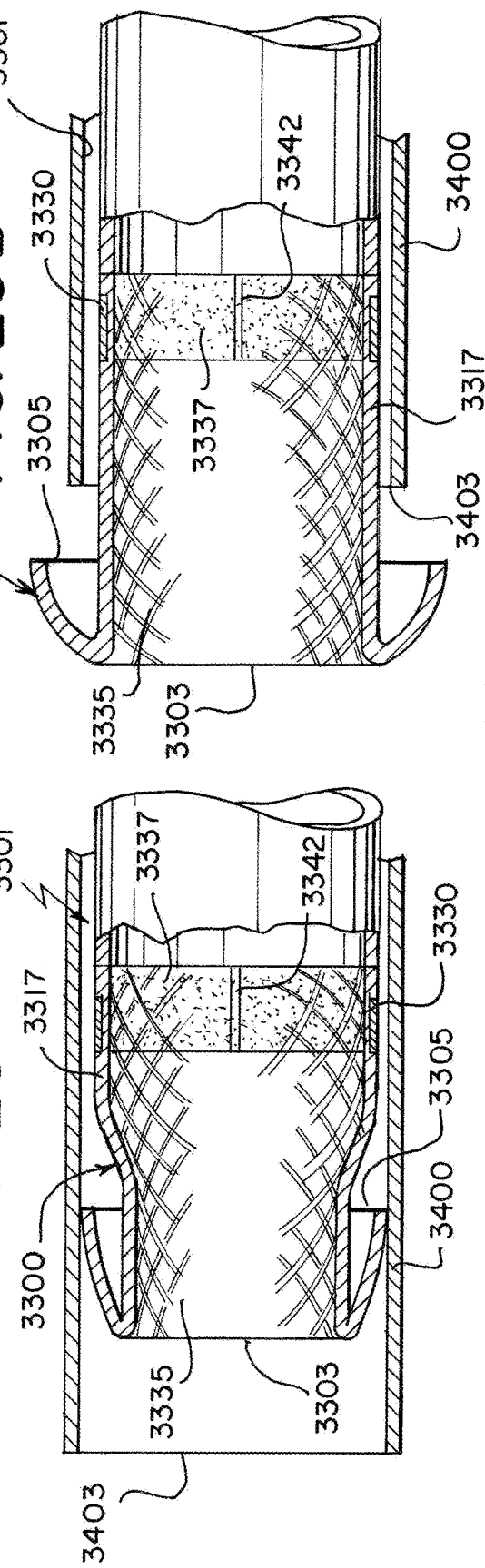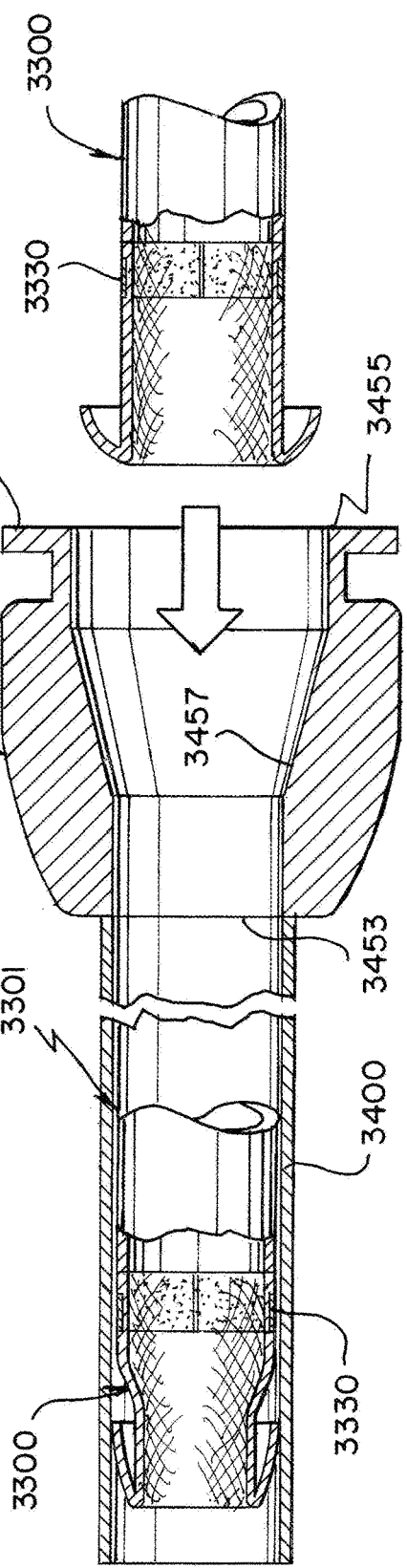

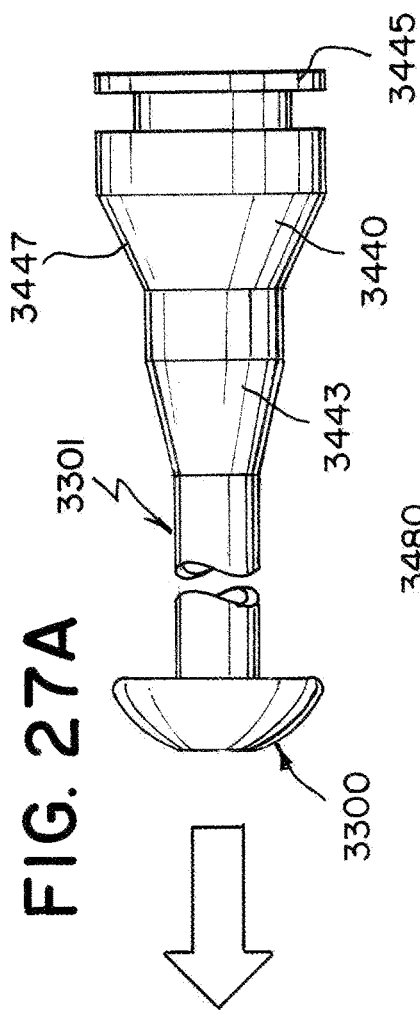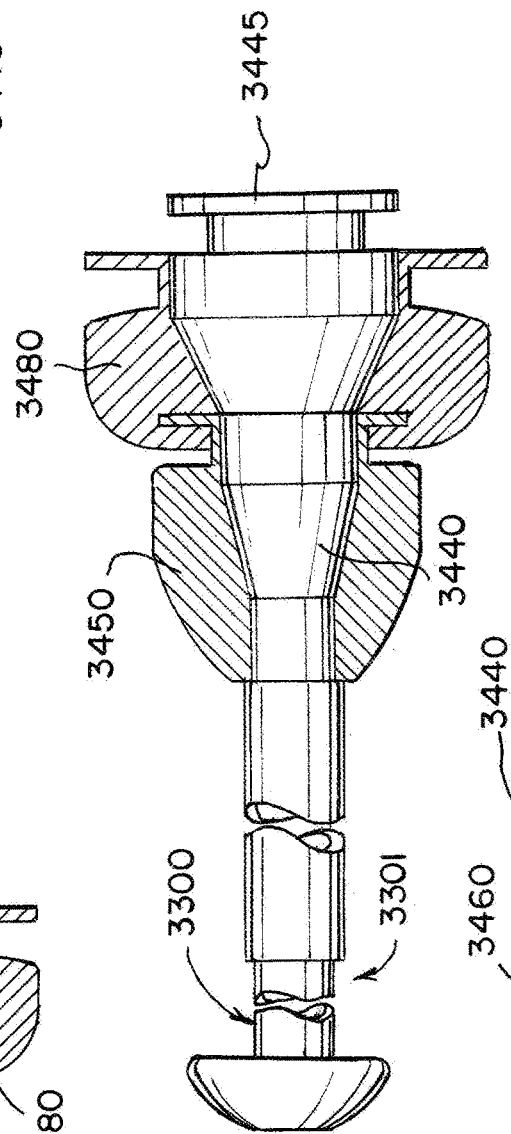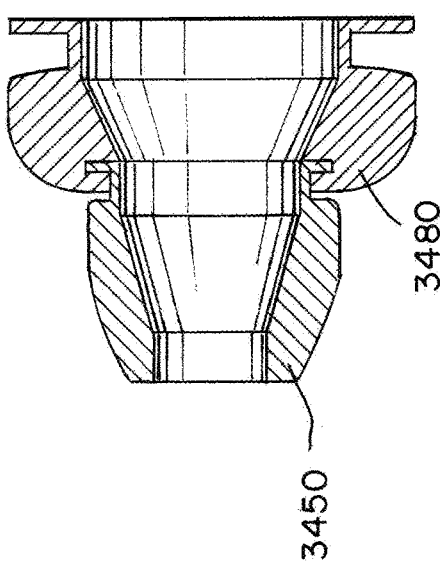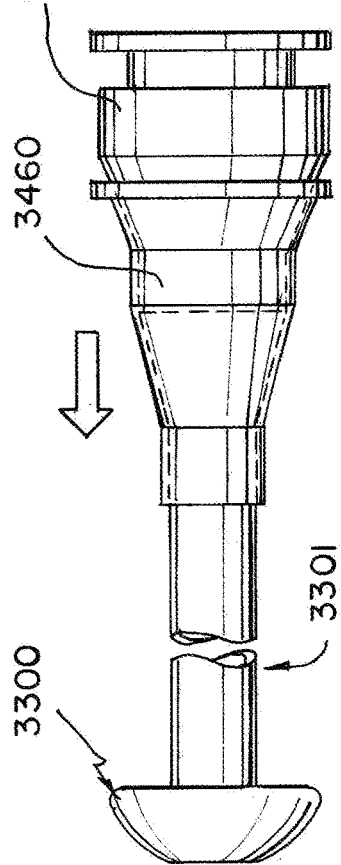

ASPIRATION CATHETER, SYSTEMS, AND METHODS THEREOF

CROSS-REFERENCE TO RELATED APPLICATIONS

This application claims priority to U.S. provisional patent application No. 62/941,414 filed Nov. 27, 2019, the contents of which are incorporated herein by reference in their entirety as if set forth verbatim.

FIELD

The present disclosure generally relates devices and methods for removing acute blockages from blood vessels during intravascular medical treatments. More specifically, the present disclosure relates to an aspiration catheter.

BACKGROUND

Clot retrieval catheters and devices are used in mechanical thrombectomy for endovascular intervention, often in cases where patients are suffering from conditions such as acute ischemic stroke (AIS), myocardial infarction (MI), and pulmonary embolism (PE). Accessing the neurovascular bed in particular is challenging with conventional technology, as the target vessels are small in diameter, remote relative to the site of insertion, and are highly tortuous. Traditional devices are often either too large in profile, lack the deliverability and flexibility needed to navigate tortuous vessels, or are not effective at removing a clot when delivered to the target site.

The clot itself can complicate procedures by taking on a number of complex morphologies and consistencies, ranging from simple tube-shaped structures which assume the shape of the vessel to long, strand-like arrangements that can span multiple vessels at one time. The age of a clot can also affect its compliance, with older clots tending to be less compressible than fresh clots. Experience has also demonstrated that depending on the nature of the interaction with a clot retrieval device, the mechanical properties of a clot can be affected in a significant way. Additionally, several mechanisms play a role in strongly adhering the clot to the vessel wall. Breaking these bonds without damaging fragile neurovascular vessels is a significant challenge.

The delivery of effective devices to the small and highly-branched cerebral artery system remains challenging, and conventional clot retrieval catheters suffer from a number of drawbacks. First, the diameters of catheters themselves must be small enough to avoid causing significant discomfort to the patient. The retrieval catheter must also be sufficiently flexible to navigate the vasculature and endure high strains, while also having the axial stiffness to offer smooth advancement along the route. Once at the target site, typical objects to be retrieved from the body are substantially larger in size than the catheter tip, making it more difficult to retrieve objects into the tip. For example, firm, fibrin-rich clots can often be difficult to extract as they can become lodged in the tip of traditional fixed-mouth catheters. Additionally, this lodging can cause softer portions to shear away from the firmer regions of the clot.

Small diameters and fixed tip sizes are also less efficient at directing the aspiration necessary to remove blood and thrombus material during the procedure. The suction must be strong enough such that any fragmentation that may occur as a result of aspiration or the use of a mechanical thrombectomy device can be held stationary so that fragments cannot migrate and occlude distal vessels. However, when aspirating with a fixed-mouth catheter, a significant portion of the aspiration flow ends up coming from vessel fluid proximal to the tip of the catheter, where there is no clot. This significantly reduces aspiration efficiency, lowering the success rate of clot removal.

Any catheter design attempting to overcome these challenges with an expanding distal tip or structure would need to have the strength to grip the clot and exert a steady radial force in the expanded state. The same structure would also need to be sufficiently flexible and elastic to survive the severe mechanical strains imparted when navigating the tortuous vasculature when in a collapsed state.

The present solution resolves these and other problems of the art.

SUMMARY

It is an object of the present design to provide systems, devices, and methods to meet the above-stated needs. It is therefore desirable for an aspiration clot retrieval catheter to have a clot-facing mouth for aspiration efficiency and easy retrieval of the clot while also having a collapsed state that is low-profile and sufficiently flexible in multiple directions for deliverability to the target site. The body of the catheter can also incorporate deliverability enhancements over existing designs to facilitate operation.

In some examples, an aspiration catheter is disclosed including a catheter body with a proximal end and a distal end. A distal tip section can be disposed on or adjacent the distal end, the distal tip section being invertible about a transition between the catheter body and the distal tip section between a first configuration and a second configuration. Retracting the distal tip section causes the distal tip section to invert about the transition from the first to the second configuration, the second configuration comprising an expansile tip with an open funnel-like distal mouth comprising a larger diameter than a diameter of the transition.

In some examples, the distal tip section comprises a collapsed configuration within a guide catheter.

In some examples, the first and second configurations are part of an expanded configuration of the distal tip section being distal of a guide catheter or a sheath.

In some examples, the distal tip section comprises a mushroom-shaped section configured to be inverted into the second configuration and form the open funnel-like distal mouth.

In some examples, the distal tip section being shaped and configured to reduce clot shear in the first configuration.

In some examples, the distal tip section includes a plurality of sealing members configured to be inverted from a mushroom-shaped section in the first configuration to the open funnel-like distal mouth of the second configuration.

In some examples, each sealing member includes a hemispherical shape in each of the first and second configurations, one of the hemispherical shapes being a mirror of the other hemispherical shape and substantially opposed to the other hemispherical shape between the first and second configurations.

In some examples, each sealing member corresponds to a separate funnel mouth in the second configuration.

In some examples, each sealing member is configured to provide multiple layers of sealing with a corresponding vessel wall.

In some examples, each sealing member is invertible about a respective transition.

In some examples, each sealing member is selectively spaced apart along the catheter body. In some examples, the sealing members are equally spaced apart. In some examples, the sealing members are gradually spaced apart closer together or further apart. In some examples, the sealing members are aligned along a common longitudinal axis.

In some examples, the distal tip section comprises a proximal portion and a distal portion, the distal portion comprising a smaller diameter than a diameter of the proximal portion. The diameter of the proximal portion can be at least twice the diameter of the distal portion. The distal portion can have an open, atraumatic end continuous with an inner lumen of the catheter body. An outer surface of the distal tip section can be between the proximal and distal portions can be curved or otherwise contoured.

In some examples, the open funnel-like distal mouth is collapsible during or after the procedure to reduce or remove flow restriction in the vessel.

In some examples, a method is disclosed to aspirate an obstructive thrombus from a blood vessel. The method can include translating the aspiration catheter at least partially distal of a sheath or delivery catheter, thereby moving the distal tip section of the aspiration catheter from a collapsed configuration to a first expanded configuration; retracting the distal tip section causing the distal tip section to invert about a transition between the distal tip section and the catheter body to the second expanded configuration, the second configuration comprising an expansile tip with an open funnel-like distal mouth comprising a larger diameter than a diameter of the transition.

In some examples, the method includes delivering an aspiration catheter according to this disclosure to a location of interest in the blood vessel.

In some examples, the method includes aspirating through the distal tip section to stimulate the thrombus into the open funnel-like distal mouth of the distal tip section.

In some examples, the method includes forming the distal tip section with a mushroom-shaped section configured to be inverted into the second configuration and form the open funnel-like distal mouth.

In some examples, the method includes shaping the distal tip section to reduce clot shear in the first configuration.

In some examples, the method includes reducing clot shear, by the distal tip section, in the first configuration.

In some examples, the method includes inverting a plurality of sealing members of the distal tip section from a mushroom-shaped section in the first configuration to the open funnel-like distal mouth of the second configuration.

In some examples, the method includes inverting each sealing member of the distal tip section to form corresponding funnel-like distal mouths.

In some examples, each sealing member comprising a hemispherical shape in the first and second configuration, the hemispherical shape being mirrors of the other substantially opposed the other between the first and second configurations.

In some examples, the method includes sealing a plurality of sealing layers, by each sealing layer of a respective sealing member, with a corresponding vessel wall.

In some examples, each sealing member being invertible about a respective transition.

In some examples, the method includes selectively spacing each sealing member apart along the catheter body.

In some examples, the method includes collapsing the open funnel-like distal mouth during the procedure to reduce or remove flow restriction in the vessel.

In some examples, the method includes collapsing the open funnel-like distal mouth after the procedure to reduce or remove flow restriction in the vessel.

Other aspects and features of the present disclosure will become apparent to those of ordinary skill in the art, upon reviewing the following detailed description in conjunction with the accompanying figures.

BRIEF DESCRIPTION OF THE DRAWINGS

The above and further aspects of this disclosure are further discussed with the following description of the accompanying drawings, in which like numerals indicate like structural elements and features in various figures. The drawings are not necessarily to scale, emphasis instead being placed upon illustrating principles of the disclosure. The figures depict one or more implementations of the inventive devices, by way of example only, not by way of limitation. It is expected that those of skill in the art can conceive of and combining elements from multiple figures to better suit the needs of the user.

FIG. 1A is a close-up view of an embodiment of one example catheter of this disclosure with a distal tip section in a first configuration.

FIG. 1B is a close-up view of the tip section of FIG. 1A in a second configuration.

FIG. 2A is a close-up perspective view of the example catheter of FIGS. 1A-1B in the first configuration.

FIG. 2B is a close-up cross-sectional perspective view taken along a centerline of the example catheter of FIGS. 1A-1B in the first configuration.

FIG. 17A is a close-up perspective view of an embodiment of one example catheter of this disclosure with a distal tip section in a first configuration.

FIG. 17B is a rear plan view of the example catheter of FIG. 17A with a distal tip section in the first configuration.

FIG. 17C is a close-up cross-sectional view of the one example catheter of FIG. 17A with a distal tip section in the first configuration.

FIG. 23 is a side view of an embodiment of one example catheter of this disclosure with a distal tip section in a first configuration and positioned with an example luer.

FIG. 24A is a side view of an embodiment of the example catheter of FIG. 23 with a distal tip section in the first configuration and positioned with the example luer.

FIG. 24B is a side view of an embodiment of the example catheter of FIG. 23 with a distal tip section in a second configuration and positioned with the example luer.

FIG. 25A is a close-up view of section H-H of FIG. 24A.

FIG. 25B is a close-up view of section I-I of FIG. 24B.

FIG. 26 is an exploded side view of an embodiment of the example catheter and tip section of FIGS. 23-25B being push loaded through a taper lock.

FIG. 27A is an exploded side view of the embodiment of FIG. 26 being push loaded through a taper lock.

FIG. 27B is a side view of the embodiment of FIG. 27A having been positioned with the taper lock.

FIG. 28A is a side view of the embodiment of FIGS. 27A-27B with a loading tool.

DETAILED DESCRIPTION

Figure 3A:
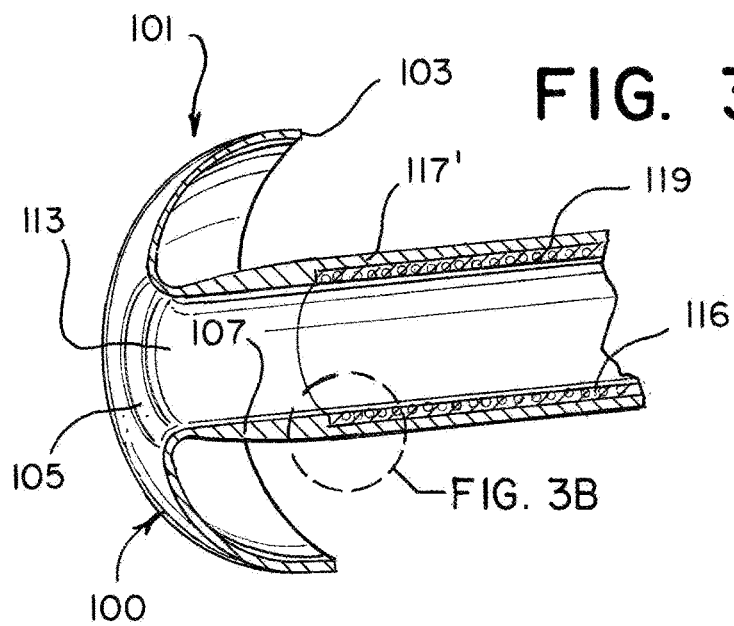
FIG. 3A is a close-up cross-sectional perspective view of an alternative to the example catheter of FIGS. 1A-1B in the first configuration taken along a centerline in the first configuration.

Specific examples of the present disclosure are now described in detail with reference to the Figures, where identical reference numbers indicate elements which are functionally similar or identical. The examples address many of the deficiencies associated with traditional fixed mouth catheters, such as limited flexibility and inefficiently directed aspiration.

One objective of the solution of this disclosure is an invertible, expansile catheter capable of providing both local flow restriction/arrest with a large distal facing mouth and capable of navigating tortuous areas of the vasculature to reach an occlusive clot. Flow restriction and large tipped designs offer substantially greater aspiration efficiency. Such advantages can also be especially beneficial in the case of stroke intervention procedures, where vessels in the neurovascular bed are particularly small and circuitous, and as a result a tailored axial and bending stiffness profile can inhibit kinking and binding. The catheter can also be compatible with relatively low-profile access sheaths and outer catheters, so that a puncture wound in the patient's groin (in the case of femoral access) can be easily and reliably closed. The catheter can also feature internal and/or external low-friction liners, and an outer polymer jacket or membrane disposed around the support structure.

Accessing the various vessels within the vascular, whether they are coronary, pulmonary, or cerebral, involves well-known procedural steps and the use of a number of conventional, commercially-available accessory products. These products, such as angiographic materials, rotating hemostasis valves, and guidewires are widely used in laboratory and medical procedures. When these products are employed in conjunction with the system and methods of this disclosure in the description below, their function and exact constitution are not described in detail.

Referring to the figures, FIG. 1A illustrates a close-up view of an embodiment of one example aspiration catheter 101 of this disclosure with a distal tip section 100 in an expanded state in a first configuration. Section 100, including its outer surface, can be self-expanding and made from a framework of struts that comprise nitinol with interwoven platinum, filaments for radiopacity. Section 100 is not so limited, however, and any material or combination of materials can be used as needed or required, including being constructed from polymer alone. Section 100 can also feature internal and/or external low-friction liners, and an outer polymer jacket or membrane disposed around the support structure. In the first configuration where section 100 is distal of an outer catheter and at a treatment site in the vasculature, section 100 is shown with an exemplary mushroom-shaped section 100, in accordance with an embodiment of the present disclosure.

In some examples, the mushroom-shaped section 100 can include a distal portion 105 with a smaller diameter than the diameter of proximal portion 103. In some examples, the diameter of portion 103 can be twice the diameter of portion 105, though diameter of portion 103 can be larger or smaller relative to portion 105 as needed or required. Portion 105 may be an open, atraumatic end continuous with an inner lumen 113 of catheter 101. The contour of the outer surface of section 100 between portions 105 and 103 can be curved. The material proximate portion 105 can be tapered.

In the second configuration of FIG. 1B, section 100 can be seen having been inverted about end 105 (which is also referred interchangeably herein as the "transition" between catheter body 117 and section 100), which previously was a distal end but is now a proximal end of section 100 in the second configuration. Portions of catheter 101 proximal of end 105 (e.g., the catheter body proximal of section 100) can be stiffer or otherwise more rigid in comparison to the more elastic section 100, which allows for the inversion between first and second configurations. In some examples, the shape of the first configuration previously shown in FIG. 1A can be inverted to the second configuration shape of FIG. 1B by retracting section 100 within a blood vessel to switch between tapering radially outwardly a predetermined distance in a proximal direction, as in FIG. 1A, to tapering radially outwardly in a distal direction, as in in FIG. 1B. In some examples, retracting section 100 a predetermined distance causes section 100 to transition between first and second configurations. Section 100 in the second configuration can be sized and configured in a funnel-like shape such that when deployed at the target site, section 100 expands to atraumatically contact the inner vessel wall to provide the maximum possible opening for aspirating and receiving the clot.

Portions on or proximate portion 105 may be more pliable than portions on or proximate portion 103 in order to induce self-expansion and/or inversion during delivery and inversion as section 100 forms its predetermined, funnel-like shape of the second configuration. By incorporating a funnel shape, a clot can be progressively compressed during retrieval to a smaller diameter so that it can be aspirated fully through the catheter into an aspiration syringe or canister. If the clot does become lodged in a mouth 114 of the section 100, mouth 114 can protect the clot and prevent the clot from dislodging as the aspiration suction is maintained and the catheter 101 is retracted into the sheath or an outer catheter.

In some examples, catheter 101 and its section 100 can be configured to pass through a sheath or guide with an inner diameter of less than 0.090", and more ideally less than 0.087", and most preferably less than 0.085". In some examples, catheter 101 and its section 100 can have a low delivery profile (e.g., approximately 0.080" or 2 mm), and yet be able to expand its distal mouth to the size of the vessel in which the clot is located, which could be as large as 5 mm. Ideally section 100 can expand its mouth 114 to diameter of at least 3 mm. In some examples, catheter 101 can collapse mouth 114 during or after the procedure, as it may be required to reduce or remove any flow restriction and allow blood and/or contrast to reach the distal vasculature.

Section 100 in the first and/or second configuration can be designed such that the distalmost end, depending on the configuration, is roughly equal in size to or slightly larger than the inner diameter of a corresponding blood vessel where a clot is located. Section 100 can also include a flexible membrane or cover (e.g., a polymeric membrane disposed therearound and stretched to assume the profile of the tip framework). In some examples, the membrane can be a highly elastic material which is able to expand with the frame to adopt a funnel shape, or it may be formed in an oversize funnel shape to begin with and pleated or folded or creased to reduce its profile for delivery. The membrane in some examples may be joined to the frame, or may be wrapped around the frame, or may be partially folded over the frame. Suitable membrane materials can include elastic polyurethanes such as Chronoprene, ideally with a shore hardness of 40A or lower, or silicone elastomers.

In some examples, section 100 can commence expanding into the first configuration as portion 105 moves distally and/or out of the corresponding delivery catheter. Section 100 can then move to the second, inverted funnel configuration by actuating section 100 and inverting portion 105 about portion 103.

In some examples, section 100 can begin inverting to the second configuration by breaking or snapping about portion 105. The term "break" and/or "snap" is used herein to include a region of the section 100 that facilitates inversion and/or avoid kinking between first and second configurations. The break can include one or more local changes in physical properties with respect to other regions of section 100 (e.g., increased flexibility, pre-weakened region, etc.). In some examples, a break associated with portion 105 may be formed into the framework of section 100 so that inversion and/or folding occurs after catheter 101 has translated or otherwise been retracted a predetermined distance. In some examples, the break of portion 105 may include localized heat treatment to render the region proximate portion 105 more ductile but kink preventative. In some examples, section 100 may invert upon contacting the clot C.

It is understood that section 100 in the second and/or first configurations can be in a hemispherical shape as depicted or any other shape, as needed or required, such as ellipsoidal, heart-shaped, ovoid, cylindrical, hemispherical, or any other funnel-like shape. For example, section 100 can be shaped like an ear-bud in the first configuration and a funnel in the second configuration.

FIG. 2A is a close-up perspective view catheter 101 of FIGS. 1A-1B in the first configuration. FIG. 2B is a close-up cross-sectional perspective view taken along a centerline of catheter 101 of FIGS. 1A-1B in the first configuration. As can be seen, section 100 includes portions 103, 105 as previously discussed changing in diameter to form the previously-described mushroom shape with lumen 113 running continuous through catheter 101, including section 100. Section 100 in turn can be overmolded with one or more reinforced shoulder sections 107 proximate portion 105. The one or more shoulder sections 107 can be thicker or have variable thickness (e.g., be thinner at or adjacent end 105 but relatively thicker proximal thereof where section 100 joins with catheter body 117).

Figure 3B:
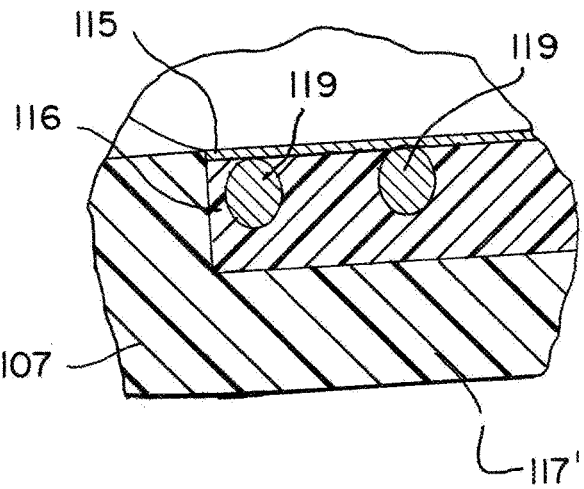
FIG. 3B is a close-up of section A-A from FIG. 3A.

FIG. 3A is a close-up cross-sectional perspective view an alternative catheter 101' in the first configuration. FIG. 3B is a close-up of section A-A from FIG. 3A. As can be seen, section 100 can be overmolded with one or more reinforced shoulder sections 107 proximate portion 105. As can be seen, sections 107 of this depicted embodiment can taper from a narrower section adjacent portion 105 towards a thicker section where section 107 joins with body 117'. Body 117', which here can include a skived outer jacket, can include an inner liner 115. Liner 115 in some examples can include a PTFE liner and/or strike layer. In this respect, the skived outer jacket can be reflowed over a coil, braid or laser cut tube support member. The PTFE liner can be bonded over a reflowed section, as shown, or the skived outer jacked can be reflowed through the braid, coil, or laser cut tube itself, which in turn can eliminate the need for an underlapping outer jacket.

One or more coil members 119 can also be included for a desired stiffness and/or flexing characteristic of section 100 during use (e.g., aspiration of a clot during clot retrieval). Coil members 119 can include the same flex characteristics and be equally spaced. In other examples, coil members 119 can include variable flex characteristics and/or spacing therebetween as needed or required for a treatment site or operation. A jacket 116 can also be included in communication with coil members 119 and liner 115. For example, coil members 119 may be disposed internal to, nested with, embedded in and/or surrounded generally by jacket 116. In some examples, jacket 116 can include a reflowed polymer jacket.

Figure 4A:
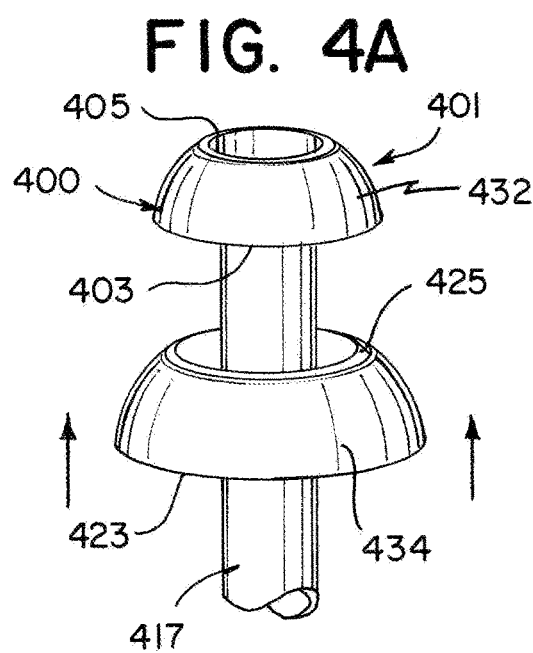
FIG. 4A is a close-up view of an embodiment of another example catheter of this disclosure with a distal tip section in a first configuration.
Figure 4B:
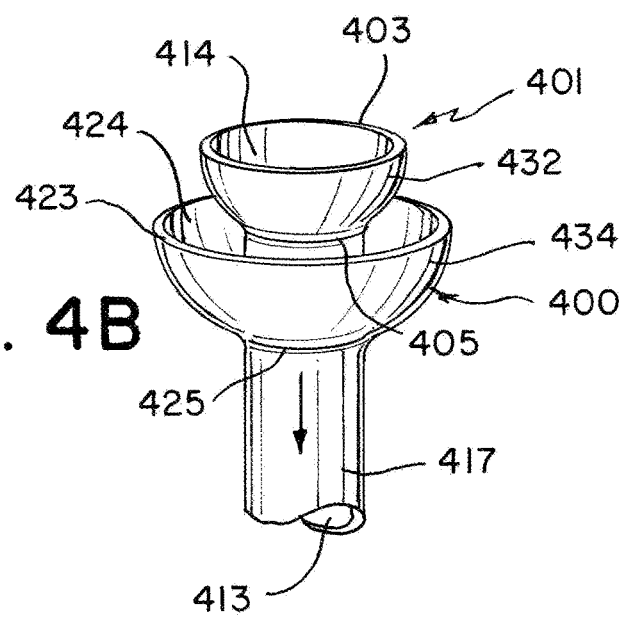
FIG. 4B is a close-up view of the tip section of FIG. 4A in a second configuration.

FIG. 4A illustrates a close-up view of an embodiment of one example aspiration catheter 401 of this disclosure with a distal tip section 400 in an expanded state in a first configuration, which is similar to catheter 101 and section 100 as previously described. However, in this example, section 400 includes a dual mushroom-shape and/or invertible hemispherical shape in the first configuration, as shown in FIG. 4A, and a dual funnel in the second configuration, as shown in FIG. 4B. The dual configuration of this example is configured to achieve multiple, sequential layers of sealing with a corresponding vessel wall. The enlarged arrows shown in FIGS. 4A-4B denote example aspiration flow direction(s) for each depicted configuration. In some examples, each sealing member 432, 434 shown sequentially arranged can collectively achieve multiple sequential layers of sealing. Distal sealing member 432 can include distal portion 405 and proximal portion 403, whereas proximal sealing member 434 can include distal portion 425 and proximal portion 423 and corresponding open end 424. Member 432 can include a diameter smaller than a diameter of proximal sealing member 434. However, in both the first and second configurations of FIGS. 4A-4B, the diameters of portions 403 and 423 of sealing members 432, 434, respectively, are larger than an outer diameter of catheter body 417.

Sealing members 432, 434 can be configured to invert about portions 405 and 425, respectively, and in certain examples, approximately simultaneously, in sequence (e.g., member 432 before member 434 or vice versa), or manually by a corresponding actuation system controlled by an operator. In some examples, sealing members 432, 434 can be selectively and/or sequentially spaced apart such that each does not overlap when compressed in a guide sheath or delivery catheter for advancement so that the size of the sheath and/or delivery catheter can be maximized relative to balloon guide dimensions. Each of members 432, 434 is also capable of being inverted into a second configuration, similar to section 100 as previously described.

Figure 5:
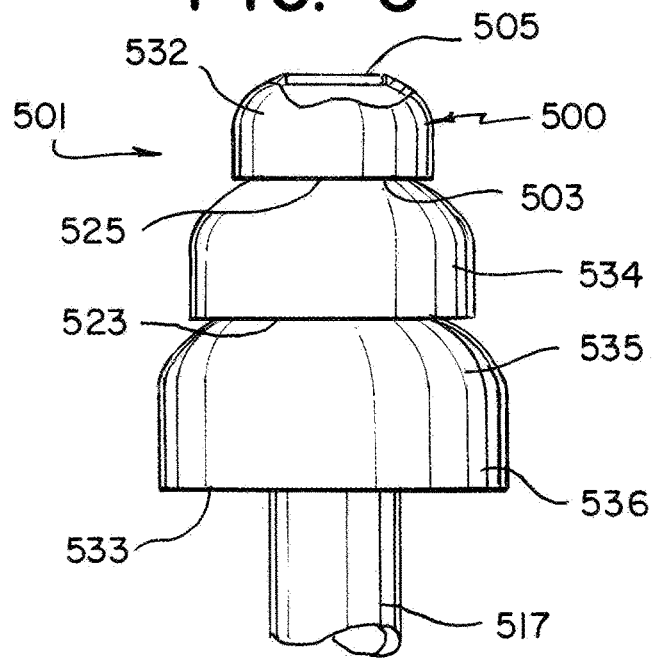
FIG. 5 is a close-up view of an embodiment of another example catheter of this disclosure with a distal tip section in a first configuration.

FIG. 5 is a close-up view of an embodiment of another example catheter 501 of this disclosure with a distal tip section 500 in a first configuration comprising a plurality of sealing members 532, 534, 536, similar to FIGS. 4A-4B. As can be seen, members 532, 534, 536 can include varying diameters, with diameters being largest proximally and gradually moving distally to member 532 with the smallest diameter in both first and second configurations.

Varying diameters as depicted allows section 500 to seal in a wide range of vessel diameters as well as increased redundancies to maintain a seal with the corresponding blood vessel. Diameters of members 532, 534, 536 can be varied as needed or required. For example, an outer diameter of member 536 associated with portion 533 can be double a diameter of member 534 at portion 523, which in turn can be double a diameter of member 532 at portion 503. However, the solution is not so limited and diameters and/or spacing of members 532, 534, 536 can vary as needed or required. Further, while only three members 532, 534, 536 are shown in FIG. 5, fewer or greater sealing members are contemplated, as needed or required. Each of members 532, 534, 536 is also capable of being inverted into a second configuration, similar to section 100 as previously shown and described.

Figure 6:
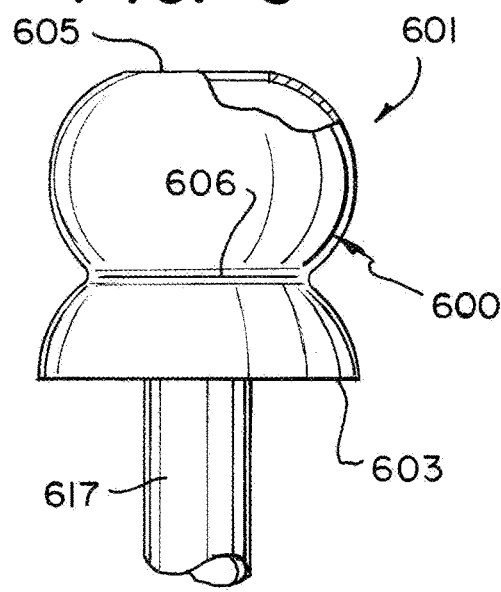
FIG. 6 is a close-up view of an embodiment of another example catheter of this disclosure with a distal tip section in a first configuration.

FIG. 6 is a close-up view of an embodiment of another example catheter 601 of this disclosure with a distal tip section 600 in a first configuration. As can be seen, section 600 can include varying diameters, with a crease or breaker 606 positioned between larger diameters of distal portion 605 and proximal portion 603 to form a continuous partial pear-like shape section 600. Crease or breaker 606 can allow sealing to a corresponding vessel wall in a wide range of vessel diameters using a single sealing member shape (rather than a multi-sealing approach as in FIGS. 4A-4B or the plurality of varying diameters of sealing members in FIG. 5). Diameters of portions 603, 605 can be varied as needed or required. Each of portions 603, 605 is also capable of being inverted into a second configuration, similar to section 100 as previously described.

Figure 7A:
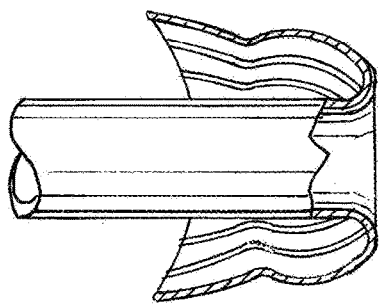
FIG. 7A is a close-up cross-sectional view of an embodiment of one example catheter of this disclosure with a distal tip section in a first configuration.

FIG. 7A is a close-up cross-sectional view of an embodiment of one example distal tip section in a first configuration with one or more longitudinal channels, grooves, ridges, and/or recesses. These features can be configured to form the depicted tip section and during use with its funnel shape in the second configuration. The embodiment depicted in FIG. 7A can also provide improved radial force, pushability of the corresponding catheter and distal tip section, and can also aid in initiating a particular folding pattern when retracted through an outer sheath.

Figure 7B:
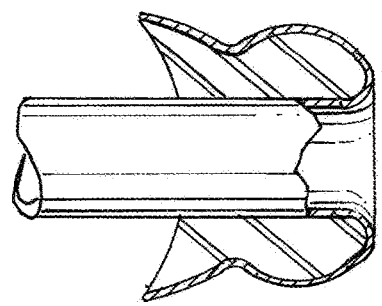
FIG. 7B is a close-up cross-sectional view of an embodiment of one example catheter of this disclosure with a distal tip section in a first configuration.
Figure 7C:
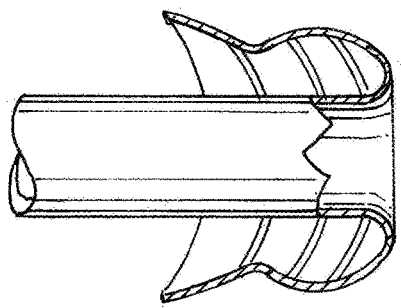
FIG. 7C is a close-up cross-sectional view of an embodiment of one example catheter of this disclosure with a distal tip section in a first configuration.

FIG. 7B depicts a similar tip section but with helix shaped (or otherwise twisted) channels, grooves, ridges, and/or recesses. FIG. 7C depicts a similar tip section but with circumferential ring-shaped channels, grooves, ridges, and/or recesses. It is understood that any of the depicted examples of FIGS. 7A-7C can be used by themselves or in combination with one or more of the depicted example channels, grooves, ridges, and/or recesses, as well as other features contemplated for use with the catheter and corresponding tip section of this disclosure. The sections depicted in FIGS. 7A-7C can also include a mini funnel opening at the distal mouth to reduce clot shear if the sealing member is not inverted.

Figure 8A:
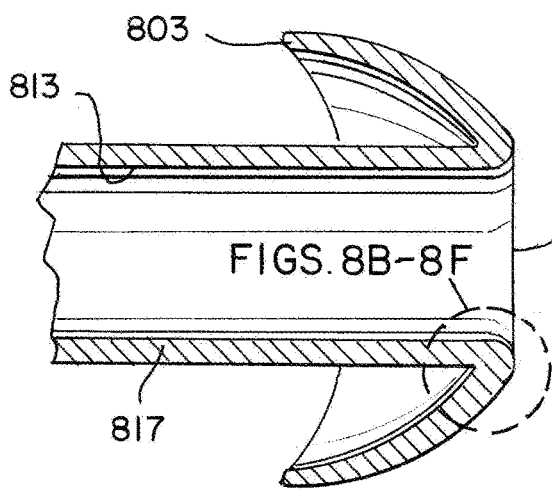
FIG. 8A is a close-up view of an embodiment of an example catheter of this disclosure with a distal tip section in a first configuration.
Figure 8B:
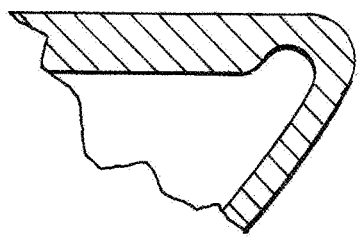
FIG. 8B is a close-up view of one example shoulder section of section B-B of the tip section of FIG. 8A in a second configuration.
Figure 8C:
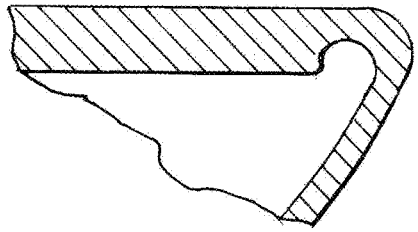
FIG. 8C is a close-up view of one example shoulder section of section B-B of the tip section of FIG. 8A in a second configuration.
Figure 8D:
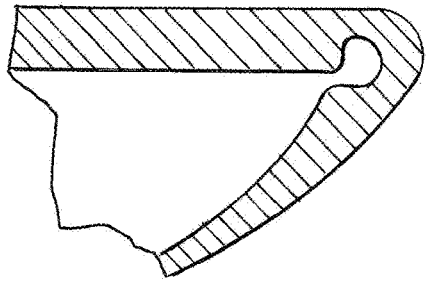
FIG. 8D is a close-up view of one example shoulder section of section B-B of the tip section of FIG. 8A in a second configuration.
Figure 8E:
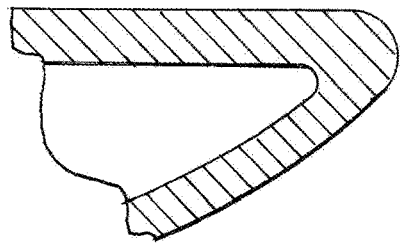
FIG. 8E is a close-up view of one example shoulder section of section B-B of the tip section of FIG. 8A in a second configuration.

FIG. 8A is a close-up view of an embodiment of an example catheter of this disclosure with a distal tip section in a first configuration. Between FIGS. 8B-8E are illustrations of close-up views of example shoulder sections at or adjacent distal portion 805. More specifically, the shoulder sections of FIGS. 8B-8E can include a transition section from the substantially elongate catheter body 817 to portion 805. This transition, as previously referenced with catheter 101, can include flex features (e.g., thin areas, one or more recesses, one or more creases, one or more breaks, etc.) that reduce the force for inversion from the first configuration to a funnel shape of the second configuration. In other examples, the transition can include one or more stiffening elements (e.g., ribs, thickened areas such as reinforced shoulder sections, stiffer or more rigid materials, etc.). The one or more stiffening elements can be configured to increase resilience to collapse of section 800 under vacuum. The thickness of the section 800 can vary as it tapers radially outwardly so that the most outer part in contact with the vessel wall is ultra-soft and the inner part close to the tubular portion is stiffer and resists collapse under vacuum.

Figure 9:
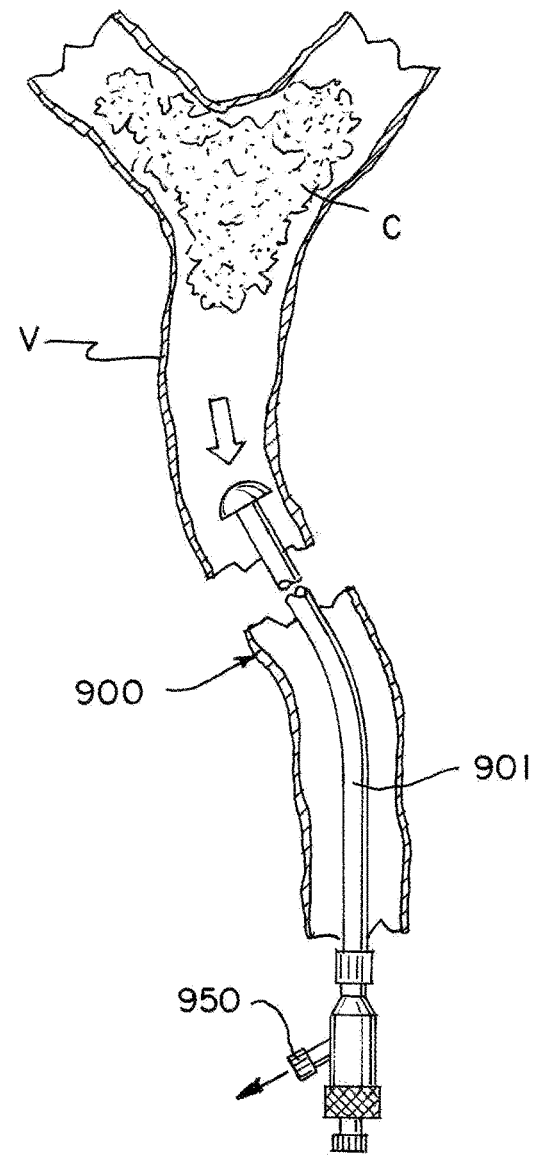
FIG. 9 depicts an embodiment of one example catheter of this disclosure with a distal tip section in a first configuration being delivered to a treatment site in a blood vessel.

FIG. 9 depicts an embodiment of one example catheter 901 with tip section 900 in a first configuration being delivered to a clot C in a blood vessel V. As can be seen, blood between section 900 and clot C flows, denoted by the large arrow within the vessel, proximally through catheter 901. The proximal end of catheter 901 may include a port 950 that can be toggled open or closed. When open, port 950 allows fluid trapped between section 900 and clot C to escape, denoted by the large arrow adjacent port 950, as catheter 901 is advanced. Otherwise, if closed, section 900 (and its corresponding sealing member(s)) can act like a piston in vessel V and cause clot C to move distally. In FIG. 9, it is understood that blood is able to flow around section 900, as section 900 can be smaller than the surrounding vessel V. However, port 950 can be reduced to permit flow around section 900. Port 950 is advantageous when section 900 seals to the vessel V and is being advanced distally.

Figure 10:
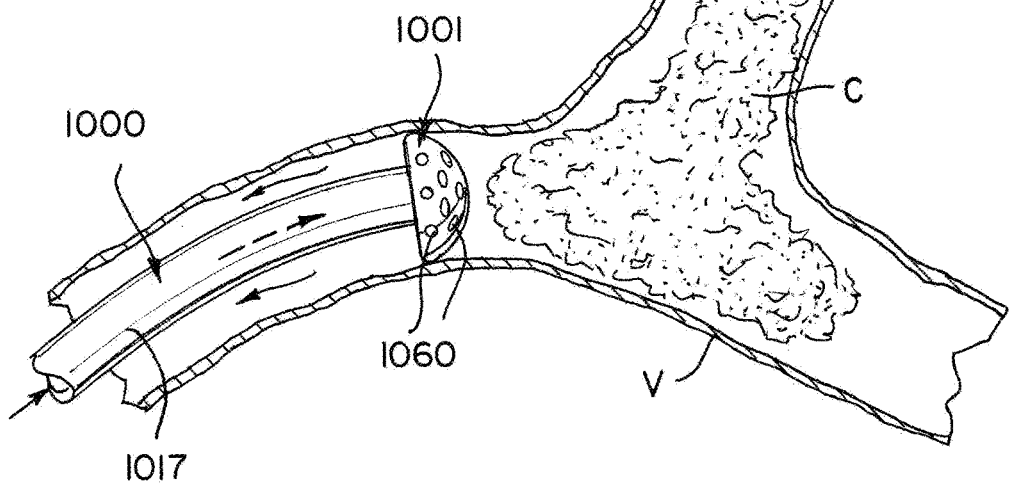
FIG. 10 depicts an embodiment of one example catheter of this disclosure with a distal tip section in a first configuration being delivered to a treatment site in a blood vessel.

FIG. 10 depicts an embodiment of one example catheter 1000 with tip section 1001 in a first configuration being delivered to a clot C. As can be seen, between section 1001, and its sealing member, and clot C blood flows, as denoted by arrows within the vessel, proximally through pores 1060 and between catheter 1000 and vessel V. Pores 1060 may be selectively sized and/or positioned in section 1001 to allow a predetermined percentage of blood to flow proximally as tip section 1001 is advanced to avoid pushing the clot C distally while having enough of a predetermined percentage blockage to direct aspiration to the clot C when applied. Further, once the tip section 1001 is inverted to form a funnel in the second configuration, the pores 1060 can close to allow for maximum aspiration.

Figure 11:
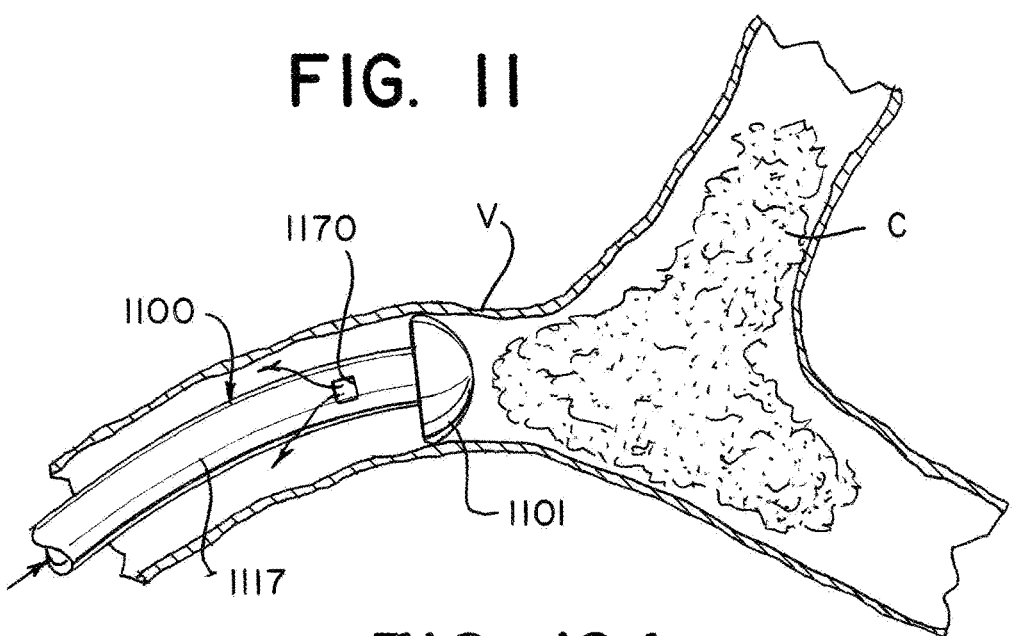
FIG. 11 depicts an embodiment of one example catheter of this disclosure with a distal tip section in a first configuration being delivered to a treatment site in a blood vessel.

FIG. 11 depicts an embodiment of one example catheter 1100 with tip section 1101 in a first configuration being delivered to a clot C. As can be seen, between section 1101, and its sealing member, and clot C blood flows proximally through one-way valve 1170. Valve 1170 can be formed or otherwise positioned on catheter 1100 proximal of section 1101. While only one valve 1170 is shown in FIG. 11, more valves can be used and included as needed or required. In some examples, the one or more valves 1170 can be configured to close during aspiration to direct vacuum to the face of clot C and open as section 1101 is advanced in vessel V in its first configuration to allow blood to flow to the vessel proximal of section 1101.

Figure 12A:
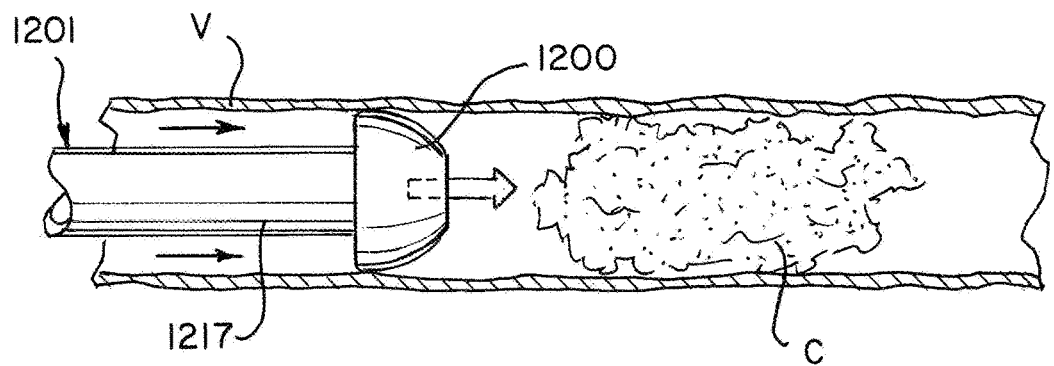
FIG. 12A is a close-up view of an embodiment of one example catheter of this disclosure with a distal tip section in a first configuration during a clot aspiration procedure in a blood vessel.
Figure 12B:
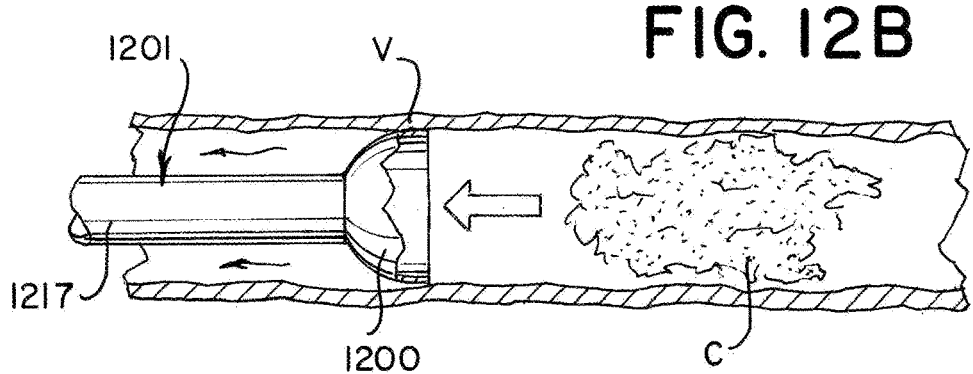
FIG. 12B is a close-up view of the tip section of FIG. 12A in a second configuration during a clot aspiration procedure in a blood vessel.

FIG. 12A is a close-up view of an embodiment of one example catheter 1201 with a distal tip section 1200 in a first configuration during a clot aspiration procedure in vessel V. FIG. 12B is a close-up view section 1200 in a second configuration during the clot aspiration procedure in vessel V. Section 1200, both or either in its first or second configuration can be used as a plunger. In some examples, a proximal port 1250 can be open during advancement to the treatment location so as to not disturb the clot C. After reaching the clot C, the port 1250 can be closed so that the tip section 1200 can be advanced and retracted in a repetitive motion to dislodge the clot C from the vessel V and break any adhesive force prior to applying aspiration and/or removing the clot C.

In some examples, tip section 1200 of catheter 1201 is configured to be retracted a predetermined distance and advanced in repetitive motion to dislodge clot C from vessel C in proximal and distal directions. In some examples, tip section 1200 of catheter 1201 is configured to be retracted to invert to the depicted funnel-like shape of the second configuration and dislodge clot C from vessel V in a proximal direction only. In some examples, tip section 1200 of catheter 1201 is configured to be advanced to revert from the second configuration to the first configuration and dislodge clot C from vessel V in distal direction.

Figure 13:
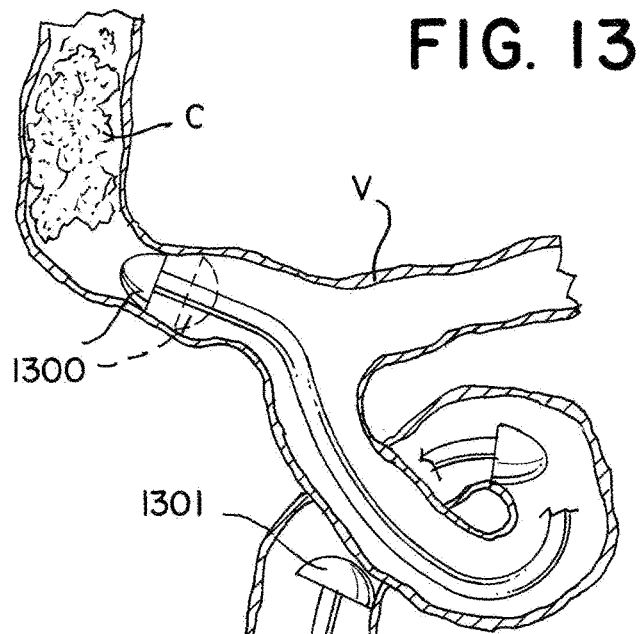
FIG. 13 is a schematic view of an embodiment of one example catheter of this disclosure with a distal tip section being shown moving between first and second configurations in use with a sheath and balloon guide catheter.

FIG. 13 is a schematic view of another example catheter 1301 of this disclosure with tip section 1300 being shown in first and second (dashed line) configurations in use with a sheath S and balloon guide catheter B. As shown, tip section 1300 can be advanced through outer balloon B and/or sheath S to reach a treatment site, such as n occlusion in the internal carotid artery (ICA). To minimize profile, tip section 1300 can be inverted to the second configuration (e.g., funnel-like shape) and/or wrapped circumferentially prior to inserting in the guide sheath S. As the inverted and/or wrapped tip section 1300 exits the guide sheath S in the ICA, section 1300 can revert to the shape of its first configuration as it grips the vessel wall V and is advanced distally to the face of the clot C. Then the section 1300 in the first configuration can be retracted slightly to invert to the funnel-like shape of the second configuration prior to aspiration. Alternatively, the tubular portion 1317 (e.g., the prior described substantially elongate catheter body section) of the tip covered by the tip section 1300 may be compressible such that the tip section 1300 in the first configuration and tubular 1317 portion can be compressed for low profile advancement through an outer guide sheath S.

Any of the herein disclosed catheters, including catheter 1301, can also be used with one or more stentrievers, which can be understood as including features more clearly described in U.S. application Ser. No. 16/021,505 and U.S. Pat. Nos. 10,292,723, 10,299,811, 10,363,054; 8,777,976; 8,852,205; 9,402,707; 9,445,829; and 9,642,639, and they are incorporated by reference in their entirety as if set forth verbatim herein. Any of the herein disclosed catheters can also direct aspiration vacuum to a clot face while a stentriever can hold a composite clot (comprised of friable regions and fibrin rich regions) together preventing embolization and aid in dislodging the clot from the vessel wall. The combined stentriever retraction and aspiration through the funnel-like shape of the tip section 1300 in the second configuration can act together to increase the likelihood of first pass success in removing the clot C. In some examples, the funnel-like shape of the tip section 1300 can reduce clot shearing upon entry to the catheter 1301, arrest flow to protect distal vessels from new territory embolization, and also direct aspiration vacuum to the clot face while the stentriever holds a composite clot (comprised of friable regions and fibrin rich regions) together preventing embolization and aid in dislodging the clot from the vessel wall.

Figure 14A:
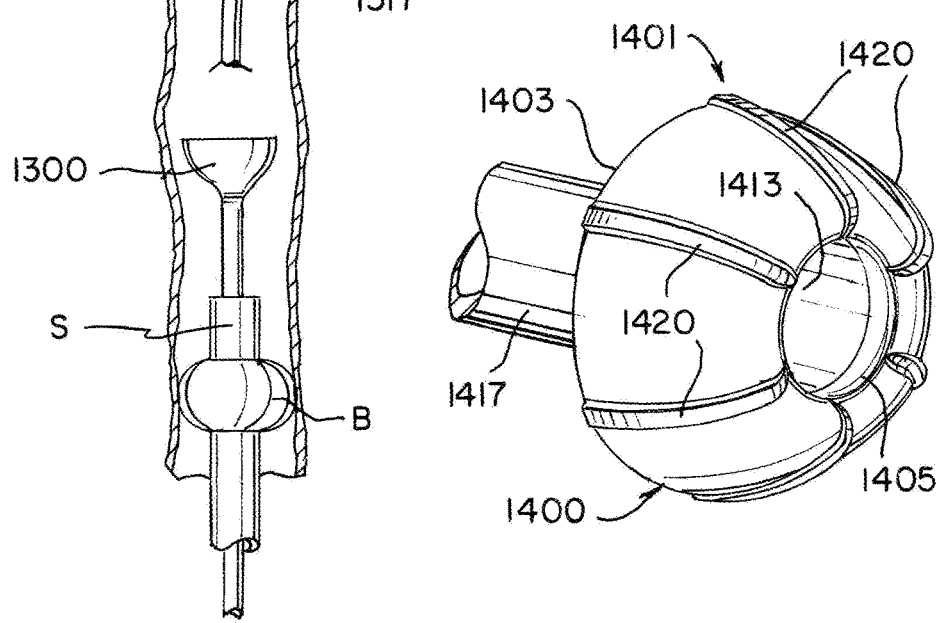
FIG. 14A is a close-up perspective view of an embodiment of one example catheter of this disclosure with a distal tip section in a first configuration.
Figure 14B:
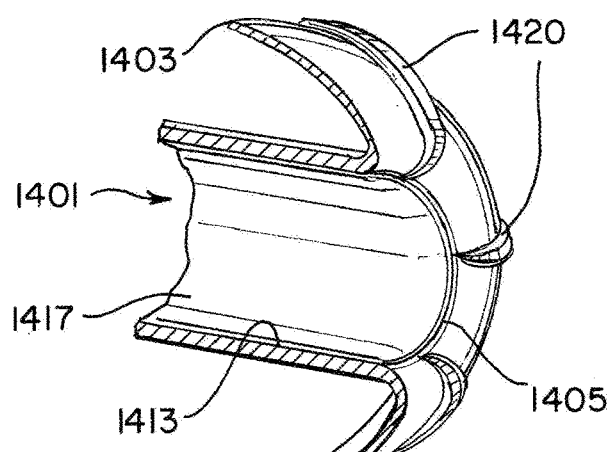
FIG. 14B is a close-up cross-sectional view of the example catheter of FIG. 14A with a distal tip section in the first configuration.

FIG. 14A is a close-up perspective view of an embodiment of one example catheter 1401 with distal tip section 1400 in a first configuration with one or more outer ribs 1420. As shown, outer ribs 1420 can be one or more axially positioned outer ribs 1420 that protrude outwardly, radially along the outer surface of section 1401 and can extend between proximal 1403 and distal 1405 portions of section 1400. The one or more ribs 1420 can be configured to maintain structural integrity while minimizing a volume of material that needs to be collapsed for passage through section 1400. FIG. 14B shows a cross-sectional view taken along a portion of section 1400 between ribs 1420 whereas FIG. 14C shows a cross-sectional view of section 1400 taken along one of the one or more ribs 1420.

Figure 14C:
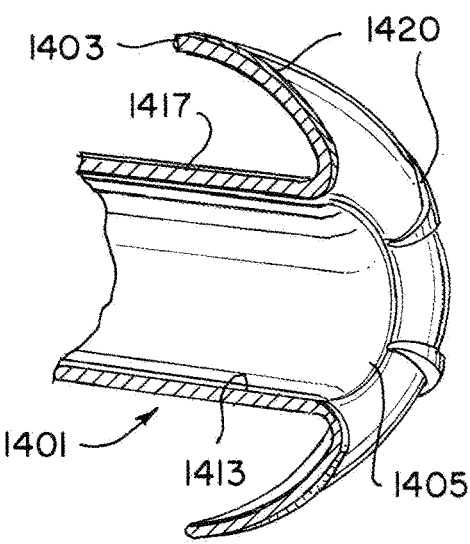
FIG. 14C is a close-up cross-sectional view of an embodiment of the example catheter of FIG. 14A with the distal tip section in the first configuration.

As can be seen, rib 1420 in FIG. 14C includes considerably thicker (e.g., at least twice as thick) cross sections than the non-rib portions of section 1400. In some examples, ribs 1420 can include a largest width at or adjacent portion 1403 and taper therefrom towards portion 1405 to a smaller width. However, in other examples, ribs 1420 can include a relatively constant thickness and/or width throughout. As shown, tip section 1400 can include six (6) radially aligned ribs 1420, though fewer or greater number of ribs 1420 as needed or required.

Figure 15A:
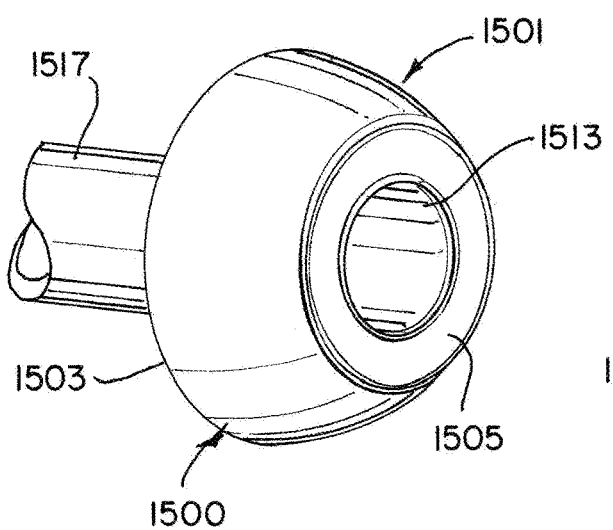
FIG. 15A is a close-up perspective view of an embodiment of one example catheter of this disclosure with a distal tip section in a first configuration.

FIG. 15A is a close-up perspective view of an embodiment of one example catheter 1501 with distal tip section 1500 in a first configuration with one or more inner ribs 1520. As shown, ribs 1520 can be one or more axially positioned inner ribs 1520 that protrude inwardly, radially along the inner surface of section 1501 and can extend between proximal 1503 and distal 1505 portions of section 1500. Advantageously, ribs 1520 positioned as shown and described provide a relatively smooth interface for vessels and clot during advancement and aspiration, respectively. The one or more ribs 1520 can be configured to maintain structural integrity while minimizing a volume of material that needs to be collapsed for passage through section 1500.

Figure 15B:
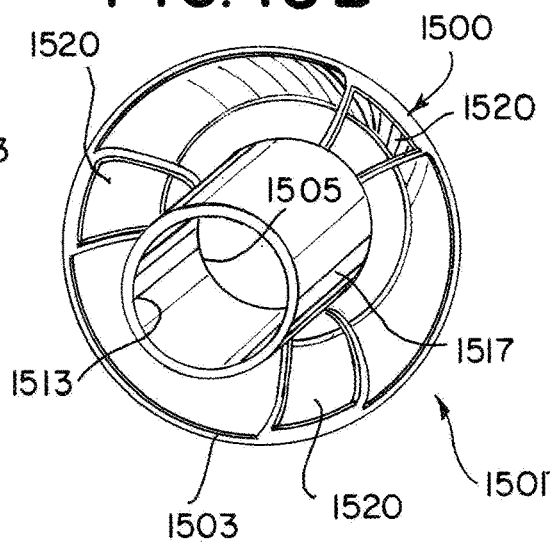
FIG. 15B is a rear perspective view of the example catheter of FIG. 15A with a distal tip section in the first configuration.

FIG. 15B shows a rear perspective view of section 1500. As can be seen, rib 1520 in FIG. 15B includes considerably thicker (e.g., at least twice as thick) cross sections than the non-rib portions of section 1500. In some examples, ribs 1520 can include a largest width at or adjacent portion 1503 and taper therefrom towards portion 1505 to a smaller width. However, in other examples, ribs 1520 can include a relatively constant thickness and/or width throughout. As shown, tip section 1500 can include three (3) radially aligned ribs 1520, though fewer or greater number of ribs 1520 as needed or required.

Figure 16A:
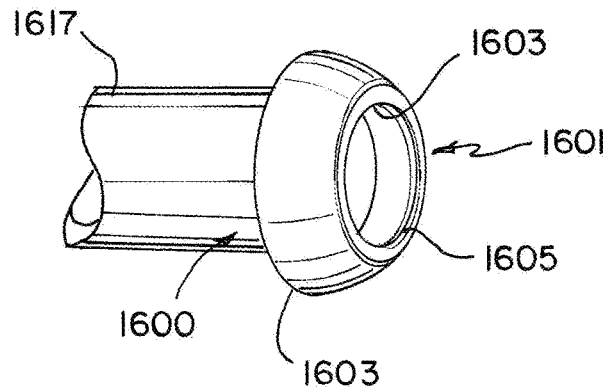
FIG. 16A is a close-up perspective view of an embodiment of one example catheter of this disclosure with a distal tip section in a first configuration.
Figure 16B:
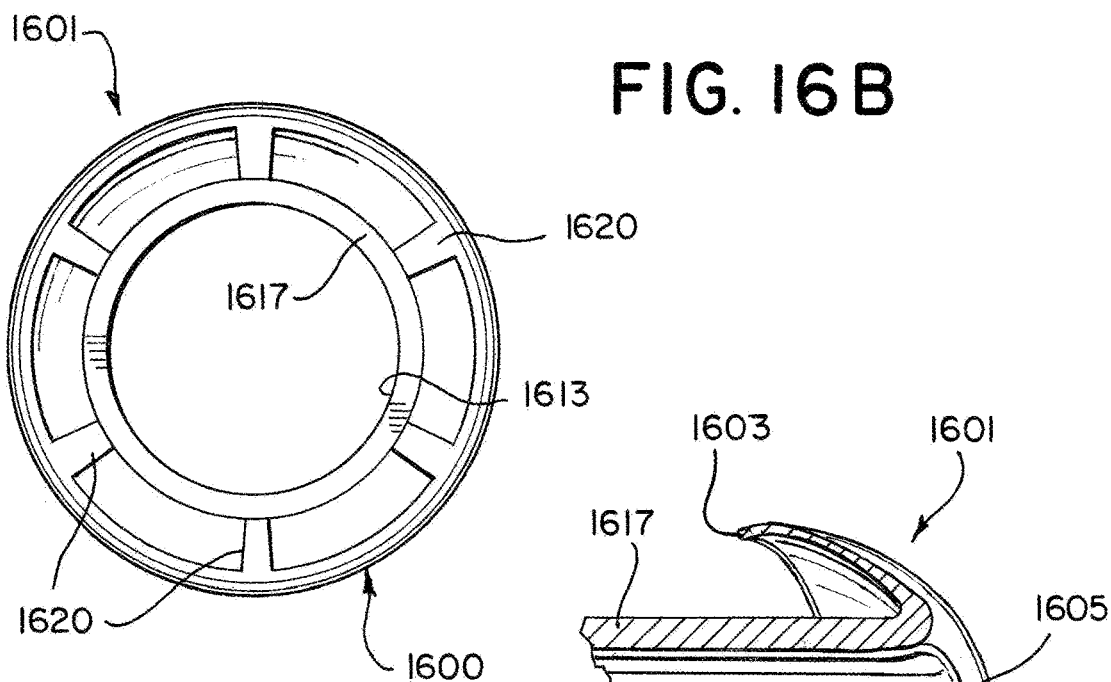
FIG. 16B is a rear plan view of the catheter of FIG. 16A with a distal tip section in the first configuration.

FIG. 16A is a close-up perspective view of an embodiment of one example catheter 1601 with distal tip section 1600 in a first configuration with one or more inner ribs 1620. As shown more clearly in the rear plan view of FIG. 16B, ribs 1620 can be one or more axially positioned inner ribs 1620 that protrude inwardly, radially along the inner surface of section 1600 and can extend between proximal 1603 and distal 1605 portions of section 1600. Advantageously, ribs 1620 positioned as shown and described provide a relatively smooth outer surface interface for vessels and clot during advancement and aspiration, respectively. Ribs 1620 can be partially formed, as shown more clearly in FIGS. 16C and 16D, so that the volume of material at the largest diameter can be kept to a minimum and ribs 1620 can be configured to maintain integrity of the outer profile of section 1600 where required most (e.g., close to the mouth of the catheter 1601 where aspiration and clot interaction forces will be highest).

Figure 16C:
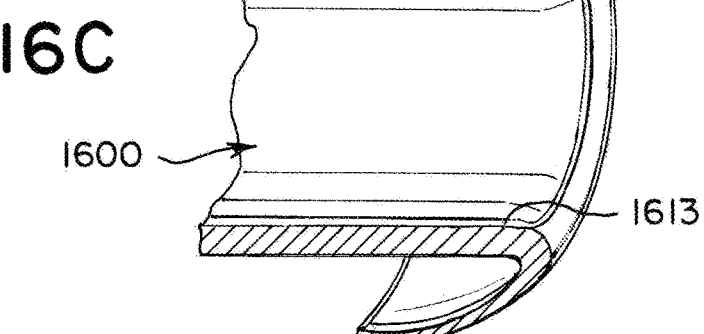
FIG. 16C is a close-up cross-sectional view of the catheter of FIG. 16A with a distal tip section in the first configuration.
Figure 16D:
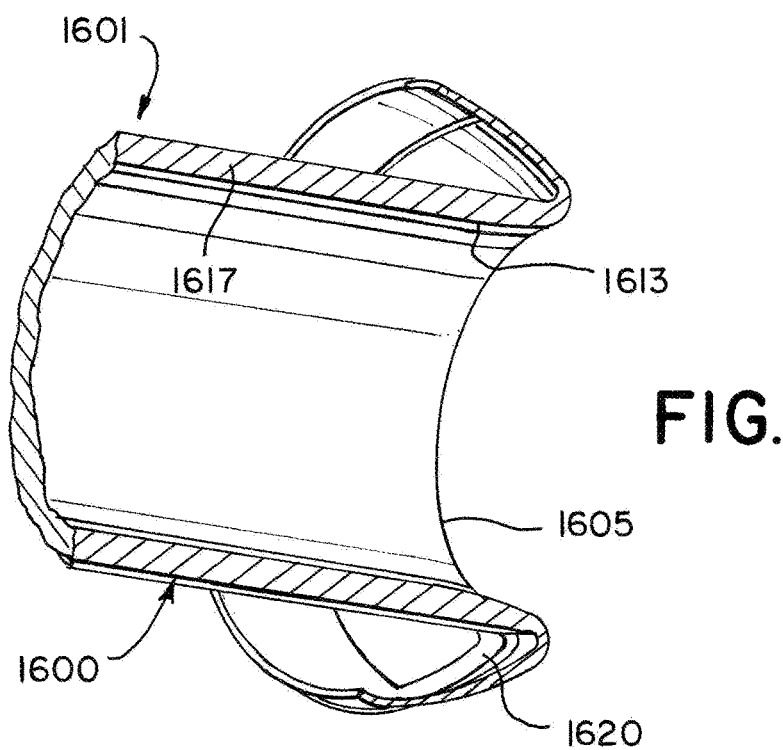
FIG. 16D is another close-up cross-sectional view of the catheter of FIG. 16A with the distal tip section in the first configuration.

As can be seen specifically in FIGS. 16C and 16D, ribs 1620 can include cross sections thicker than the non-rib portions of section 1600. In some examples, ribs 1620 can include a largest width at or adjacent portion 1603 and taper therefrom towards portion 1605 to a smaller width. However, in other examples, ribs 1620 can include a relatively constant thickness and/or width throughout. As shown, tip section 1600 can include six (6) radially aligned ribs 1620. However, section 1600 is not so limited and fewer or greater number of ribs 1620 can be included, as needed or required. While the depicted ribs 1620 are shown equally spaced apart, it is contemplated that they can positioned with varied spacing.

FIG. 17A is a close-up perspective view of an embodiment of one example catheter 1701 with distal tip section 1700 in a first configuration with one or more inner ribs 1720. As shown more clearly in the rear plan view of FIG. 17B, ribs 1720 can be one or more axially positioned inner ribs 1720 that protrude inwardly, radially along the inner surface of section 1700 and can extend between proximal 1703 and distal 1705 portions of section 1700. Advantageously, ribs 1720 positioned as shown and described provide a relatively smooth outer surface interface for vessels and clot during advancement and aspiration, respectively. Ribs 1720 can be partially formed, as shown more clearly in FIG. 17C, so that the volume of material at the largest diameter can be kept to a minimum and ribs 1720 can be configured to maintain integrity of the outer profile of section 1700 where required most (e.g., close to the mouth of the catheter 1701 where aspiration and clot interaction forces will be highest).

Section 1700 may include one or more openings 1722 disposed on or adjacent distal portion 1705 that allow passage of blood flow in a controlled manner from a position proximal of to a position distal to section 1700 during use in a blood vessel. The one or more openings 1722 are configured to prevent vessel collapse under high aspiration should a length of blood vessel lie between a sealed section 1700 and a sealed clot, by allowing a portion of blood to flow through the openings 1722. The one or more openings 1722 can also mitigate against air entrainment during advancement through an outer catheter and against distal displacement of blood when advanced through a blood vessel. The one or more openings 1722 can be separate from ribs 1720 (e.g., can be radially located between adjacent ribs 1720) and/or can be included in one or more of ribs 1720 at or adjacent the distal portion 1705.

Figure 18A:
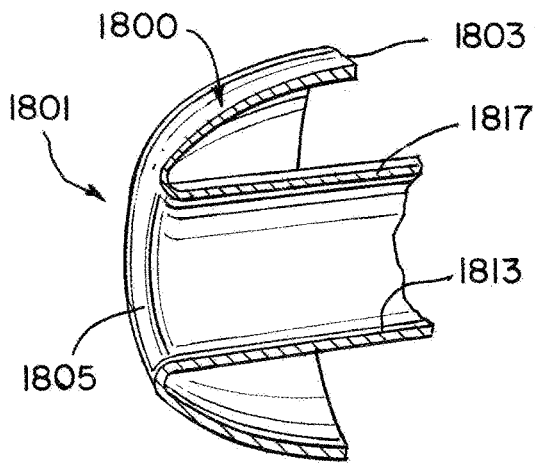
FIG. 18A is a close-up cross-sectional view of an embodiment of one example catheter of this disclosure with a distal tip section in a first configuration.

FIG. 18A is a close-up perspective view of an embodiment of one example catheter 1801 with distal tip section 1800 in a first configuration. The depicted example section 1800 is configured to seal in a vessel with a relatively thin wall at or adjacent the distal portion 1805 so that the portion 1813 immediately proximal thereof is relatively thicker. The wall between portions 1803 and 1805 can be thicker than the shoulder defined at or adjacent portion 1805 which in turn aids in collapsibility of section 1800 and overall rigidity of the outer diameter thereof.

Figure 18B:
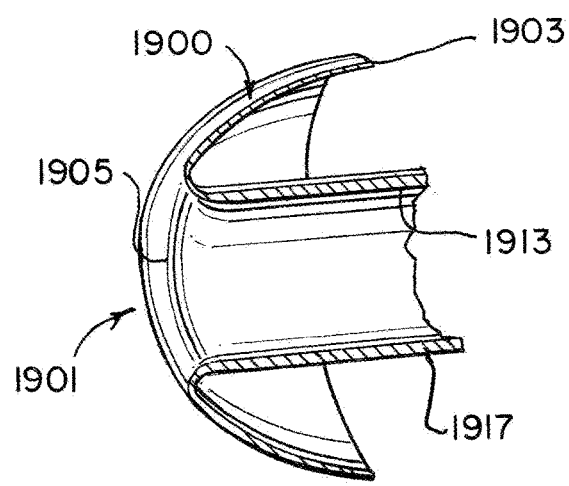
FIG. 18B is a close-up cross-sectional view of an embodiment of one example catheter of this disclosure with a distal tip section in a first configuration.

FIG. 18B is a close-up perspective view of an embodiment of one example catheter 1901 with distal tip section 1900 in a first configuration. The depicted example section 1900 is configured to seal in a vessel with a relatively thin wall at or adjacent the distal portion 1905 and tapering thinner at or adjacent portion 1903 so that the portion 1913 immediately proximal thereof is relatively thicker. The wall between portions 1903 and 1905 can be relatively thinner to reduce the collapsed volume of section 1900 with a relatively thicker wall along portion 1917 for overall rigidity of catheter 1901.

Figure 19A:
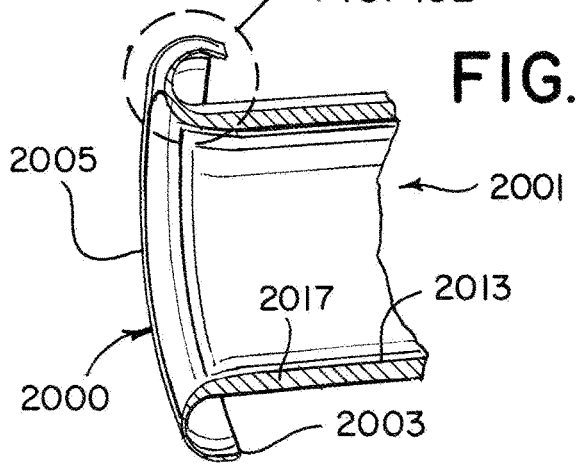
FIG. 19A is a close-up cross-sectional view of an embodiment of one example catheter of this disclosure with a distal tip section in a first configuration.
Figure 19B:
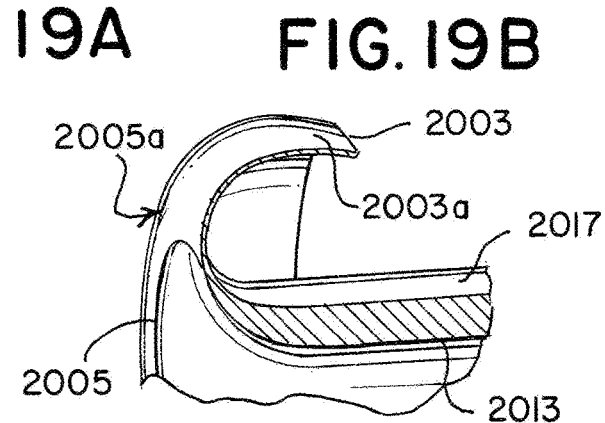
FIG. 19B is a close-up view of one example shoulder section of section C-C of the tip section of FIG. 19A in the first configuration.

FIG. 19A is a close-up perspective view of an embodiment of one example catheter 2001 with distal tip section 2000 in a first configuration. FIG. 19B is a close-up view of an example shoulder section of section C-C of the tip section of FIG. 19A. The depicted example section 2000 is configured to seal in a vessel with a relatively thin wall at or adjacent the distal portion 2005, including portion 2005a disposed on an outer curved surface thereof, so that the portion 2013 immediately proximal thereof is relatively thicker. The wall between portions 2003 and 2005 can remain relatively thinner than the shoulder defined at or adjacent portion 2005 which in turn aids in collapsibility of section 2000 and overall rigidity of the outer diameter thereof. Section 2000 can include one or more support structures, such as a nitinol braid or braided section of one or more memory alloy materials, that together can include a relatively large proximally extending radius with relatively strong radial support and corresponding vessel sealing capability.

Figure 19C:
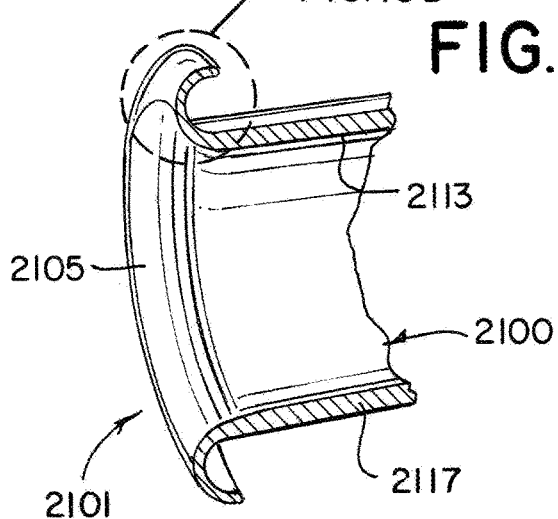
FIG. 19C is a close-up cross-sectional view of an embodiment of one example catheter of this disclosure with a distal tip section in a first configuration.
Figure 19D:
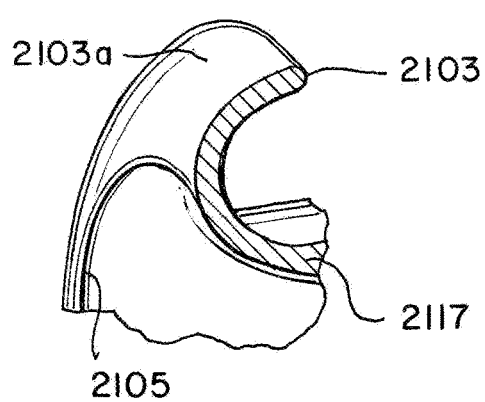
FIG. 19D is a close-up view of one example shoulder section of section D-D of the tip section of FIG. 19C in the first configuration.

FIG. 19C is a close-up perspective view of an embodiment of one example catheter 2101 with distal tip section 2100 in a first configuration. FIG. 19D is a close-up view of an example shoulder section of section D-D of the tip section of FIG. 19C. The depicted example section 2100 is configured to seal in a vessel with a relatively thicker wall at or adjacent the distal portion 2105 so that the section 2101 must first be inverted distally prior to being advanced distally in a vessel. The wall between portions 2103 and 2105 can be relatively thick as well. Moreover, as section 2101 extends proximally only a short distance over the mouth of the catheter 2101, section 2100 can be easily inverted for advancement and easily revert once uncovered from a catheter in a vessel that is large enough to allow inversion. The thicker wall of section 2100 also aids in the materials bias towards its formed shape.

Figure 20A:
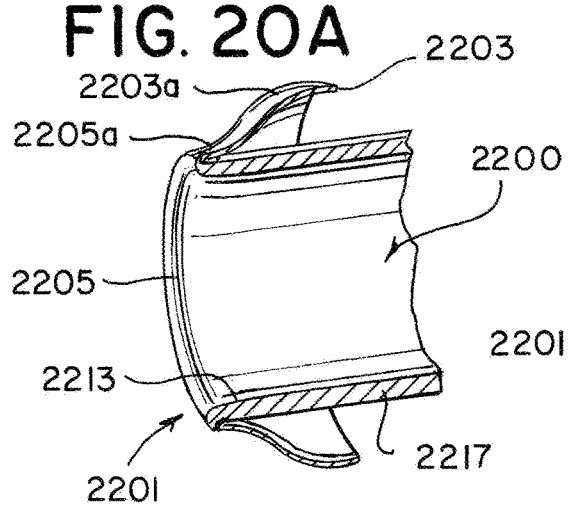
FIG. 20A is a close-up cross-sectional view of an embodiment of one example catheter of this disclosure with a distal tip section in a first configuration.

FIG. 20A is a close-up perspective view of an embodiment of one example catheter 2201 with distal tip section 2200 in a first configuration with a "bell"-shape and relatively thin outer membrane. The depicted example section 2200 is configured to seal in a vessel with a relatively thin wall at or adjacent distal portion 2205 so that portion 2213 immediately proximal thereof is relatively thicker. The wall between portions 2203 and 2205 can remain thinner than the shoulder defined at or adjacent portion 2205 which in turn aids in collapsibility of section 2200 and overall rigidity of the outer diameter thereof.

Figure 20B:
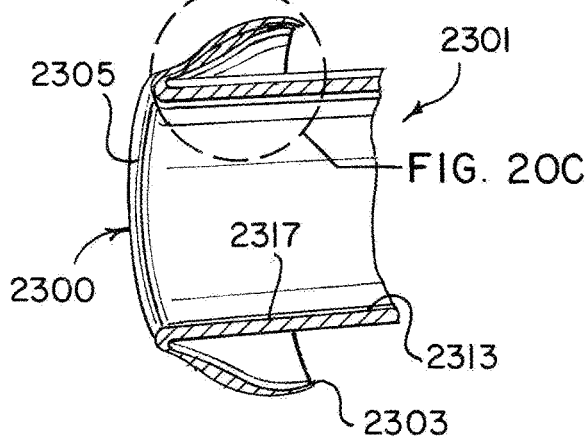
FIG. 20B is a close-up cross-sectional view of an embodiment of one example catheter of this disclosure with a distal tip section in a first configuration.
Figure 20C:
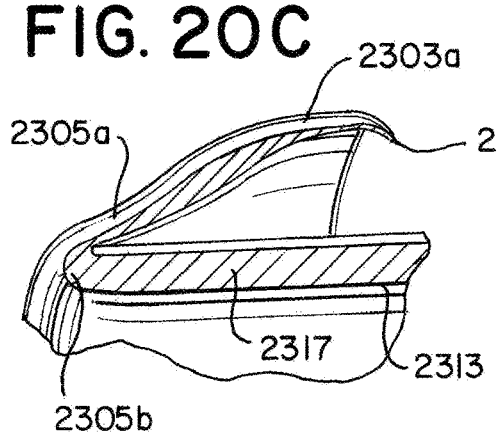
FIG. 20C is a close-up view of one example shoulder section of section E-E of the tip section of FIG. 20B in the first configuration.

FIG. 20B is a close-up perspective view of an embodiment of one example catheter 2301 with distal tip section 2300 in a first configuration with a "bell"-shape and varying thickness therealong. FIG. 20C is a close-up view of an example shoulder section of section E-E of the tip section 2300 of FIG. 20B. The depicted example section 2300 is configured to seal in a vessel with a relatively thin wall at or adjacent the distal portion 2305, including portion 2305a, and then can gradually become thicker between portions 2303 and 2305a until being relatively thin again at the outer tip adjacent portion 2303a. The shoulder defined at or adjacent portion 2305b can be relatively thicker than portion 2305a.

Figure 20D:
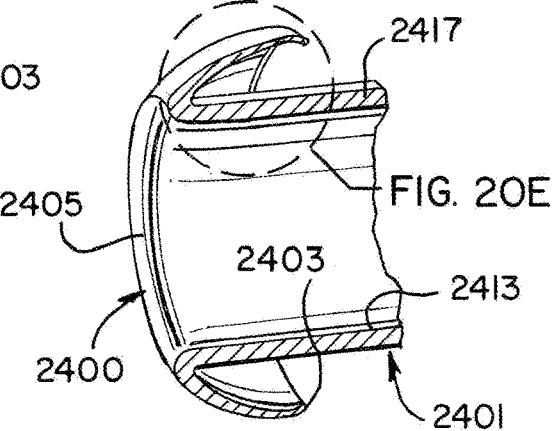
FIG. 20D is a close-up cross-sectional view of an embodiment of one example catheter of this disclosure with a distal tip section in a first configuration.
Figure 20E:
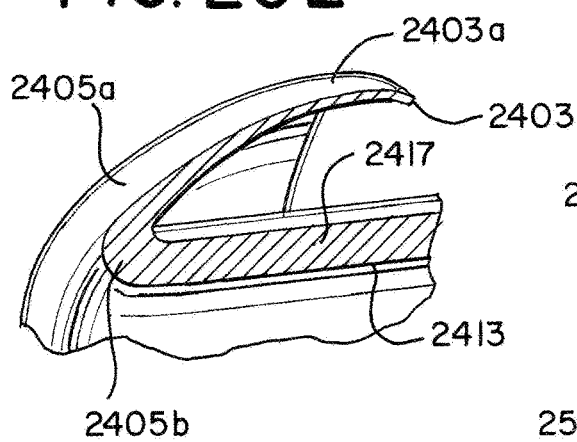
FIG. 20E is a close-up view of one example shoulder section of section F-F of the tip section of FIG. 20D in the first configuration.

FIG. 20D is a close-up perspective view of an embodiment of one example catheter 2401 with distal tip section 2400 in a first configuration. FIG. 20E is a close-up view of an example shoulder section of section E-E of the tip section 2400 of FIG. 20D. The depicted example section 2400 is configured to seal in a vessel with a relatively thick wall at or adjacent the distal portion 2405, including at or adjacent portion 2405a, to provide relatively firm support to section 2400 with the remainder between portions 2403, 2405 being relatively thin at or around portion 2403a and distally terminating in a feather edge adjacent portion 2403. In turn, section 2400 can be configured to easily collapse in a larger range of vessel sizes and allows for advancement through smaller vessels.

Figure 21A:
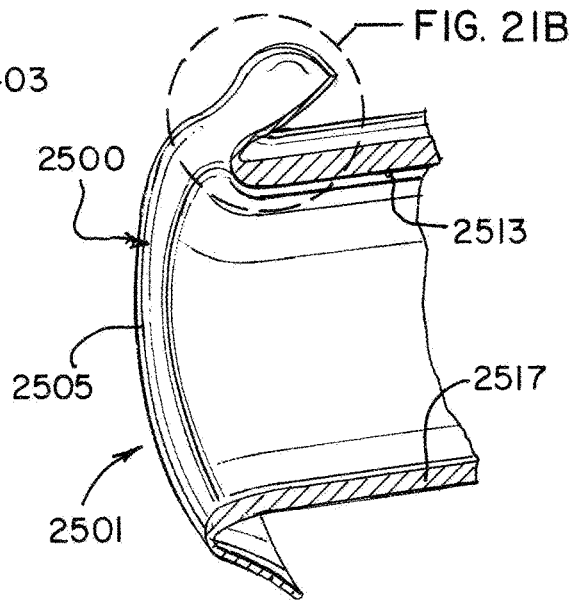
FIG. 21A is a close-up cross-sectional view of an embodiment of one example catheter of this disclosure with a distal tip section in a first configuration.
Figure 21B:
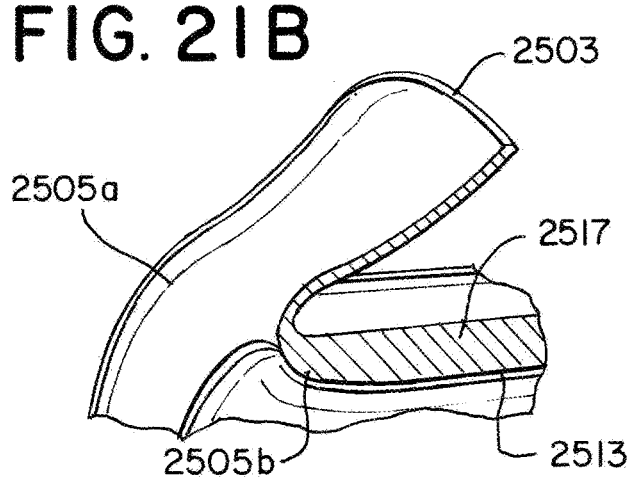
FIG. 21B is a close-up view of one example shoulder section of section G-G of the tip section of FIG. 21A in the first configuration.

FIG. 21A is a close-up perspective view of an embodiment of one example catheter 2501 with distal tip section 2500 in a first configuration with a "bell" shape that terminates in a relatively larger proximal extending radius and where the "bell" shape is relatively shorter than prior described "bell" shaped sections. In turn, section 2500 is specifically configured to allow for a relatively smooth inversion when being pulled proximally through an outer sheath. FIG. 21B is a close-up view of an example shoulder section of section E-E of the tip section 2500 of FIG. 21A. The depicted example section 2500 is configured to seal in a vessel with a relatively thin wall at or adjacent the distal portion 2505, including portion 2505*a*, and then thicken at or adjacent portion 2505*b* (and proximal thereof towards portion 2517) while being relatively thin opposite thereto at or around portion 2503.

Figure 22A:
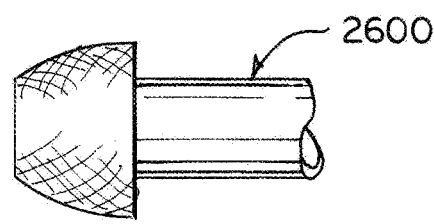
FIG. 22A is a close-up side view of an embodiment of one example catheter of this disclosure with a distal tip section in a first configuration.

FIG. 22A is a close-up side view of another example distal tip section 2600 in a first configuration. Here, section 2600 can be formed over a braid, wire or laser cut support frame. Such support frames can allow for use of a very thin membrane (e.g., 5 to 50 microns) without losing integrity of the shape of section 2600, so that section 2600, in connection with the remainder of its catheter, can withstand the forces of aspiration, clot ingestion and compression in an outer catheter and through a vessel. In some examples, section 2600 can include a support frame made from metallic and/or polymeric materials. Metallic and certain heat resistant polymers can be receptive of forming the membrane of section 2600 through reflow, molding and compression molding processes. In other examples, a dipping process can be used constructing section 2600 with metallic and/or polymeric support frames, where the polymer is compatible with a solvent used for the membrane dip material.

Figure 22B:
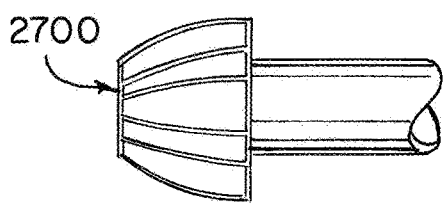
FIG. 22B is a close-up side view of an embodiment of one example catheter of this disclosure with a distal tip section in a first configuration.
Figure 22C:
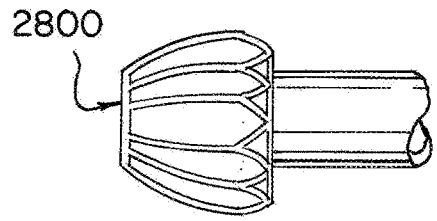
FIG. 22C is a close-up side view of an embodiment of one example catheter of this disclosure with a distal tip section in a first configuration.

FIG. 22B is a close-up side view of another example distal tip section 2700 in a first configuration where the support frame is constructed from a plurality of wires. FIG. 22C is a close-up side view of another example distal tip section 2800 in a first configuration where the support frame is laser cut.

Figure 22D:
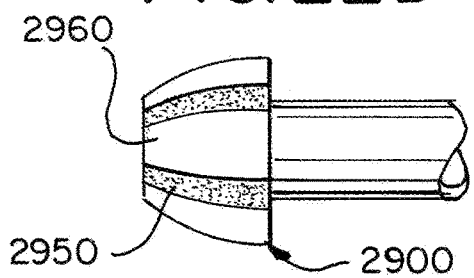
FIG. 22D is a close-up side view of an embodiment of one example catheter of this disclosure with a distal tip section in a first configuration.
Figure 22E:
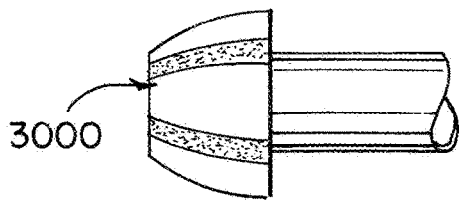
FIG. 22E is a close-up side view of an embodiment of one example catheter of this disclosure with a distal tip section in a first configuration.

FIG. 22D is a close-up side view of another example distal tip section 2900 in a first configuration. In this example, section 2900 can include one or more polymer layers, for example layers 2950, 2960. In some examples, membrane layer 2950 can be adhered to a thin membrane 2960, whereby layer 2950 can be a firmer, longitudinal support member with corresponding increased bending stiffness versus membrane 2960 that in turns provide adequate radial support to section 2900. FIG. 22E is a close-up side view of another example distal tip section 3000 in a first configuration, similar to section 2900, except for section 3000 includes an additional outer membrane layer here is positioned over one or more firmer, longitudinal support members (rather than under them, as in section 2900).

Figure 22F:
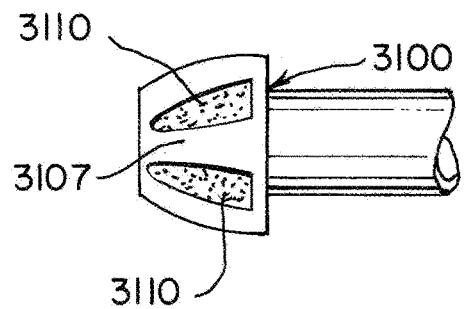
FIG. 22F is a close-up side view of an embodiment of one example catheter of this disclosure with a distal tip section in a first configuration.
Figure 22G:
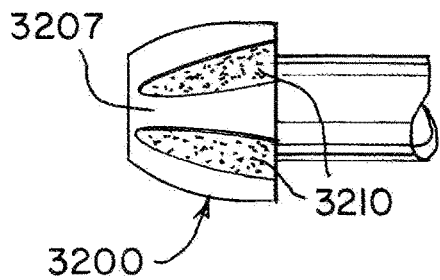
FIG. 22G is a close-up side view of an embodiment of one example catheter of this disclosure with a distal tip section in a first configuration.

FIG. 22F is a close-up side view of another example distal tip section 3100 in a first configuration. In this example, section 3100 can include one or more polymer layers, for example layer 3107. Layer 3107 can be a membrane that is flexible but firm enough to provide support with one or more cut-outs where a window 3110 is adhered. Window 3110 can be porous to further increase ability to collapse with minimal volume while also permitting controlled passage of blood flow. Passage of blood flow in this embodiment can help to keep a relatively thin membrane of section 3100 in its formed shape during aspiration, similar to a parachute. FIG. 22G is a close-up side view of another example distal tip section 3200 in a first configuration, similar to section 3100, except for section 3200 includes windows 3210 that extend more proximally, including in certain examples all the way to the proximal end of section 3100.

FIG. 23 is a side view of an embodiment of catheter 3301 with distal tip section 3300 in a first configuration and positioned with example luer 3470. As shown, section 3300 can include a collapsible shaft portion 3337 under the outer surface of section 3300 (e.g., a shaft constructed of a braided frame). When advanced through or collapsed through luer 3471 of an outer catheter, collapsible shaft portion 3337 can reduce in diameter in order to provide additional space for relatively soft section 3300 to collapse or fold into the inner diameter (ID) of the outer shaft. To achieve this function, a support frame of portion 3337 can include the prior described braided frame. However, the support frame is not so limited and can be a wire formation or laser cut stent like tube has an elastomeric polymer or polymer with elastic strain recovery properties reflowed through or molded over the structure. In some examples, just proximal of portion 3337, catheter 3301 can include a non-collapsible shaft portion 3335.

In some examples, portion 3337 can have one or more axial spines 3342 to enhance pushability and resistance to tensile elongation of the shaft. The one or more axial spines 3342 may stop (e.g., be positioned just proximal of) short of tip section 3300, extend to the distal end of portion 3337, or to the distal end of portion 3337 and revert proximally through the wall of section 3300.

In some examples, portion 3337 can be fitted with a ring or coil marker band 3330 to enhance visibility. Alternatively, radiopaque wires or coils may be added to the frame of portion 3337 (or other marker inserts may be included in a laser cut support frame or radiopaque filler may be included in the softer material of section 3300). Catheter 3301 can also include a series of polymer jackets 3350 with different softness properties to provide variability in bending flexibility and pushability. The jackets 3350 can be reflowed over a PTFE liner for a low friction inner lumen, as well as a support structure over the PTFE liner (e.g., Coil, braid, lasered tube pattern, spines or a combination thereof) to provide kink resistance, torque and pushability properties.

Turning to FIG. 24A, a side view of catheter 3301 is shown with section 3300 in a first configuration in guide catheter 3400 with example luers 3440, 3470. FIG. 24B shows a similar view but section 3300 has now been distally translated distal of catheter 3400. As shown, when inside catheter 3400, catheter 3301, including section 3300, has a reduced outer diameter for passage therethrough whereas once distal thereof, section 3300 can expand automatically.

FIG. 25A is a close-up view of catheters 3301, 3400 of FIG. 24A at section H-H, showing more clearly tip section 3301 when collapsed within catheter 3400. FIG. 25B is a close-up view of catheters 3301, 3400 of FIG. 24B at section I-I, showing more clearly tip section 3301 when at least partially distal of catheter 3400 and portions 3305, 3303 expanded to a larger diameter than the previous collapsed diameter. In certain examples, the greatest diameter formed between portions 3303, 3305 can be greater than the outer diameter of catheter 3400. In some examples, the greatest diameter can be at least two times greater than the outer diameter of catheter 3400. However, section 3300 is not so limited any diameter, greater or smaller, can be used as needed or required.

Turning to FIG. 26 is an exploded side view of catheters 3400, 3301 and corresponding tip section 3300 being push loaded through a taper lock luer 3450. Section 3300 is configured to allow reduction in diameter when advanced through taper lock luer 3450 of outer catheter 3400. In some examples, luer 3450 can be a bespoke luer with internal taper. For example, luer 3450 can include surfaces 3457 configured to promote stages of tapering to reduce the internal diameter reduction so that luer 3450 can be positioned with or otherwise threaded onto taper lock luer 3450 and provide a seamless transition to reduce the diameter of section 3300 in stages. Luer can also include an outer mounting flange 3459 with the largest diameter of luer 3450 and a distal end 3453 opposite thereto with the smallest diameter of luer 3450.

Luer 3450 may include a split design so that it can be removed from the assembly after section 3300 has passed through and reduced in diameter. Removing the loading luer 3450 can in some examples ensure that it does not reduce the useable length of the shaft of catheter 3301 and the split design may be removed by twisting apart, pulling apart snap fit features, or pulling apart magnetically bound sides of the luer 3450.

Turning to FIG. 27A is an exploded side view of catheter 3301 being push loaded through a taper lock 3450 and a second, loading luer 3480. FIG. 27B is a side view of the embodiment of FIG. 27A having been positioned with locks 3450, 3480. As shown, the OD of luer 3450 can be profiled to fit inside the ID of luer 3480, which can be a solid loading luer. In this respect, the inclusion of luer 3480 does not reduce the useable length of the catheter shaft associated with catheter 3301 and luer 3480 does not need to be removed in order to maximize useable length of catheter 3301. Luer 3301 can also be compatible with a hemostasis valve.

Figure 28B:
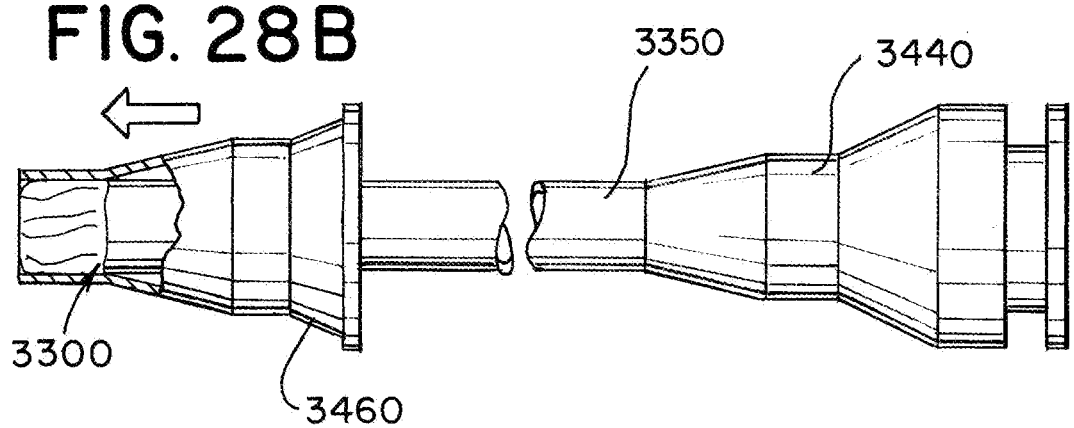
FIG. 28B is a side view of the embodiment of FIG. 28A in a second configuration.

Turning to FIG. 28A is a side view of catheter 3301 being push loaded distally by loading tool 3460, in connection with prior described features, to invert section 3300 distally, as shown with the large arrow denoting directional movement. In FIG. 28B, tool 3460 has been translated distally from FIG. 28A until inverted section 3000 is aligned with a distal end of tool 3406.

Figure 29A:
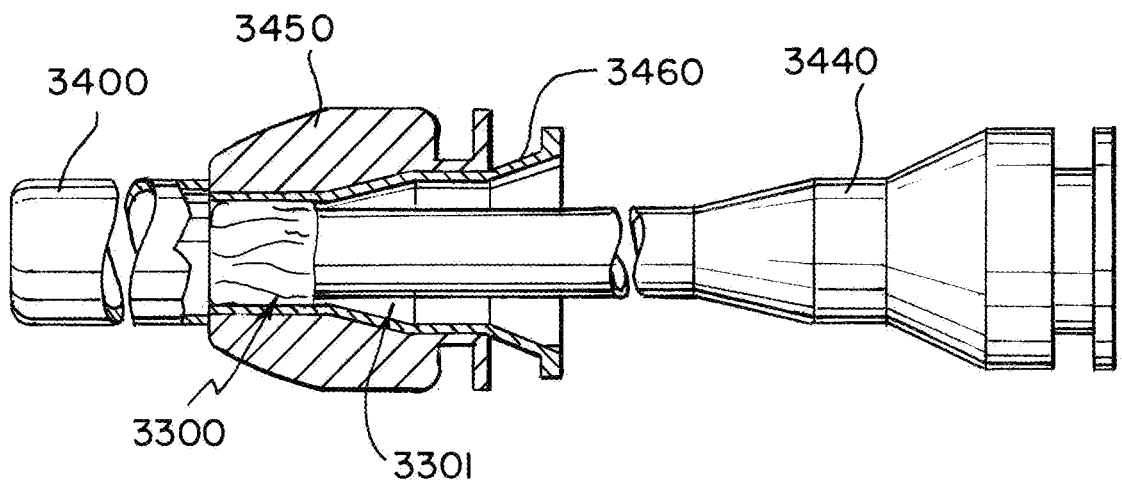
FIG. 29A is a side view of the embodiment of FIGS. 28A-28B in a third configuration.
Figure 29B:
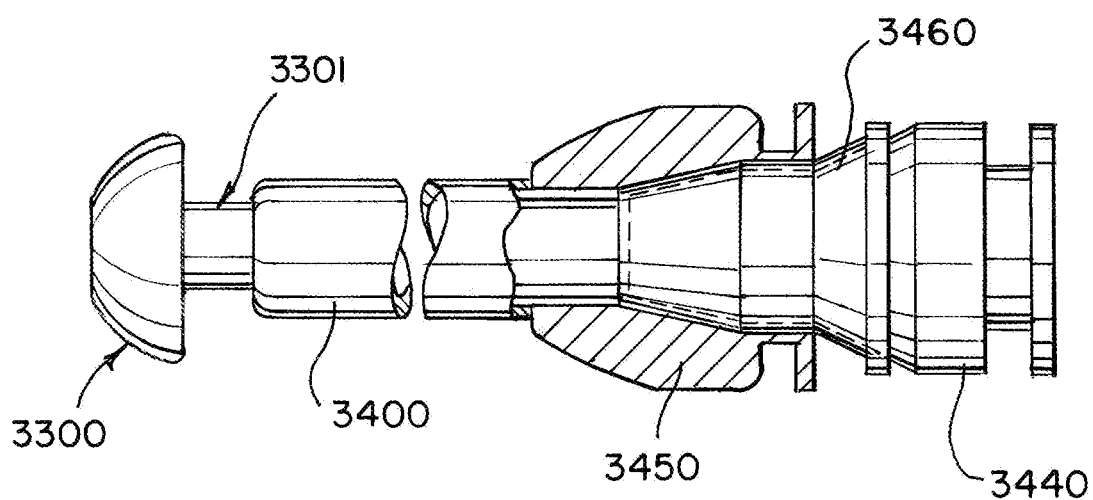
FIG. 29B is a side view of the embodiment of FIGS. 28A-29A in a fourth configuration.

FIG. 29A now shows a third configuration where a distal end of tool 3460, along with inverted section 3300, has been inserted into luer 3450 of catheter 3400. In other examples, luer 3450 could instead be a hemostasis valve connected to luer 3450. Turning to FIG. 29B, a fourth configuration is shown with section 3300 having been distally advanced through catheter 3400 until distally exiting, preferably in a vessel with a larger ID than the OD of section 3300. In some examples, distally exiting as described and shown can allow reversion of section 3300 to its original "earbud" shape, as shown in FIG. 29B. Then, section 3300 can be advanced distally through the blood vessel to the treatment site.

Figure 30:
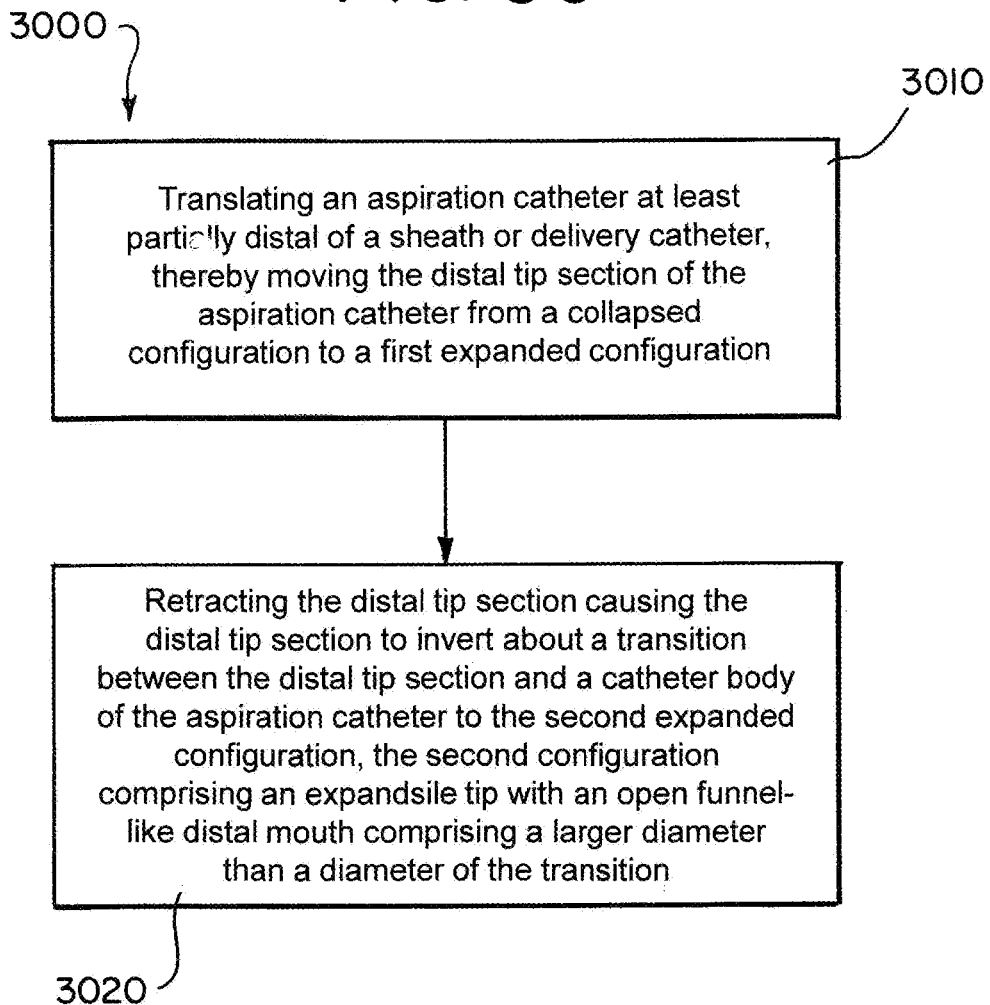
FIG. 30 is a flow diagram outlining a method of use for the system according to aspects of the present disclosure.

FIG. 30 is a flow diagram illustrating method steps for using any of the herein disclosed catheters with an obstructive thrombus from a blood vessel. The method steps can be implemented by any of the example systems, devices, and/or apparatus described herein or by a means that would be known to one of ordinary skill in the art. Referring to a method 3000 outlined in FIG. 30, step 3010 describes translating the aspiration catheter at least partially distal of a sheath or delivery catheter, thereby moving the distal tip section of the aspiration catheter from a collapsed configuration to a first expanded configuration. Step 3020 describes retracting the distal tip section causing the distal tip section to invert about a transition between the distal tip section and the catheter body to the second expanded configuration, the second configuration comprising an expansile tip with an open funnel-like distal mouth comprising a larger diameter than a diameter of the transition.

In some examples of method 3000, the distal tip section can also be configured to not invert when pulled proximally through a vessel and only when retracted through an outer sheath.

In some examples of method 3000, aspiration can be applied through the aspiration catheter, depending on how the user has deployed the flow restrictions and/or seals, to stimulate the clot into the funnel mouth of the catheter. If aspiration alone is insufficient to dislodge and capture the thrombus or if additional grip on the clot is desired during initial aspiration and dislodgement, a mechanical thrombectomy clot retrieval device can be advanced to the target. The mechanical thrombectomy device can then be deployed to capture the clot using any method commonly known in the art. Aspiration can continue during the entirety of this step to prevent blood reflux and maintain a tight grip on the clot, or at intervals chosen by the user. In some examples, aspiration and pulling of the clot with a stent retriever may be optimal to increase the chances of first pass success.

In some examples of method 3000, the captured clot and clot retrieval catheter can be withdrawn from the patient or the clot retrieval catheter can be left in place to maintain access as the mechanical thrombectomy clot retrieval device is withdrawn with the clot from the patient. If the clot is observed in the aspiration source and/or thrombectomy device and flow is not blocked in the clot retrieval catheter, this step can also involve carefully injecting contrast under low pressure through the system using known techniques to determine if the vessel is patent. If the vessel is patent, the clot retrieval catheter can be removed. If a blockage remains, additional passes of aspiration, thrombectomy or a combination of these may be repeated until the vessel is patent.

In some examples, the aspiration catheters and corresponding systems are configured to create a clot retrieval catheter that can provide both local flow restriction and/or arrest and a large clot facing mouth. In some examples, the aspiration catheter of this disclosure can be capable of navigating tortuous neurovasculature to reach an occlusive clot and be highly flexible. In some examples, the aspiration catheter can be compatible with relatively low-profile access sheaths/catheters, so that the puncture wound in the patient's groin (e.g., femoral access) can be easily and reliably closed. In some examples, the aspiration catheters and corresponding systems of this disclosure are particularly suited to remove clot from cerebral arteries in patients suffering AIS, from coronary native or graft vessels in patients suffering from MI, and from pulmonary arteries in patients suffering from pulmonary embolism and from other peripheral arterial and venous vessels in which clot is causing an occlusion.

The disclosure is not limited to the examples described, which can be varied in construction and detail. The terms "distal" and "proximal" are used throughout the preceding description and are meant to refer to a positions and directions relative to a treating physician. As such, "distal" or distally" refer to a position distant to or a direction away from the physician. Similarly, "proximal" or "proximally" refer to a position near to or a direction towards the physician.

In describing example embodiments, terminology is resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method can be performed in a different order than those described herein without departing from the scope of the disclosed technology. Similarly, it is also to be understood that the mention of one or more components in a device or system does not preclude the presence of additional components or intervening components between those components expressly identified.

As discussed herein, a "patient" or "subject" can be a human or any animal. It should be appreciated that an animal can be a variety of any applicable type, including, but not limited to, mammal, veterinarian animal, livestock animal or pet-type animal, etc. As an example, the animal can be a laboratory animal specifically selected to have certain characteristics similar to a human (e.g., rat, dog, pig, monkey, or the like).

As used herein, the terms "about" or "approximately" for any numerical values or ranges indicate a suitable dimensional tolerance that allows the part or collection of components to function for its intended purpose as described herein. More specifically, "about" or "approximately" may refer to the range of values±20% of the recited value, e.g. "about 90%" may refer to the range of values from 71% to 99%.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It must also be noted that, as used in the specification and the appended claims, the singular forms "a," "an," and "the" include plural referents unless the context clearly dictates otherwise. Ranges can be expressed herein as from "about" or "approximately" one particular value and/or to "about" or "approximately" another particular value. When such a range is expressed, other exemplary embodiments include from the one particular value and/or to the other particular value.

The descriptions contained herein are examples of embodiments of the disclosure and are not intended in any way to limit the scope of the disclosure. While particular examples of the present disclosure are described, various modifications to devices and methods can be made without departing from the scope and spirit of the disclosure. For example, while the examples described herein refer to particular components, the disclosure includes other examples utilizing various combinations of components to achieve a described functionality, utilizing alternative materials to achieve a described functionality, combining components from the various examples, combining components from the various example with known components, etc. The disclosure contemplates substitutions of component parts illustrated herein with other well-known and commercially-available products. To those having ordinary skill in the art to which this disclosure relates, these modifications are often apparent and are intended to be within the scope of the claims which follow.

What is claimed is:

1. An aspiration catheter, comprising:
    a distal tip section comprising a proximal portion and a distal portion, the distal tip section being disposed on or adjacent a distal end of the aspiration catheter, and being invertible about a transition between a catheter body of the aspiration catheter and the distal tip section between a first configuration and a second configuration, the transition located at and affixed to the distal end of the aspiration catheter;
    the aspiration catheter being configured so that retracting the distal tip section causes the distal tip section to invert about the transition from the first configuration to the second configuration, and
    the second configuration comprising an expansile tip with an open funnel-like distal mouth comprising a larger diameter than a diameter of the transition,
    wherein in the first configuration, the proximal portion extends proximal of the distal section and the distal end of the aspiration catheter,
    wherein in the second configuration, the proximal portion extends distal of the distal section and the distal end of the aspiration catheter,
    wherein in the second configuration, the proximal portion is approximate the clot and the open funnel-like distal mouth faces a clot, and
    wherein the aspiration catheter comprises a shoulder region proximal of the transition, the shoulder region having a variable thickness along its length.

2. The aspiration catheter of claim 1, wherein the first configuration and the second configuration are part of an expanded configuration of the distal tip section being distal of a guide catheter or a sheath.

3. The aspiration catheter of claim 1, wherein the first configuration of the distal tip section comprises a mushroom-shaped hemispherical section configured to be inverted, by being retracted a predetermined distance, into the second configuration and form the open funnel-like distal mouth.

4. The aspiration catheter of claim 3, wherein the first configuration of the mushroom-shaped hemispherical section is a mirror of the second configuration of the mushroom-shaped hemispherical section.

5. The aspiration catheter of claim 1, wherein the distal tip section comprises a plurality of sealing members configured to be inverted from a mushroom-shaped section in the first configuration with an open end faced proximally to the open funnel-like distal mouth of the second configuration with the open end faced distally.

6. The aspiration catheter of claim 5, wherein each sealing member comprises a hemispherical shape in each of the first configuration and the second configuration, one of the hemispherical shapes being a mirror of the other hemispherical shape and substantially opposed to the other hemispherical shape between the first configuration and the second configuration.

7. The aspiration catheter of claim 5, wherein each sealing member corresponds to a separate funnel mouth in the second configuration.

8. The aspiration catheter of claim 5, wherein each sealing member multiple layers of sealing with a corresponding vessel wall.

9. The aspiration catheter of claim 5, wherein each sealing member is invertible about a respective transition.

10. The aspiration catheter of claim 5, wherein each sealing member is selectively spaced apart along the catheter body.

11. The aspiration catheter of claim 1, wherein the distal portion comprises a smaller diameter than a diameter of the proximal portion, and the diameter of the proximal portion is at least twice the diameter of the distal portion.

12. The aspiration catheter of claim 1, wherein the distal portion comprises a smaller diameter than a diameter of the proximal portion, and an outer surface of the distal tip section between the proximal and distal portions is curved or otherwise contoured.

13. The aspiration catheter of claim 1, wherein the open funnel-like distal mouth is collapsible during or after the procedure to reduce or remove flow restriction in the vessel.

14. A method, comprising:

translating an aspiration catheter comprising a distal tip section at a distal end at least partially distal of a sheath or delivery catheter, thereby moving the distal tip section of the aspiration catheter from a collapsed configuration to a first expanded configuration; and retracting the distal tip section causing the distal tip section to invert about a transition between the distal tip section and a catheter body of the aspiration catheter to the second expanded configuration, the second expanded configuration comprising an expansile tip with an open funnel-like distal mouth comprising a larger diameter than a diameter of the transition, wherein the distal tip section comprises a distal portion and a proximal portion, wherein in the first configuration, the proximal portion extends proximal of the distal section and the distal end of the aspiration catheter, wherein in the second configuration, the proximal portion extends distal of the distal section and the distal end of the catheter, wherein in the second configuration, the proximal portion is approximate the clot and the open funnel-like distal mouth faces a clot, wherein the transition is located at and affixed to the distal end of the aspiration catheter, and wherein the aspiration catheter comprises a shoulder region proximal of the transition, the shoulder region having a variable thickness along its length.

15. The method of claim 14, further comprising:

aspirating through the distal tip section to stimulate a thrombus into the open funnel-like distal mouth of the distal tip section.

16. The method of claim 14, further comprising:

reducing clot shear, by the distal tip section, in the first expanded configuration.

17. The method of claim 14, further comprising:

inverting a plurality of sealing members of the distal tip section from a mushroom-shaped section in the first expanded configuration to the open funnel-like distal mouth of the second expanded configuration.

18. The method of claim 17, further comprising:

inverting each sealing member of the distal tip section to form corresponding funnel-like distal mouths.

19. The method of claim 17, further comprising:

sealing a plurality of sealing layers, by each sealing layer of a respective sealing member, with a corresponding vessel wall, each sealing member being invertible about a respective transition.

20. The method of claim 14, further comprising:

collapsing the open funnel-like distal mouth during the procedure to reduce or remove flow restriction in the vessel.

\* \* \* \* \*